United States Patent
Liu et al.

(10) Patent No.: US 11,101,496 B2
(45) Date of Patent: Aug. 24, 2021

(54) MAGNESIUM-BASED ELECTROLYTE COMPOSITIONS AND USES THEREOF

(71) Applicants: Tianbiao Liu, Logan, UT (US); Jian Luo, Logan, UT (US)

(72) Inventors: Tianbiao Liu, Logan, UT (US); Jian Luo, Logan, UT (US)

(73) Assignee: Utah State University, Cache County, UT (US)

( * ) Notice: Subject to any disclaimer, the term of this patent is extended or adjusted under 35 U.S.C. 154(b) by 0 days.

(21) Appl. No.: 16/033,087

(22) Filed: Jul. 11, 2018

(65) Prior Publication Data

US 2019/0020058 A1    Jan. 17, 2019

Related U.S. Application Data

(60) Provisional application No. 62/531,234, filed on Jul. 11, 2017.

(51) Int. Cl.
| | |
|---|---|
| *H01M 10/0561* | (2010.01) |
| *H01M 4/58* | (2010.01) |
| *H01M 10/054* | (2010.01) |
| *H01M 10/056* | (2010.01) |
| *H01M 4/02* | (2006.01) |

(52) U.S. Cl.
CPC ..... *H01M 10/0561* (2013.01); *H01M 4/5815* (2013.01); *H01M 10/054* (2013.01); *H01M 10/056* (2013.01); *H01M 2004/028* (2013.01); *H01M 2300/008* (2013.01); *H01M 2300/0022* (2013.01); *H01M 2300/0028* (2013.01); *H01M 2300/0045* (2013.01); *H01M 2300/0088* (2013.01)

(58) Field of Classification Search
None
See application file for complete search history.

(56) References Cited

U.S. PATENT DOCUMENTS

| 2015/0364792 A1* | 12/2015 | Watahiki | H01M 10/0568 |
|---|---|---|---|
| | | | 429/338 |
| 2016/0028117 A1* | 1/2016 | Oh | H01M 10/0567 |
| | | | 429/337 |

OTHER PUBLICATIONS

Luo et al (Tertiary Mg/Mgcl2AlCl3 Inorganic Mg2+ Electrolytes with Unprecedented Electrochemical Performance for REversible Mg Deposition; ACS Energy Lett. 2017, 2, 1197-1202) (Year: 2017).*
Luo et al Experimental Data (Year: 2017).*
Aurbach et al., "A short review on the comparison between Li battery systems and rechargeable magnesium battery technology," Journal of Power Sources, 2001, 97-8, 28-32.
Aurbach et al., "Nonaqueous magnesium electrochemistry and its application in secondary batteries," Chemical Record, 2003, 3(1):61-73.
Aurbach et al., "Prototype systems for rechargeable magnesium batteries," Nature, 2000, 407(6805):724-727.

(Continued)

*Primary Examiner* — Lucas J. O'Donnell

(57) ABSTRACT

Methods of making magnesium-based compositions are disclosed. The methods include the addition of a metallic magnesium powder to a magnesium salt, a metal halide and a solvent. The methods provide compositions with advantageous properties that make them useful as electrolytes for battery applications.

22 Claims, 65 Drawing Sheets
(43 of 65 Drawing Sheet(s) Filed in Color)

(56) References Cited

OTHER PUBLICATIONS

Barile et al., "Electrolytic Conditioning of a Magnesium Aluminum Chloride Complex for Reversible Magnesium Deposition," American Journal of Physical Chemistry C, 2014, 118(48):27623-27630.
Barile et al., "Exploring Salt and Solvent Effects in Chloride-Based Electrolytes for Magnesium Electrodeposition and Dissolution," Journal of Physical Chemistry C., 2015, 119(24)13524-13534.
Benmayza et al., "Effect of Electrolytic Properties of a Magnesium Organohaloaluminate Electrolyte on Magnesium Deposition," Journal of Physical Chemistry C, 2013, 117(51):26881-26888.
Canepa et al., "Odyssey of Multivalent Cathode Materials: Open Questions and Future Challenges," Chemical Reviews, Mar. 2017, 117(5):4287-4341.
Cheng et al., "Highly active electrolytes for rechargeable Mg batteries based on a [Mg2(μ-Cl)2]2+ cation complex in dimethoxyethane," Physical Chemistry Chemical Physics, 2015, 17(20):13307-13314.
Doe et al., "Novel, electrolyte solutions comprising fully inorganic salts with high anodic stability for rechargeable magnesium batteries," Chemical Communications, 2014, 50(2):243-245.
Ha et al., "A conditioning-free magnesium chloride complex electrolyte for rechargeable magnesium batteries," Journal of Materials Chemistry A., 2016, 4(19):7160-7164.
Ha et al., "Magnesium(II) Bis(trifluoromethane sulfonyl) Imide-Based Electrolytes with Wide Electrochemical Windows for Rechargeable Magnesium Batteries," ACS Applied Materials & Interfaces, 2014, 6(6):4063-4073.
He et al., "MgCl2/AlCl3 Electrolytes for Reversible Mg Deposition/Stripping: Electrochemical Conditioning or Not?," Journal of Materials Chemistry A, Apr. 2017, 5, 12718-12722.
He et al., "Recent Advances on MgCl2 Based Electrolytes for Rechargeable Mg Batteries," Energy Storage Materials, Jul. 2017, 8, 184-188.
Kang et al., "Non-Grignard and Lewis Acid-Free Sulfone Electrolytes for Rechargeable Magnesium Batteries," Chemical Materials, Mar. 2017, 29, 3174-3180.
Kim et al., "Structural and compatibility of a magnesium electrolyte with a sulphur cathode," Nature Communications, 2011, 2, 6 pages.
Kroon et al., "Decomposition of ionic liquids in electrochemical processing," Green Chemistry, 2006, 8(3):241-245.
Liu et al., "A facile approach using MgCl2 to formulate high performance Mg2+ electrolytes for rechargeable Mg batteries," Journal of Materials Chemistry A, 2014, 2(10):3430-3438, Abstract 3 pages.
Liu et al., "Ultrathin Dendrimer-graphene Oxide Composite Film for Stable Cycling Lithium-sulfur Batteries," Proceedings of the National Academy of Sciences, Apr. 2017, 114(14):3578-3583.
Maroncelli et al., "Polar solvent dynamics and electron-transfer reactions," Science, 1989, 243(4899):1674-1681.
Meerwein et al., "Die Polymerisation des Tetrahydrofurans," Angew. Chem., 1960, 72(24):927-934. English Abstract Provided.
Muldoon et al., "Electrolyte roadblocks to a magnesium rechargeable battery," Energy & Environmental Science, 2012, 5(3):5941-5950.
Muldoon et al., "Quest for nonaqueous multivalent secondary batteries: magnesium and beyond," Chemical Reviews, 2014, 114(23):11683-11720.
Park et al., "The Importance of Confined Sulfur Nanodomains and Adjoining Electron Conductive Pathways in Subreaction Regimes of Li—S Batteries," Advanced Energy Materials, Oct. 2017, 7, 1700074.
Sa et al., "Role of Chloride for a Simple, Non-Grignard Mg Electrolyte in Ether-Based Solvents," ACS Applied Materials & Interfaces, 2016, 8(25):16002-16008.
Saha et al., "Rechargeable magnesium battery: Current status and key challenges for the future," Progress in Materials Science, 2014, 66, 1-86.
See et al., "The Interplay of Al and Mg Speciation in Advanced Mg Battery Electrolyte Solutions," Journal of the American Chemical Society, 2016, 138(1):328-337.
Shterenberg et al., "The challenge of developing rechargeable magnesium batteries," MRS Bulletin, 2014, 39(5):453-460.
Tarascon et al., "Issues and challenges facing rechargeable lithium batteries," Nature 2001, 414(6861):359-367.
Terada et al., "Thermal and Electrochemical Stability of Tetraglyme-Magnesium Bis(trifluoromethanesulfonyl)amide Complex: Electric Field Effect of Divalent Cation on Solvate Stability," Journal of Physical Chemistry C, 2016, 120(3):1353-1365.
Waldvogel et al., "Renaissance of Electrosynthetic Methods for the Construction of Complex Molecules," Angewandte Chemie International Edition, 2014, 53(28):7122-7123.
Watkins et al., "Designer Ionic Liquids for Reversible Electrochemical Deposition/Dissolution of Magnesium," Journal of the American Chemical Society, 2016, 138(2):641-650.
Yoo et al., "Mg rechargeable batteries: an on-going challenge," Energy & Environmental Science, 2013, 6(8):2265-2279.
Zhang et al., "Dependence of rate constants of heterogeneous electron transfer reactions on viscosity," Journal of the American Chemical Society, 1985, 107, 3719-3721.
Zhao-Karger,et al., "Performance Improvement of magnesium Sulfur Batteries with Modified Non-Nucleophilic Electrolytes," Advanced Energy Materials, 2015, 5, 1401155-1401163.

\* cited by examiner

MAGNESIUM-BASED ELECTROLYTE COMPOSITIONS AND USES THEREOF

CROSS-REFERENCE TO RELATED APPLICATIONS

This application claims priority to U.S. Provisional Patent Application No. 62/531,234, filed Jul. 11, 2017, which is incorporated herein by reference in its entirety.

TECHNICAL FIELD

This disclosure relates to magnesium-based compositions and their use as electrolytes in batteries.

BACKGROUND

Because of the advantages of being safe (without dendrite formation during the charge process), green (magnesium compounds applied as electrolyte materials are environmentally benign), cost-effective (8th most abundant element on the earth's crust, approximately 24 times cheaper than Li), high capacity (2205 Ah/kg or 3832 Ah/L vs 3861 Ah/kg or 2062 Ah/L for Li), and high reduction potential (−2.37 vs SHE), magnesium (Mg) ion batteries have received increased attention as promising battery systems alternative to Li ion, Li metal, and Na metal batteries for electrochemical energy storage. However, due to the high reactivity and sensitivity of $Mg^{2+}$ electrolytes in organic solution, developing facile methods of preparing high performance $Mg^{2+}$ electrolytes is still challenging, and thus impedes the development of Mg ion batteries.

SUMMARY

In one aspect, disclosed are methods of making a composition, the method comprising: adding a magnesium salt, a metal halide and metallic magnesium to a solvent to provide a mixture; stirring the mixture; and filtering the mixture to provide a composition, wherein the composition has a molar ratio of magnesium to the metal of the metal halide of from about 1:3 to about 1:0.

In another aspect, disclosed are compositions comprising magnesium ions, magnesium salts, metal ions from the metal halide, metal halides, counter ions that can interact with the magnesium ions and metal ions from the metal halide, and a solvent. The composition may further comprise an ionic liquid.

In another aspect, disclosed are batteries comprising the compositions disclosed herein; a cathode; and an anode.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

(FIG. 1A) cyclic voltammetry (CV) curves of $Mg/MgCl_2/AlCl_3$ (MMAC)-tetrahydrofuran (THF) electrolytes with Mg powder post treatment (red) and in situ treatment (blue), and MACC-THF (black trace, without Mg treatment). Insert: CVs in the range of 2.5~4.0 V. (FIG. 1B) Plots of charge over time of the Mg plating and stripping for the studied electrolytes. (FIG. 1C) Linear sweep voltammetry (LSV) curves of MMAC-THF electrolytes with Mg powder post treatment (red) and in situ treatment (blue), and MACC-THF (black trace, without Mg treatment). (FIG. 1D) The bulk electrolysis of MACC-THF electrolyte (upper) and MMAC-THF (in situ Mg treatment) (lower) at 3.2 V, 3.5 V, and 3.6 V for 60 min.

(FIG. 2A) CV curves of a MMAC-dimethoxyethane (DME) electrolyte with in situ Mg powder treatment (red) and a MACC-DME electrolyte (black trace, without Mg treatment). Insert: Anodic LSV curves of MMAC-DME and MACC-DME electrolytes. (FIG. 2B) Plots of charge over time of the Mg plating and stripping of MMAC-DME and MACC-DME electrolytes. (FIG. 2C) CV curves of MMAC-diglyme (DMG) electrolytes with in situ Mg powder treatment (red), and a MACC-DMG electrolyte (black trace, without Mg treatment). Insert: Anodic LSV curves of a MMAC-DMG and MACC-DMG electrolytes. (FIG. 2D) Plots of charge over time of the representative Mg plating and stripping cycles of MMAC-DMG and MACC-DMG electrolytes.

(FIG. 9A): glassy carbon (GC); (FIG. 9B): aluminum; (FIG. 9C): platinum; and (FIG. 9D): stainless steel (SS).

(FIG. 10A): GC; (FIG. 10B): aluminum; (FIG. 10C): platinum; and (FIG. 10D): SS.

(FIG. 11A): GC; (FIG. 11B): aluminum; (FIG. 11C): platinum; and (FIG. 11D): SS.

(FIG. 22A) The energy-dispersive X-ray (EDX) spectrum recorded for a GC electrode after electrochemical Mg deposition using a MMAC-DME electrolyte. (FIG. 22B) The scanning electron microscopy (SEM) images of the deposited Mg on a GC electrode.

(FIG. 26A) 0.5M MMAC electrolyte and 0.5M MMAC electrolyte with 2M Py14AlCl$_4$; (FIG. 26B) 0.7M MMAC electrolyte and 0.7M MMAC electrolyte with 1.2M Py14AlCl$_4$. All the prepared electrolytes were treated by 10 mg/mL Mg powder at 45° C. for 6 hours. CV scanning rate is 50 mV/s.

(FIG. 27A) UV-vis spectra after MgCl$_2$/AlCl$_3$-DME based electrolyte react with sulfur for 10 days; (FIG. 27B) sulfur peak intensity comparison at 267 nm.

(FIG. 28A) Morphology of mesoporous carbon; (FIG. 28B) sulfur and (FIG. 28C) carbon distribution of sulfur filled mesoporous carbon which was heated at 155° C. for 12 hours.

(FIG. 29A) Comparison of galvanostatic charge-discharge curves of magnesium-sulfur (CMK/S) battery with different electrolytes at 0.2 C (100 mA/g) where 1 C was named at 500 mA/g. (FIG. 29B) Cycle stability of CMK/S in Mg—S battery with MMAC-IL electrolyte (0.5 M MMAC/2M Py14AlCl4) at 100 mA/g current density.

(FIG. 30A) SEM image of GO/CNT/S complex. Scale bar is 200 nm. (FIG. 30B) Charge-discharge curve and (FIG. 30C) Cycle stability of GO-S cathode material in Mg—S battery with the MMAC-IL electrolyte at 100 mA/g current density.

(FIG. 31A) cyclic voltammetry curves. (FIG. 31B) charge over time of the Mg plating and stripping.

(FIG. 32A) Cyclic voltammetry curves. (FIG. 32B) Charge over time of the Mg plating and stripping.

(FIG. 33A) Cyclic voltammetry curves. (FIG. 33B) Charge over time of the Mg plating and stripping.

(FIG. 34A) cyclic voltammetry curves. (FIG. 34B) charge over time of the Mg plating and stripping.

(FIG. 36A) Charge and discharge curve at 10 mAg$^{-1}$ current density. (FIG. 36B) Cycle performance at 10 mAg$^{-1}$ current density.

DETAILED DESCRIPTION

Figure 1A:
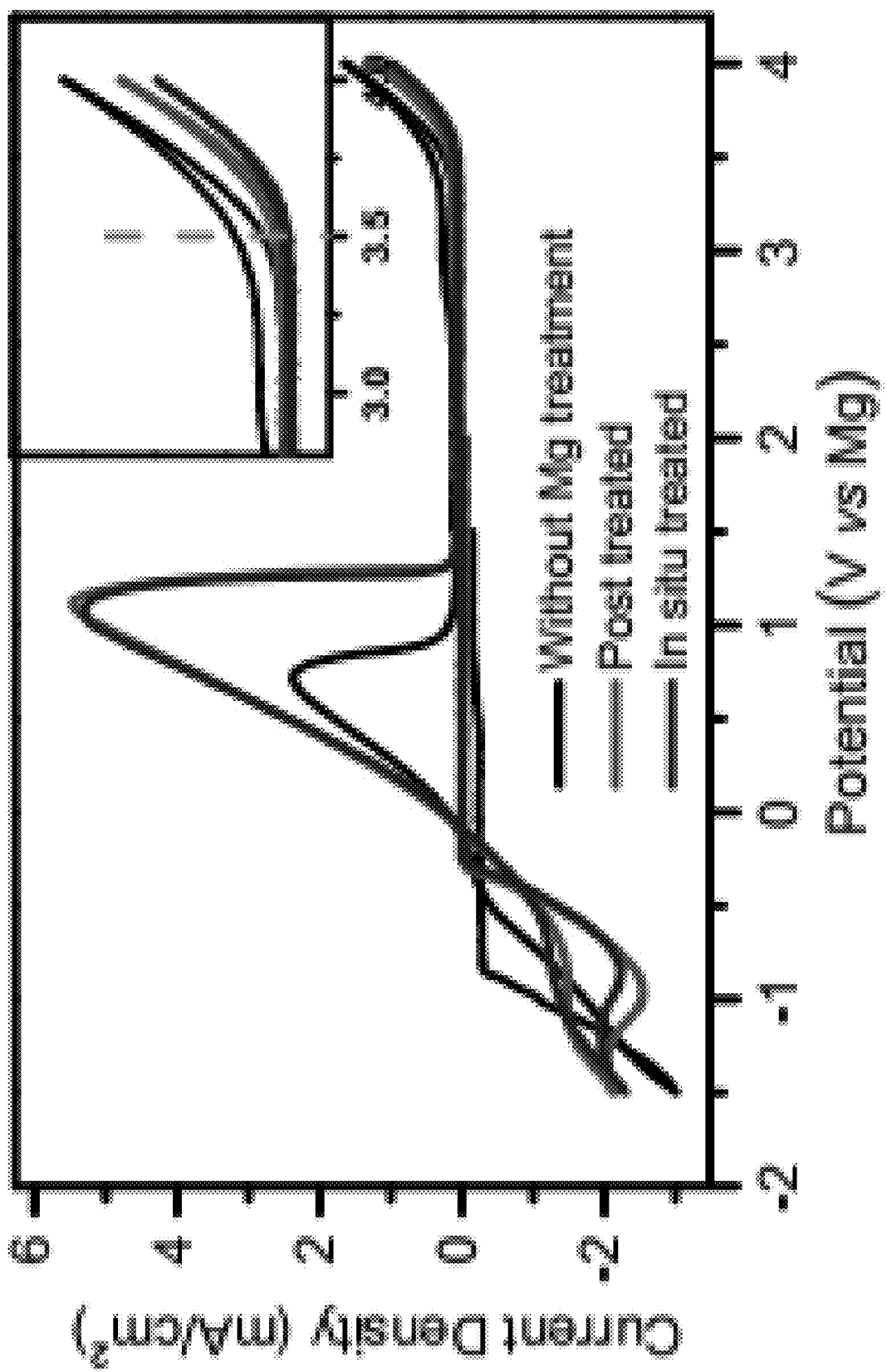
FIG. 1A-FIG. 1D.

In studies of Mg ion batteries, developing high performance Mg$^{2+}$ electrolytes has been emphasized because of the pivotal role of electrolytes for rechargeable batteries. During the past few decades, a great effort has been made in developing reversible Mg$^{2+}$ electrolytes, and their electrochemical performance has improved. However, developing high performance and simple Mg$^{2+}$ electrolytes like those used in Li ion batteries is still challenging. Particularly, inorganic Mg electrolytes are very scarce. In previous studies, the MgCl$_2$/AlCl$_3$ electrolytes (called Magnesium and Aluminum Chloride Complex electrolytes, abbreviated as MACC electrolytes), represent the first generation of inorganic Mg$^{2+}$ electrolytes and their simplicity is useful for rechargeable Mg battery applications. In spite of the apparent merits, preparation of high performance MACC electrolytes is not straightforward. Aurbach et al. and Gewirth et al. reported an electrochemical conditioning method to improve the performance of the MACC electrolytes in THF and DME. However, the electrochemical conditioning process is tedious and difficult to scale up as it needs up to 50 cycles of cyclic voltammogram (CV) to get good reversibility for a small amount of electrolyte. In addition, we have found, although no electrochemical conditioning was needed, very careful control of solvent quality with water content below 10 ppm is useful to achieve reliable electrochemical results. Maintaining such high quality solvent is also not easily done in battery applications. For example, Oh et al. reported a conditioning-free MACC like electrolyte in THF. However, the conditioning-free MACC electrolyte with the high Mg$^{2+}$ loading only delivered low activity for Mg plating (about 3.5 mA/cm$^2$ at 0.5 V vs Mg) and also involves the use of highly toxic Cr$^{3+}$.

In order to overcome the foregoing deficiencies, disclosed herein is a convenient approach to prepare upgraded high performance MgCl$_2$/AlCl$_3$ electrolytes by adding a new component, metallic magnesium powder, named as Mg/MgCl$_2$/AlCl$_3$ electrolytes and abbreviated as MMAC electrolytes in different ethereal solvents including THF, DME, and diglyme (DGM). For these new electrolytes, the Coulombic efficiency was improved to 90%~100%, the overpotential was decreased to 120~200 mV, the anodic oxidative stability was pushed to 3.5~3.8V (vs Mg), and the Mg plating onset potentials showed a significant positive shift.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. METHODS OF MAKING COMPOSITIONS

Disclosed herein are methods of making magnesium-based compositions. The methods take advantage of the addition of metallic magnesium to a magnesium salt, a metal halide and a solvent in order to provide advantageous compositions that are useful for battery applications, and in particular magnesium ion battery applications. The method may include adding a magnesium salt, a metal halide and metallic magnesium to a solvent to provide a mixture. In some embodiments, the magnesium salt, the metal halide and the metallic magnesium are added at the same time to the solvent. In other embodiments, the metallic magnesium is added to the solvent at a time point later than the addition of the magnesium salt and the metal halide. For example, the metallic magnesium may be added to the solvent about 1 minute, about 5 minutes, about 30 minutes, about 1 hour, about 5 hours, or about 10 hours after the magnesium salt and the metal halide have been added to the solvent. In some embodiments, the metallic magnesium is added to the solvent about 1 minute to about 10 hours after the magnesium salt and the metal halide have been added to the solvent.

The magnesium salt may be any salt that would be useful for battery applications, such as part of a battery electrolyte. Examples of magnesium salts include, but are not limited to, $MgX_2$ (X=a halide such as $F^-$, $Cl^-$, $Br^-$, $I^-$), $Mg(TFSI)_2$, $Mg(HMDS)_2$ (HMDS=1,1,1,3,3,3-Hexamethyldisilazane), $Mg(ClO_4)_2$, $Mg(PF_6)_2$, $Mg(BR_4)_2$, and $Mg(GaR_4)_2$, (R=halide, alkyl, aryl, PEG, or other suitable organic groups). In some embodiments, the magnesium salt includes magnesium chloride ($MgCl_2$), magnesium(II) bis(trifluoromethane sulfonyl) imide ($Mg(TFSI)_2$), magnesium bis(hexamethyldisilazide) ($Mg(HMDS)_2$), or a combination thereof. In some embodiments, the magnesium salt is magnesium chloride. The magnesium salt may be present in the mixture at from about 0.5 mg/mL to about 600 mg/mL, such as from about 1 mg/mL to about 400 mg/mL, from about 1.5 mg/mL to about 200 mg/mL, from about 1 mg/mL to about 100 mg/mL, or from about 2 mg/mL to about 50 mg/mL. In addition, the magnesium salt may include a small amount of impurities. For example, the magnesium salt may include less than 1%, less than 0.5%, less than 0.1%, less than 0.05%, less than 0.01%, or less than 0.005% impurities by weight of the magnesium salt.

The metal halide may be any metal halide that is useful in battery applications, such as part of a battery electrolyte. The metal halide may include a metal and a halide ion (e.g., $Cl^-$, $Br^-$, $I^-$, or $F^-$). The metal may be a Group 2 metal or a Group 13 metal. In some embodiments, the metal is a Group 13 metal. Examples of metal halides include, but are not limited to, aluminum halide, boron halide, gallium halide, magnesium halide and combinations thereof. In some embodiments, the halide is chloride. In some embodiments the metal halide is aluminum chloride ($AlCl_3$), boron chloride ($BCl_3$), magnesium chloride ($MgCl_2$) or a combination thereof. In some embodiments the metal halide is aluminum chloride ($AlCl_3$), boron chloride ($BCl_3$), or a combination thereof. In some embodiments, the metal halide is aluminum chloride ($AlCl_3$). The metal halide may be present in the mixture at from about 0.5 mg/mL to about 320 mg/mL, such as from about 0.5 mg/mL to about 250 mg/mL, from about 1.5 mg/mL to about 150 mg/mL, from about 1 mg/mL to about 100 mg/mL, or from about 2 mg/mL to about 60 mg/mL. In addition, the metal halide may include a small amount of impurities. For example, the metal halide may include less than 1%, less than 0.5%, less than 0.1%, less than 0.05%, less than 0.01%, or less than 0.005% impurities by weight of the metal halide.

Examples of combinations of the magnesium salt and metal halide include, but are not limited to, $MgCl_2/AlCl_3$, $MgCl_2/BCl_3$, $MgCl_2/GaCl_3$, $Mg(TFSI)_2/MgCl_2$, $Mg(HMDS)_2/MgCl_2$, $Mg(HMDS)_2/AlCl_3$, and $MgCl_2$. In some embodiments, the magnesium salt and the metal halide both comprise magnesium. In some embodiments, the magnesium salt and the metal halide are the same compound. For example, in some embodiments, the magnesium salt and metal halide are both $MgCl_2$.

As mentioned above, the addition of the metallic magnesium to the solvent and/or mixture can provide advantageous properties to the compositions provided by the disclosed methods. The metallic magnesium may be present in the mixture at from about 0.1 mg/mL to about 40 mg/mL, such as from about 0.1 mg/mL to about 30 mg/mL, from about 0.5 mg/mL to about 25 mg/mL, from about 0.5 mg/mL to about 20 mg/mL, from about 1 mg/mL to about 10 mg/mL or from about 1 mg/mL to about 5 mg/mL.

The metallic magnesium may be in the form of a powder. The metallic magnesium powder may include magnesium at varying particle size. For example, the metallic magnesium powder may have a mesh size of about 20 to about 500, such as about 100 to about 325 or about 200 to about 325. In some embodiments, the metallic magnesium powder has a 325 mesh size. In addition, the metallic magnesium powder may include a small amount of impurities. For example, the metallic magnesium powder may include less than 1%, less than 0.5%, less than 0.1%, less than 0.05%, less than 0.01%, or less than 0.005% impurities by weight of the magnesium powder. In some embodiments, the metallic magnesium powder consists essentially of metallic magnesium.

The solvent may be any solvent suitable for use in battery electrolyte compositions. In some embodiments, the solvent is an organic solvent. The solvent may comprise an ethereal solvent, a sulfone solvent, acetonitrile, carbonate, dimethylforamide (DMF), dimethyl sulfoxide (DMSO), or a mixture thereof. Examples of ethereal solvents include, but are not limited to, tetrahydrofuran (THF), dimethoxyethane (DME), diglyme (DMG), triglyme, tetraglyme, 1,4-dioxane, and combinations thereof. Examples of sulfone solvents include, but are not limited to, dipropyl sulfone, ter-butyl sulfone, and combinations thereof. Examples of carbonate include, but are not limited to, propylene carbonate, ethylene carbonate, fluoroethylene carbonate, ethyl methyl carbonate, 4-Vinyl-1,3-dioxolan-2-one, diethyl carbonate, and combinations thereof. In addition, the solvent may include a small amount of impurities. For example, the solvent may include less than 5%, less than 1%, less than 0.5%, less than 0.1%, or less than 0.01% impurities by weight of the solvent. The solvent may have a volume of about 0.5 mL to about 20 mL, such as about 0.5 mL to about 15 mL, about 1 mL to about 10 mL or about 1 mL to about 5 mL.

The method may further comprise adding an ionic liquid to the solvent. The presence of the ionic liquid may improve cycling stability of provided compositions, in particular in magnesium-sulfur batteries. Ionic liquids are molten salts with melting points typically below 100° C. In some embodiments, the ionic liquid is

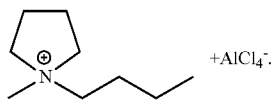

The ionic liquid may be added at the same time as the magnesium salt, the metal halide and the metallic magnesium; may be added at a time later than the magnesium salt, the metal halide and the metallic magnesium; or may be added at a time after the magnesium salt and the metal halide have been added, but prior to the metallic magnesium being added. The ionic liquid may be added at varying amounts and ratios. For example, the ionic liquid may be present in the mixture at about 0.5 M to about 2 M. In addition, the ionic liquid may be added at a molar ratio of about 0.5:1 to about 1:0.5 (ionic liquid:metal halide). In some embodiments, the ionic liquid is added at a molar ratio of about 1:1 (ionic liquid:metal halide).

After the mixture has been provided, it may then be stirred. The mixture may be stirred for varying amounts of time. For example, the mixture may be stirred for at least 5 hours prior to filtering, at least 10 hours, at least 15 hours, at least 20 hours, or at least 30 hours prior to filtering. In some embodiments, the mixture is stirred for about 5 hours to about 30 hours prior to filtering. In some embodiments, the mixture is stirred for about 20 hours. In addition, the mixture may be stirred at varying temperatures over the foregoing time ranges. For example, the mixture may be stirred at about 15° C. to about 80° C., such as from about 20° C. to about 70° C. or from about 23° C. (e.g., room temperature) to about 50° C.

Following stirring, the mixture can be filtered to provide the composition, where the composition can have a molar ratio of magnesium to the metal of the metal halide of from about 1:3 to about 1:0, such as from about 1:3 to about 1:05 or from about 1:3 to about 1:1. An example of a composition having a ratio of magnesium to the metal of the metal halide of about 1:0 is where the magnesium salt and metal halide both comprise magnesium. Filtering the mixture allows the metallic magnesium and any insoluble species to be removed. In some embodiments, no further purification is needed to provide the composition and/or the composition needs no further purification. In some embodiments, the method is free of any step adding chromium to the mixture and/or the composition, such as salts of chromium that can be used in battery applications. In other words, in some embodiments, the method does not include the addition of chromium and compounds thereof. In some embodiments, a chromium salt that is not included within the method is chromium chloride ($CrCl_2$).

A. Compositions

The compositions provided by the disclosed methods may be used as improved electrolyte compositions for batteries, such as magnesium ion batteries. The composition may comprise the magnesium salt, the metal halide, the solvent and any other associated ions and/or compounds that arise from the metallic magnesium treatment. For example, the composition can comprise magnesium ions, magnesium salts, metal ions from the metal halide, metal halides, counter ions that can interact with the magnesium ions and metal ions from the metal halide, and the solvent as described above. In some embodiments, the composition may further comprise an ionic liquid as described above. In some embodiments, the counter ions are the ions that are associated with the magnesium of the magnesium salt and/or the halide associated with the metal halide. In some embodiments, the magnesium ions, magnesium salts, metal ions from the metal halide, metal halides, and counter ions are all inorganic. Further description of these counter ions are described above regarding the magnesium salt and the metal halide. In some embodiments, the counter ion may be a halide ion, such as $Cl^-$, $Br^-$, $I^-$, or $F^-$. In some embodiments, the counter ion is one type of halide ion, such as 100% $Cl^-$ ions. In other embodiments, the counter ion is a combination of different halide ions or other types of suitable counter ions as described above. In some embodiments, the composition is an electrolyte composition that can be used in battery applications.

The composition may have a magnesium concentration of about 1 mg/mL to about 50 mg/mL, such as from about 1 mg/mL to about 30 mg/mL, from about 1 mg/mL to about 20 mg/mL, or from about 1 mg/mL to about 15 mg/mL. The composition may have an increased magnesium concentration relative to a mixture comprising a magnesium salt, a metal halide and a solvent that was not treated with the metallic magnesium. For example, the composition may have an increased magnesium concentration of 5% more, 10% more, 15% more, 20% more, 30% more, 40% more, or 50% more relative to a mixture comprising a magnesium salt, a metal halide and a solvent that was not treated with the metallic magnesium. In some embodiments, the composition has an increased magnesium concentration of about 5% to about 50%, such as from about 6% to about 45% or from about 7% to about 40% relative to a mixture comprising a magnesium salt, a metal halide and a solvent that was not treated with the metallic magnesium.

The composition may have a magnesium concentration that varies depending on the solvent used to provide the composition. For example, the composition may have a magnesium concentration of from about 1 mg/mL to about 20 mg/mL where the solvent is THF; from about 10 mg/mL to about 30 mg/mL where the solvent is DME; from about 3 mg/mL to about 20 mg/mL where the solvent is DMG; or from about 3 mg/mL to about 20 mg/mL where the solvent is dipropyl sulfone/THF at a 1/1 (v/v) ratio.

The composition may have a metal concentration, the metal being that of the metal halide, of from about 0.1 mg/mL to about 65 mg/mL, such as from about 0.2 mg/mL to about 50 mg/mL, from about 0.3 mg/mL to about 25 mg/mL or from about 0.4 mg/mL to about 15 mg/mL. The composition may have a decreased metal concentration (the metal being from the metal halide in embodiments where the metal halide does not comprise magnesium) relative to a mixture comprising a magnesium salt, a metal halide and a solvent that was not treated with the metallic magnesium.

In some embodiments, the metal halide comprises aluminum (e.g., $AlCl_3$). In these embodiments, the composition may include varying molar ratios of magnesium to aluminum that can depend on the solvent that is used. For example, the composition may have a molar ratio of magnesium to aluminum of from about 2.2:1 to about 4:1 where the solvent is THF; from about 1.2:1 to about 3:1 where the solvent is DME; or from about 1:1.21 to about 1:3 where the solvent is DMG. In addition, in these embodiments, the composition may have an aluminum concentration that varies depending on the solvent used to provide the composition. For example, the composition may have an aluminum concentration of from about 0.1 mg/mL to about 0.5 mg/mL where the solvent is THF; from about 1 mg/mL to about 10 mg/mL where the solvent is DME; or from about 0.5 mg/mL to about 5 mg/mL where the solvent is DMG.

As mentioned above, the disclosed compositions may have advantageous properties that make them useful as electrolyte compositions for battery applications. For example, the composition may have a Coulombic efficiency of greater than 90%, greater than 91%, greater than 92%, greater than 93%, greater than 94%, greater than 95%, greater than 96%, greater than 97%, greater than 98%, or greater than 99%. In some embodiments, the composition has a Coulombic efficiency of about 90% to about 100%. In addition, the composition may have an overpotential of less than 200 mV, less than 190 mV, less than 180 mV, less than 170 mV, or less than 160 mV. In some embodiments, the composition has an overpotential of about 150 mV to about 200 mV. Further, in some embodiments, the composition does not need to be electrochemically conditioned prior to use.

The metallic magnesium treatment may also be useful in decreasing the amount of water in the composition. For example, the composition may comprise less than 50 ppm water, less than 40 pm water, less than 30 ppm water, less than 20 ppm water, or less than 10 ppm water. In some embodiments, the composition comprises about 1 ppm to about 50 ppm water, such as about 1 ppm to about 30 ppm or about 1 ppm to about 10 ppm water.

In some embodiments, the composition is free of chromium and compounds thereof, such as salts of chromium that can be used in battery applications. In some embodiments, a chromium salt that is not included within the disclosed compositions is chromium chloride ($CrCl_2$).

3. BATTERIES

In another aspect, disclosed are batteries that comprise the compositions disclosed herein. Accordingly, in some embodiments the battery can be referred to as a Mg ion battery. The battery can further comprise a cathode and an anode. The anode may comprise magnesium and the anode may comprise glassy carbon, stainless steel, aluminum, platinum, sulfur, carbon nanotubes, graphene, mesoporous carbon or a combination thereof. In addition, the battery can comprise a separator positioned between the cathode and the anode.

In some embodiments, the battery is a Mg—S battery where the anode comprises magnesium and the anode comprises sulfur. In this anode, the anode may further comprise carbon nanotubes, graphene, mesoporous carbon or a combination thereof. In embodiments where the battery is a Mg—S battery, it may be beneficial for the composition to include the ionic liquid as described above.

4. EXAMPLES

Example 1

Tertiary $Mg/MgCl_2/AlCl_3$ Inorganic $Mg^{2+}$ Electrolytes Preparation of Electrolytes Material and Electrolyte Preparation:

The $MgCl_2$ (99.999%), $AlCl_3$ (99.999%), and $BCl_3$ (1.0 M in hexane) were purchased from Sigma-Aldrich. Mg powder (325 mesh) was purchased from Alfa-Aesar. Mg strip (99.5%) was purchased from GalliumSource. They were used as received. THF and DME were purified by distillation with Na before use. DMG was stirred with Na scrap for 2 days before use. The preparation and electrochemical tests of the electrolytes were conducted in a glovebox ($C_{Oxygen}$<1 ppm, $C_{Water}$<1 ppm). All the glassware used in the preparation and electrochemical tests were washed with DI water and dried at 150° C. for more than 12 hrs and then transferred into the glovebox immediately. The working electrode and reference electrode were polished before electrochemical tests.

Preparation of MMAC Electrolytes:

The MMAC-THF ($MgCl_2$ (0.04 M) and $AlCl_3$ (0.02 M) in THF) electrolyte. 2.0 mL of distilled THF was added into a 4 mL vial with 7.62 mg (80 μmol) of $MgCl_2$, followed by slowly adding 5.33 mg (40 μmol) of $AlCl_3$ and then adding 10.0 mg of Mg powder. The mixture was stirred at room temperature for 20 hrs to generate a clean solution. The Mg powder and insoluble species were removed by filtration. No further purification was needed.

The MMAC-DME ($MgCl_2$ (0.4 M) and $AlCl_3$ (0.4 M) in DME) electrolytes were prepared by slowly adding 106.6 mg (0.8 mmol) of $AlCl_3$, 76.2 mg (0.8 mmol) of $MgCl_2$, and 76 mg of Mg powder (3.2 mmol, ~4 eq. vs $MgCl_2$) into 2.0 mL DME followed by stirring at 45° C. for 6 hrs.

The MMAC-DMG ($MgCl_2$ (0.1M) and $AlCl_3$ (0.2M) in DMG) electrolytes were prepared by slowly adding 53.3 mg (0.4 mmol) of $AlCl_3$, 19.04 mg (0.2 mmol) of $MgCl_2$, and 10.0 mg of Mg powder into 2.0 mL diglyme followed by stirring at 45° C. for 6 hrs.

MMBC-DME ($MgCl_2$ (0.04M) and $BCl_3$ (0.02M) in DME) electrolyte was prepared in a similar procedure by replacing $AlCl_3$ with $BCl_3$.

Electrochemical Characterization and Kinetic Studies
Electrochemical Measurements:

Electrochemical measurements were performed by a Gamery Instruments 1000 electrochemical workstation with a three-electrode cell system, in which a glassy carbon electrode (GC, 1.0 mm diameter), platinum electrode (Pt, 2.0 mm diameter), aluminum rod (Al, 47 $mm^2$ working surface area), or stainless steel sheet (SS, 24 $mm^2$ working surface area) were used as the working electrode, a carbon rod as counter electrode, and a Mg strip as reference electrode. 2.0 mL of electrolyte was used for each electrochemical measurement. The cyclic voltammetry (CV) and linear sweep voltammetry (LSV) tests were carried out at a scan rate of 50 mV/s. The chronoamperometry (CA) method was used for the bulk electrolysis and diffusion coefficient measurement.

Kinetic Studies:

The relationship between overpotential ($\eta$) and current density is given by the approximated Butler-Volmer equation near the equilibrium potential (eq. 1).

$$i = i_0 [e^{-\alpha f \eta} - e^{(1-\alpha) f \eta}] \quad \text{(Equation 1)}$$

where $f = nF/(RT)$

Near the equilibrium potential, overpotential $\eta$ is small ($\eta \to 0$). Then, $e^{-\alpha f \eta} \to 1$, $(e^{f \eta} - 1) \to -f\eta$.

And then, $i = i_0 f \eta = [i_0 nF/(RT)] \eta$ (Equation 2)

The slope of $i-\eta$ curve is $i/\eta$ $$i/\eta = i_0 nF/(RT) \quad \text{(Equation 3)}$$

$$\text{And, } i_0 = FAk^0 C_o \quad \text{(Equation 4)}$$

Corresponding parameters of eq. 1~3 are defined as follows: F is Faraday constant (96,485 C/mol), n is the number of electrons involved in the electrode reaction (n=2), i is the electrode current density (mA/cm$^2$), $i_0$ is the exchange current density (mA/cm$^2$) at the equilibrium potential, R is the universal gas constant (8.314 K$^{-1}$ mol$^{-1}$), T is the absolute temperature (300 K), $\eta$ is the overpotential (V), $\alpha$ is the charge transfer coefficient, $C_0$ is the concentration of the electrolyte, and k$^0$ is the electron transfer constant (m/s).

The Cottrell equation (eq. 4) gives the relationship between the current i and time t in a static electrolytic system.

$$i = nFAC_0 D^{1/2}/(\pi t)^{1/2} \quad \text{(Equation 5)}$$

Where, A is the area of the working electrode (glassy carbon, 0.785 mm$^2$), D is the diffusion coefficient (cm$^2$/s), and t is the time (s).

The slope of $i-t^{-1/2}$ curve is $it^{1/2}$, $$it^{1/2} = nFAC_0 D^{1/2} \quad \text{(Equation 6)}$$

Results and Discussion

Figure 5:
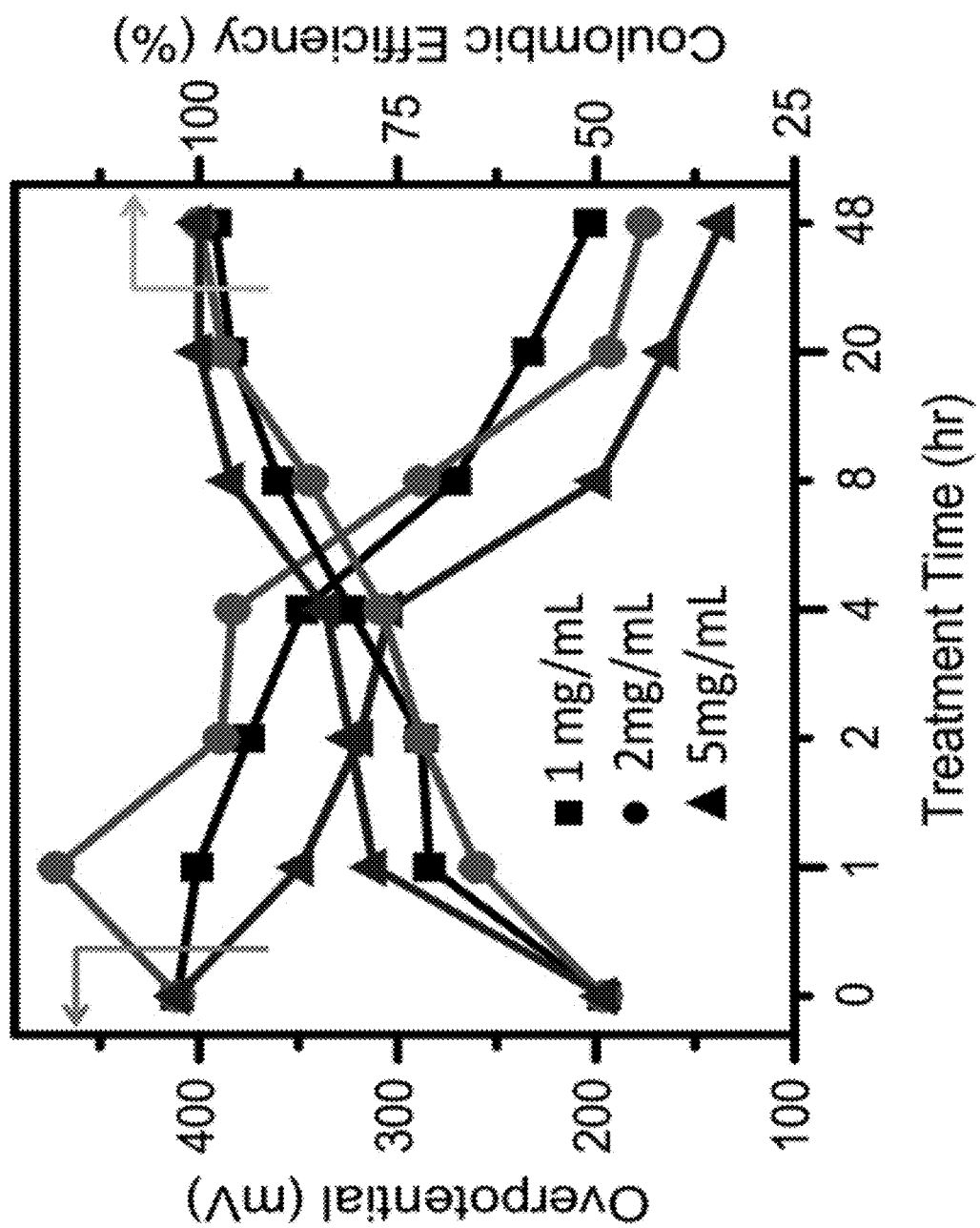
FIG. 5: The overpotential and Coulombic efficiency change of a MACC-THF electrolyte during the treatment with different concentration of Mg powder for different time.
Figure 8:
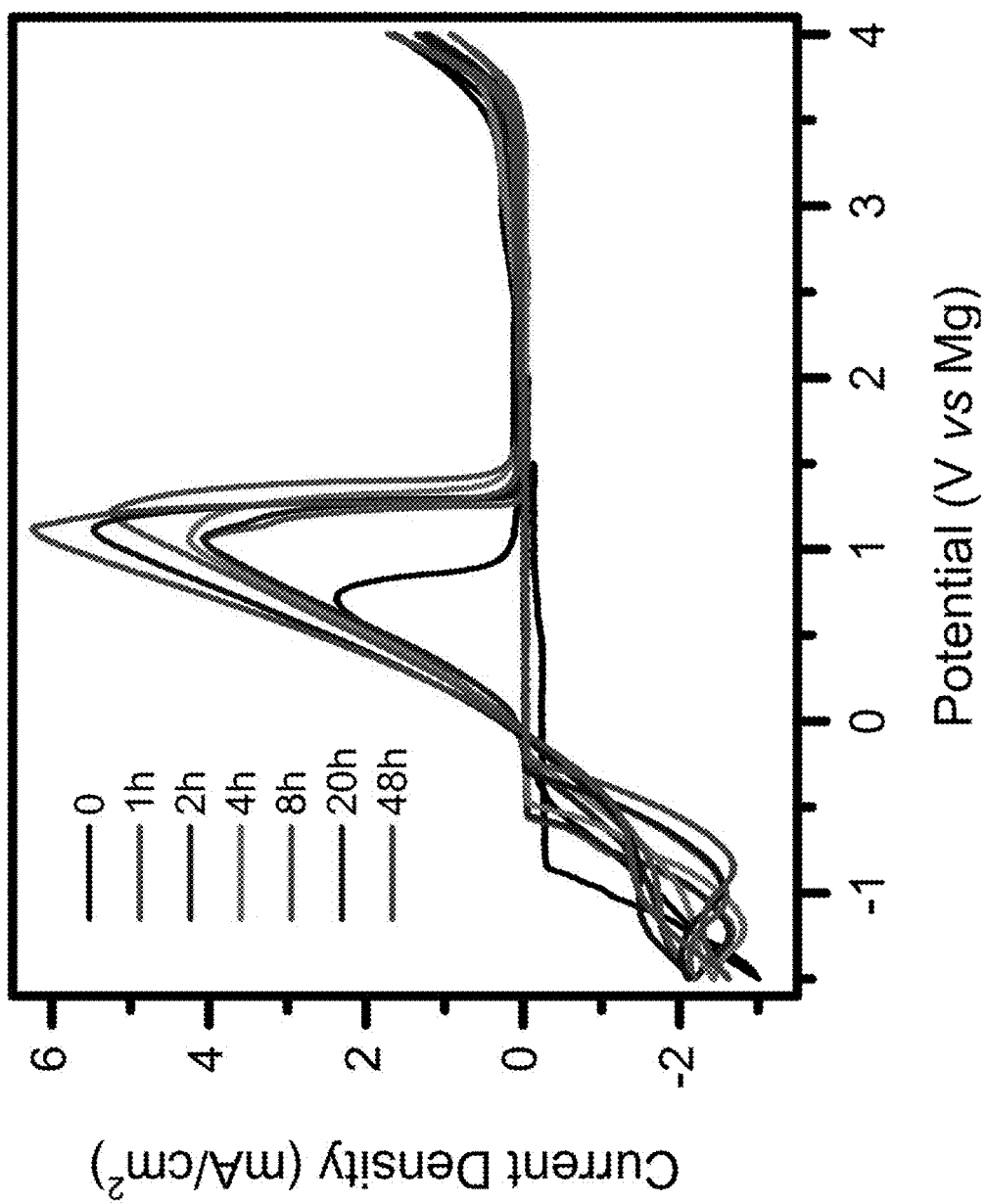
FIG. 8: CV curves of MACC-THF electrolyte with 5.0 mg/mL Mg powder treatment for different time.
Figure 9A:
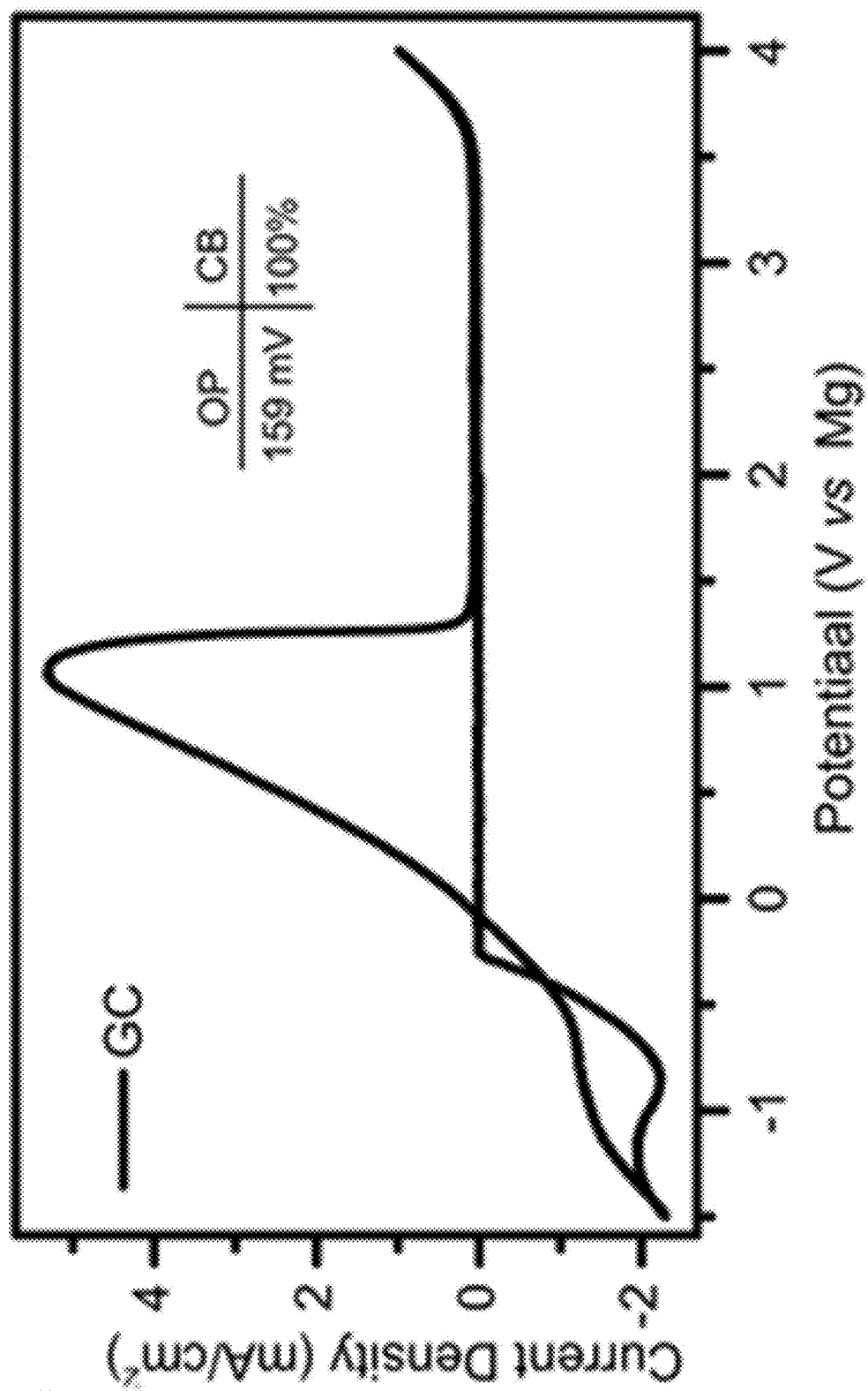
FIG. 9A-FIG. 9D: CV curves of MMAC-THF electrolyte tested by different working electrodes.
Figure 9B:
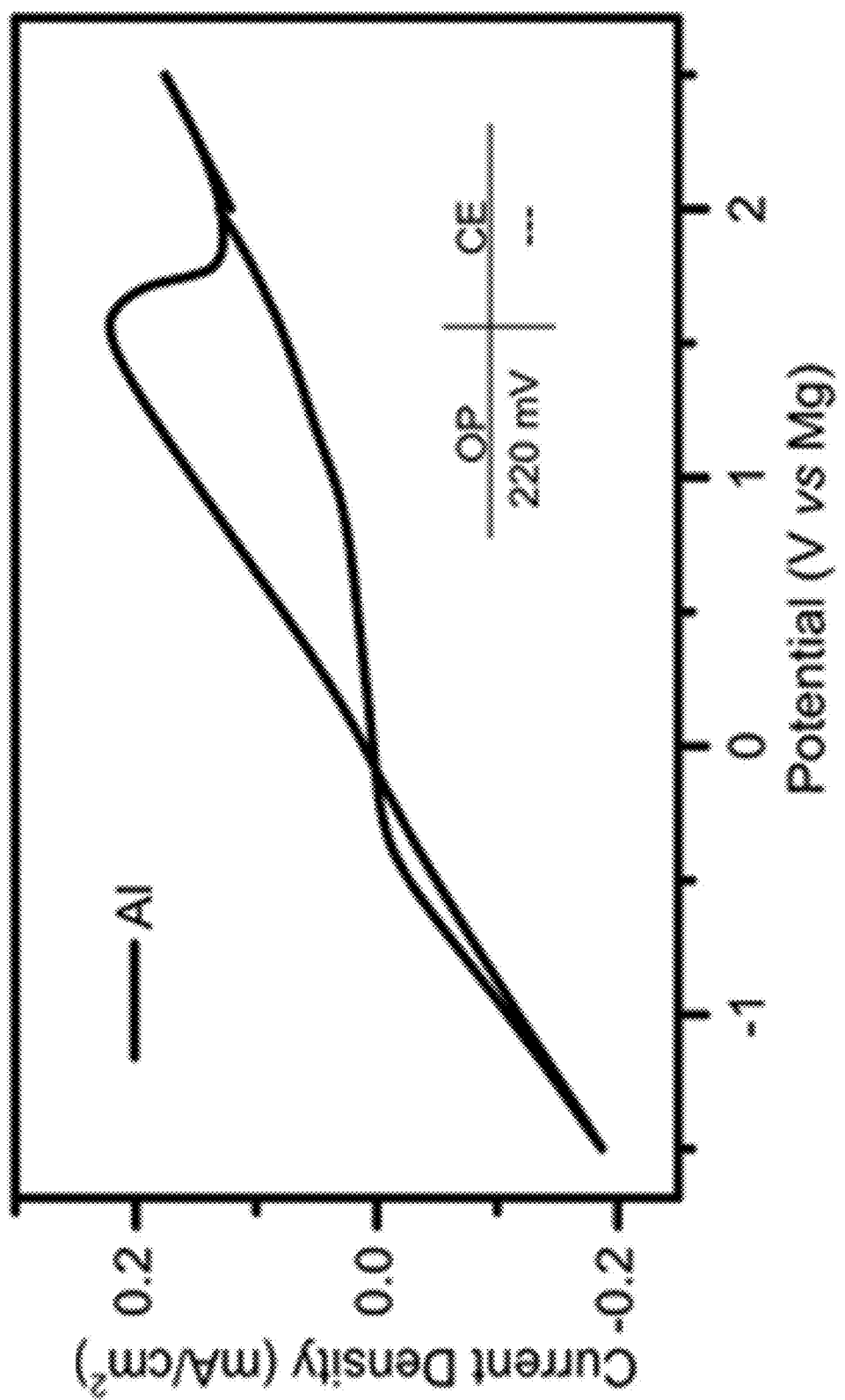
Figure 9C:
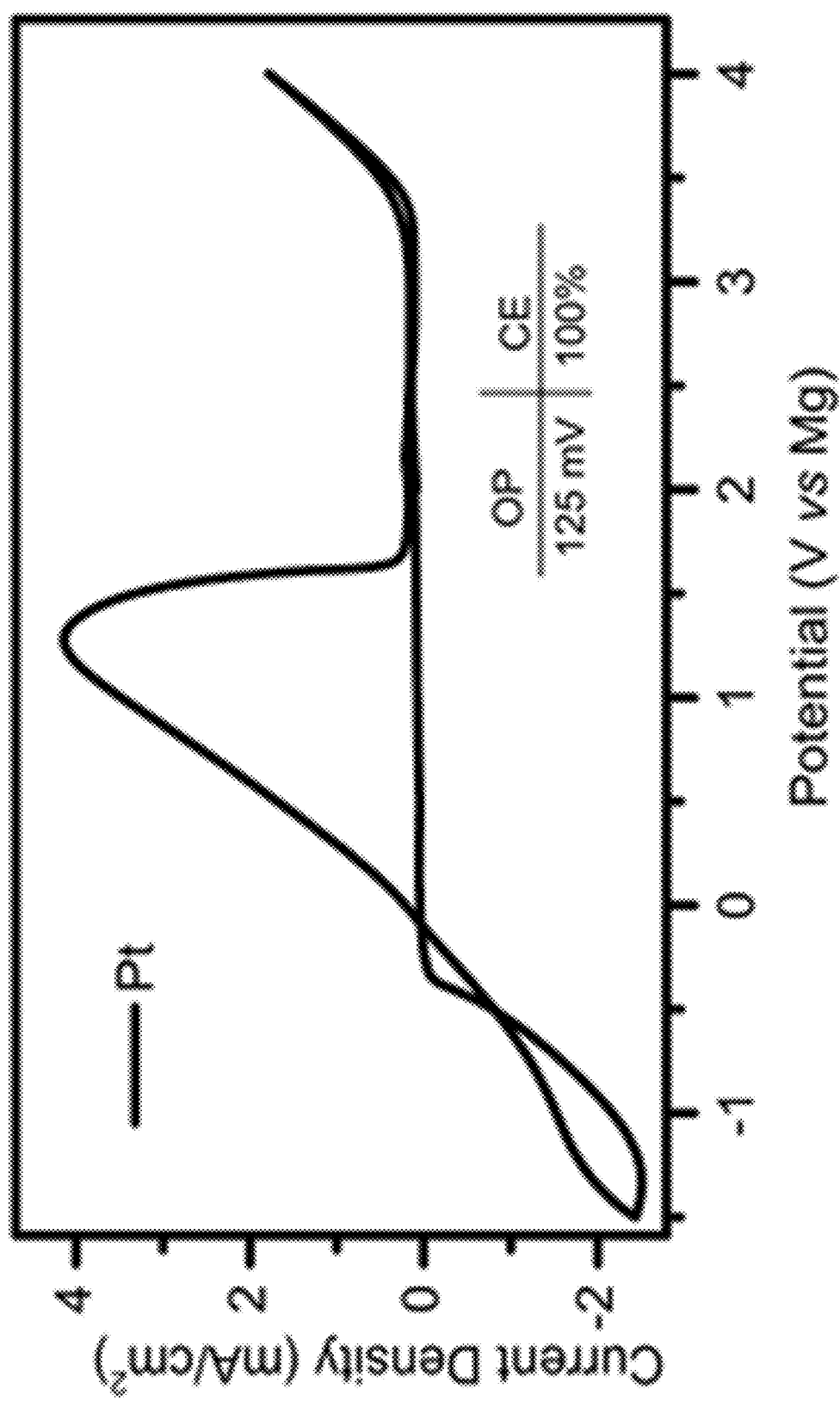
Figure 9D:
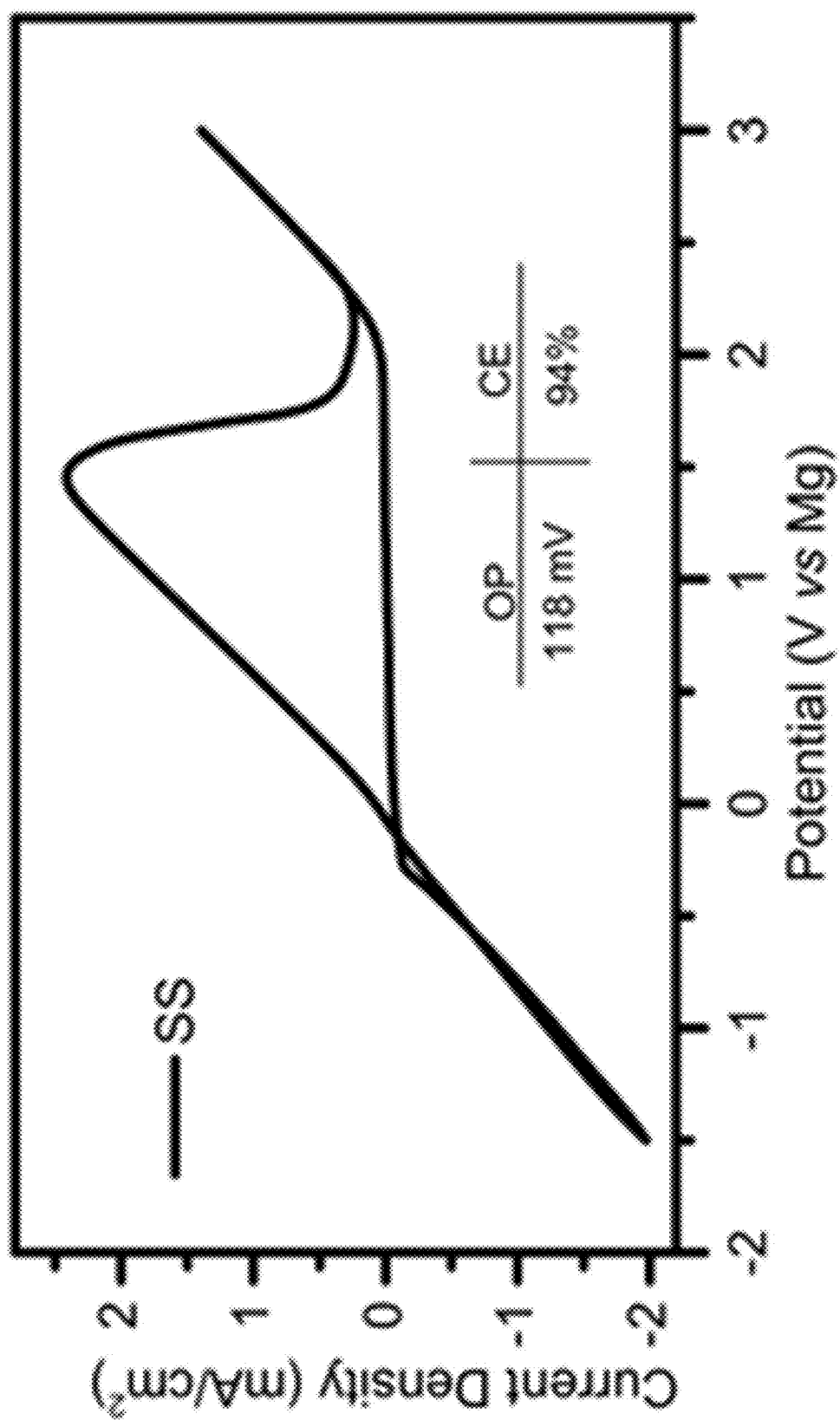
Figure 10A:
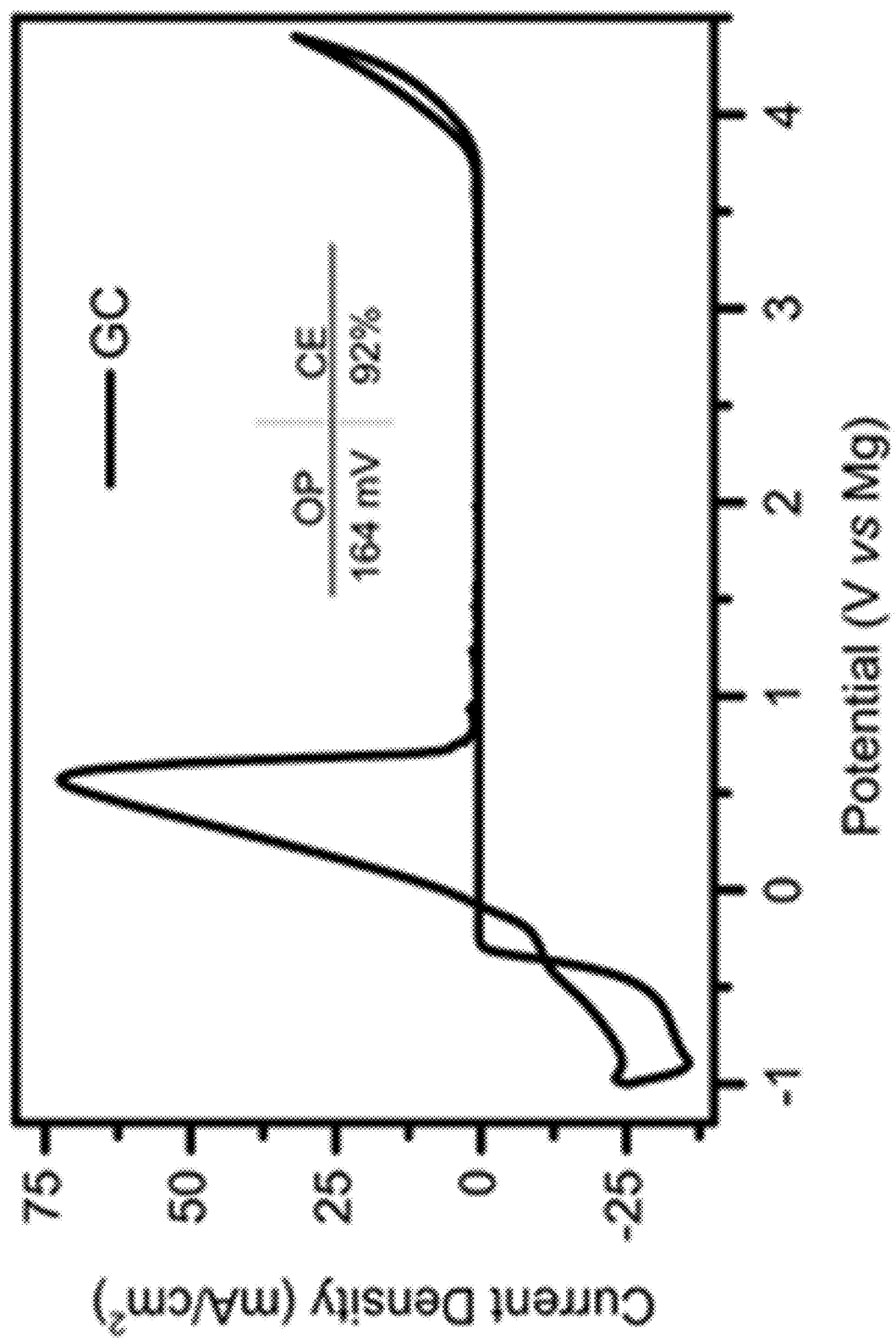
FIG. 10A-FIG. 10D: CV curves of MMAC-DME electrolyte tested by different working electrodes.
Figure 10B:
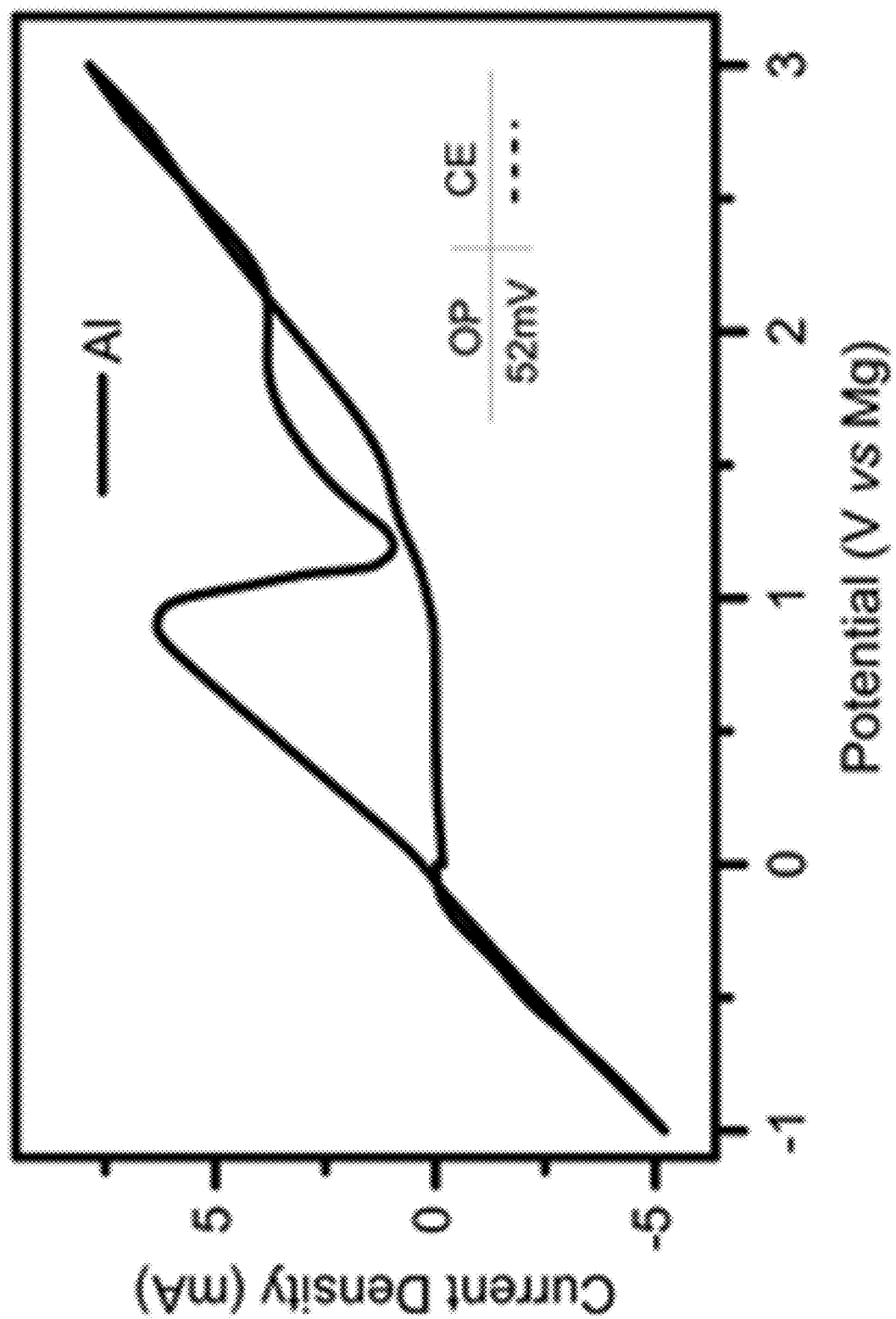
Figure 10C:
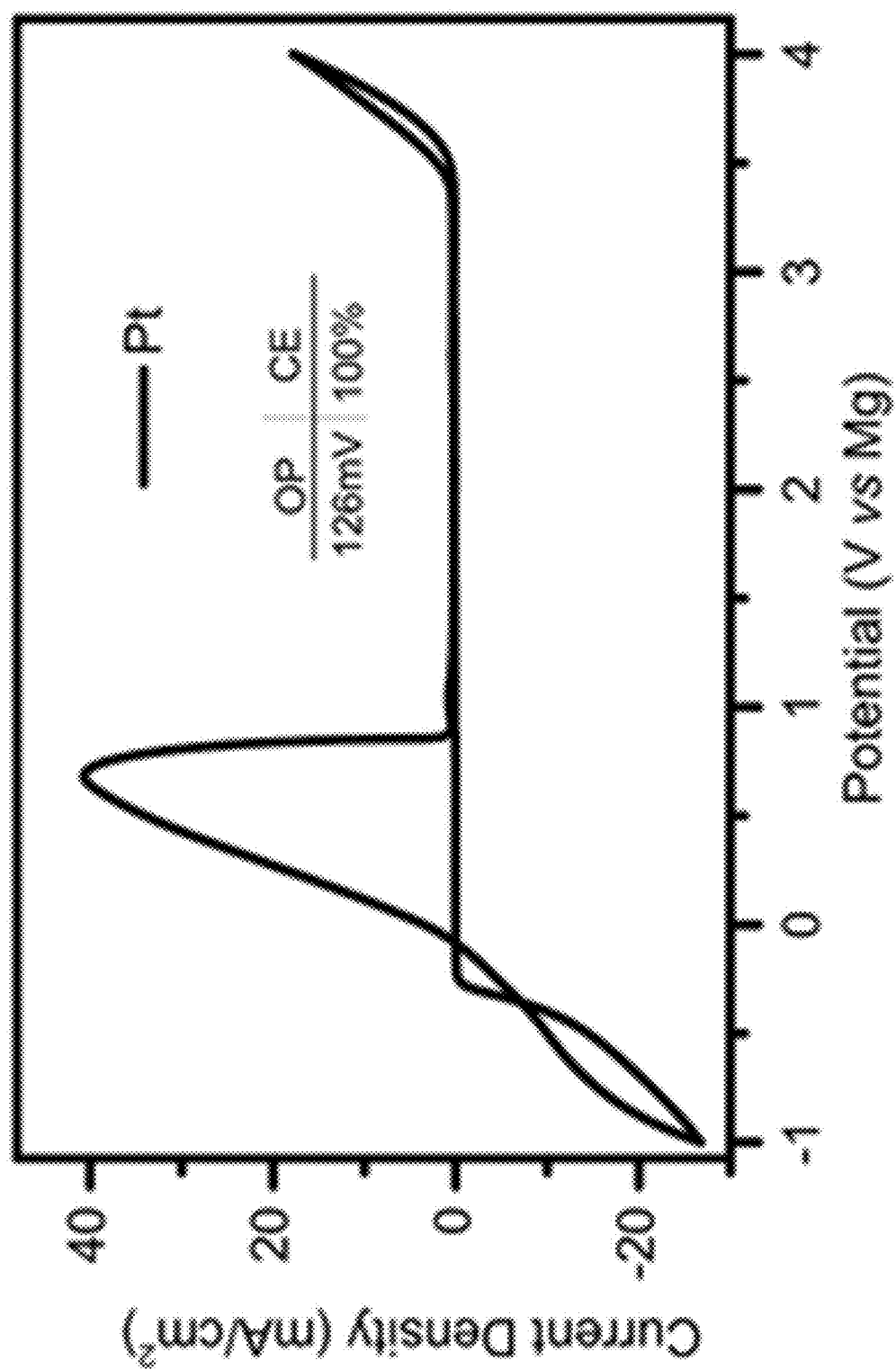
Figure 10D:
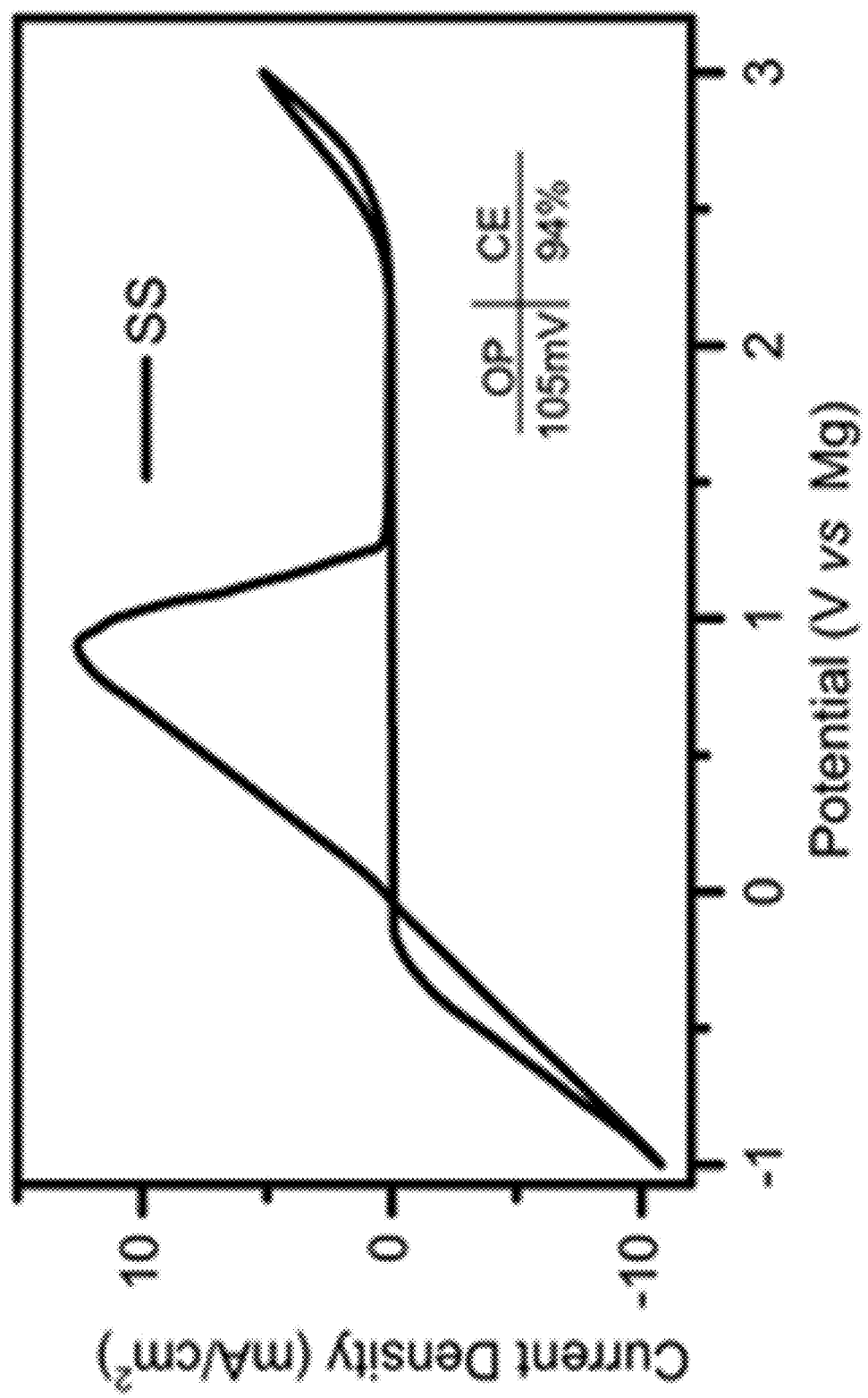
Figure 11A:
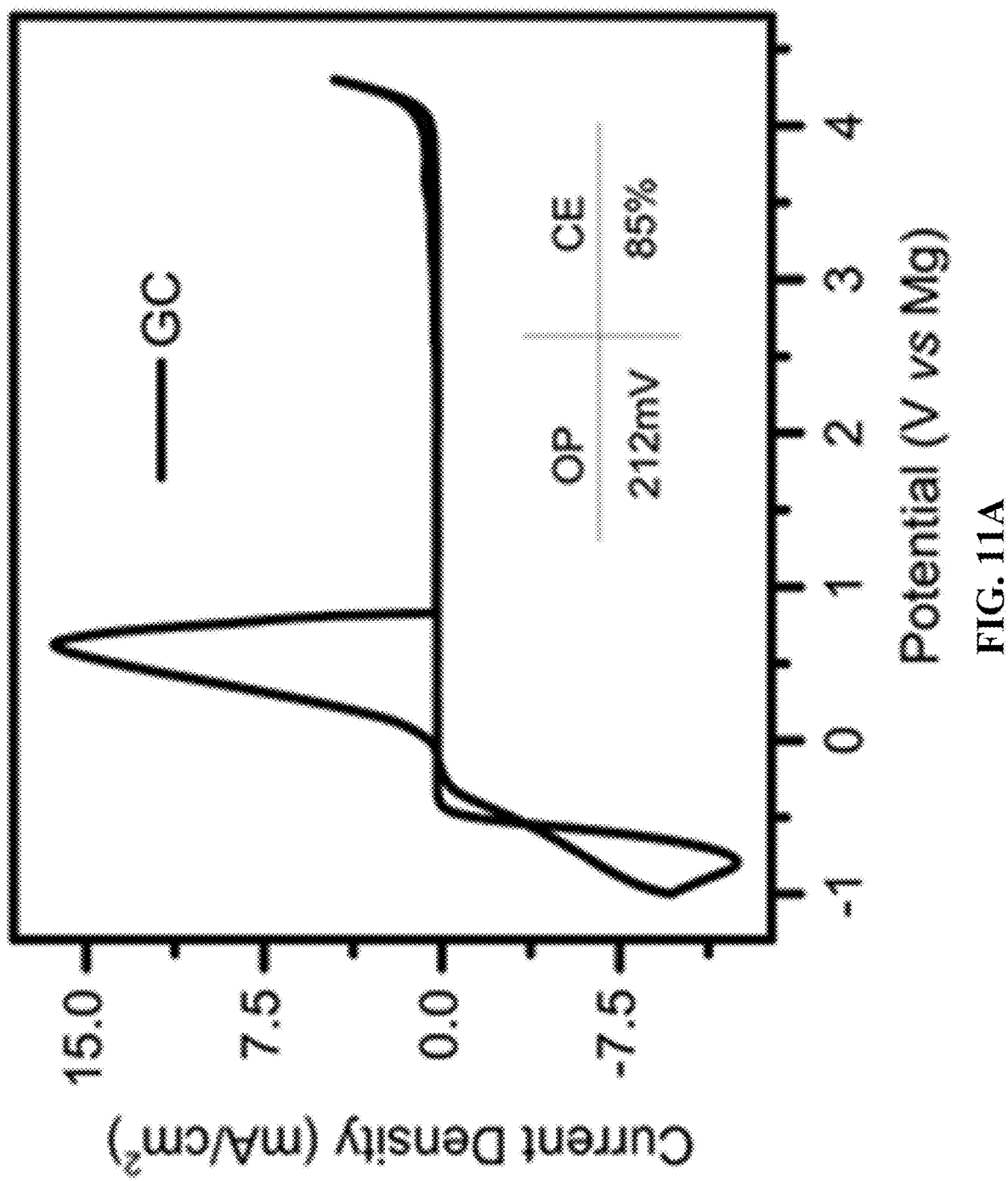
FIG. 11A-FIG. 11D: CV curves of MMAC-DMG electrolyte tested by different working electrodes.
Figure 11B:
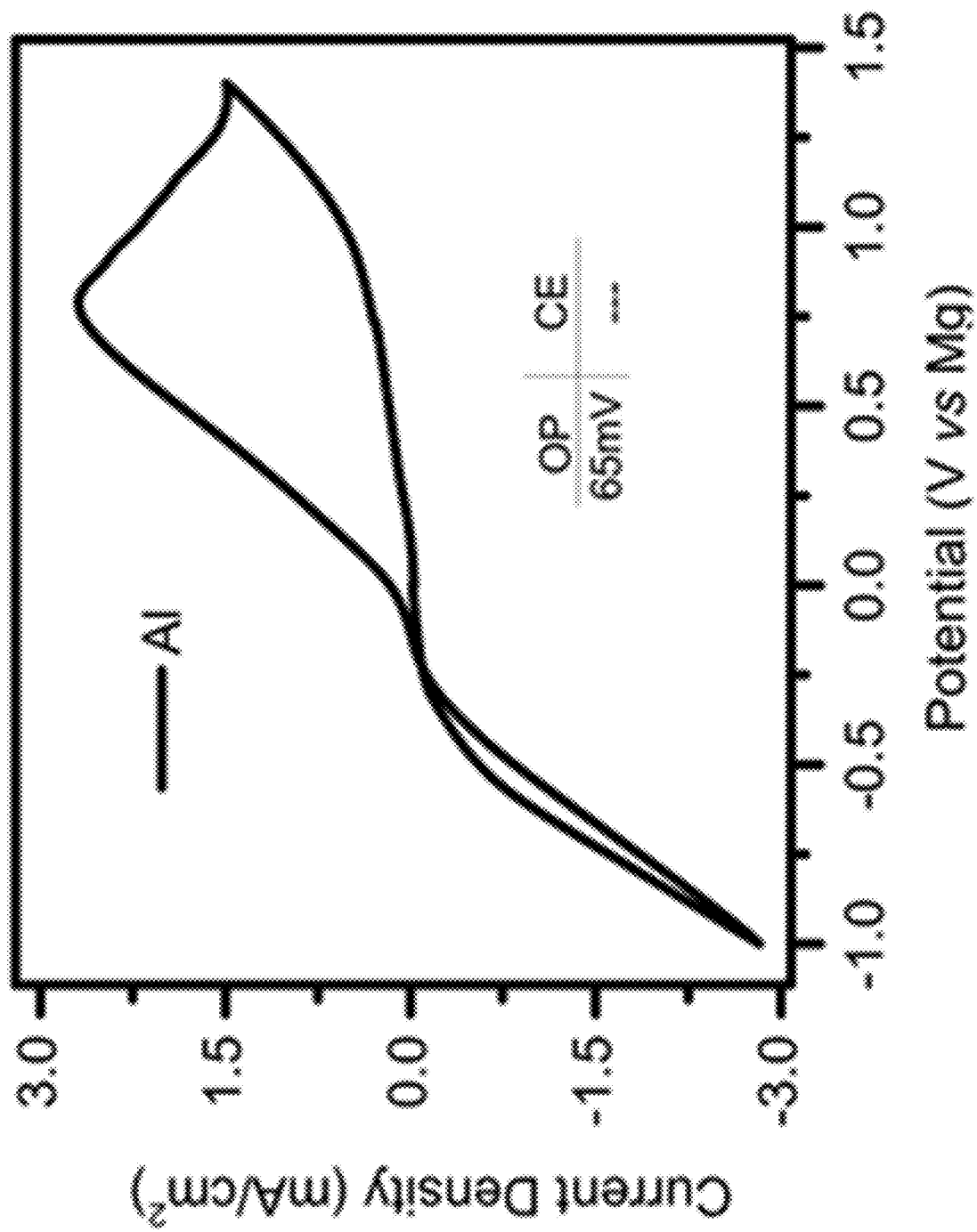
Figure 11C:
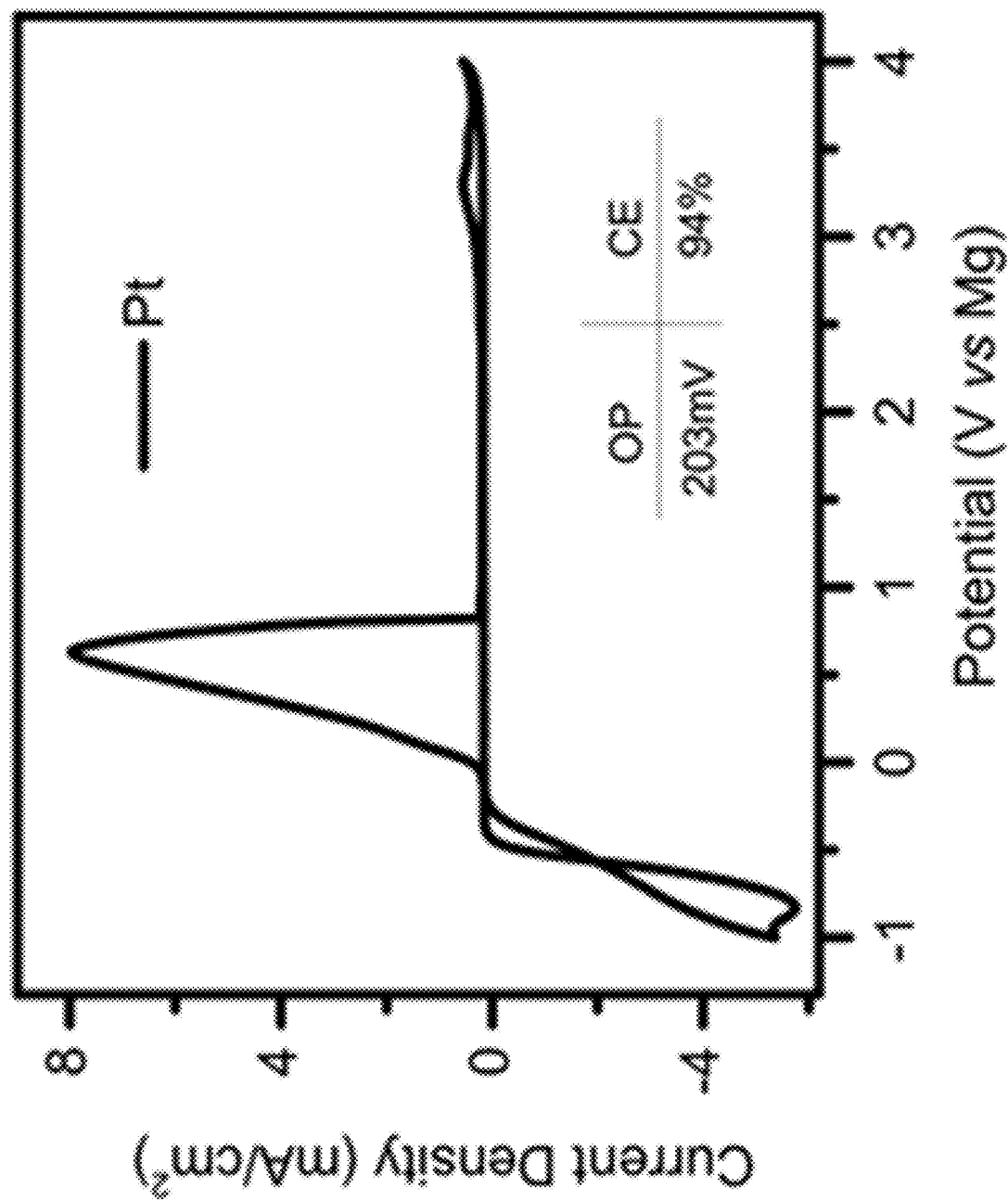
Figure 11D:
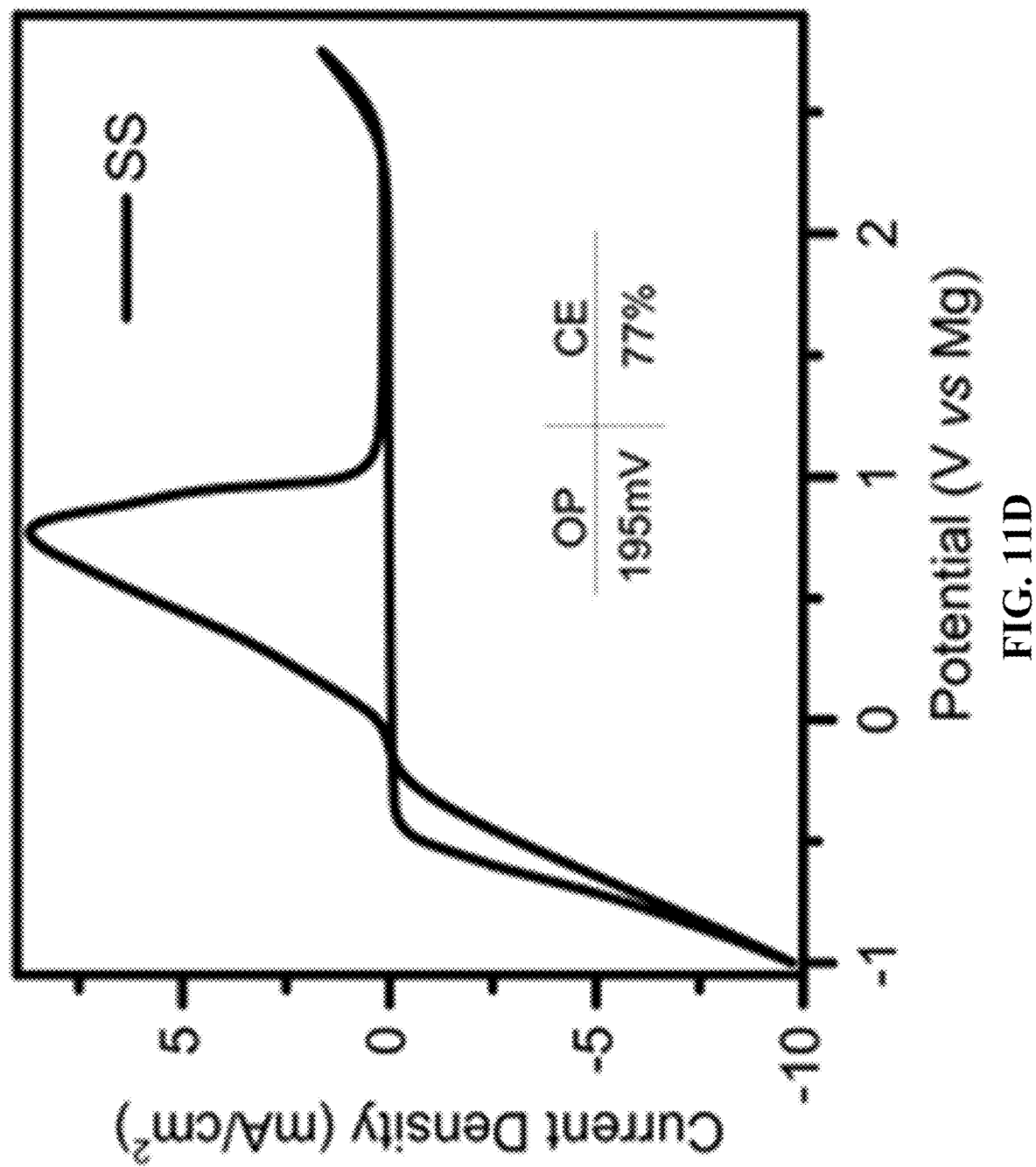
Figure 12:
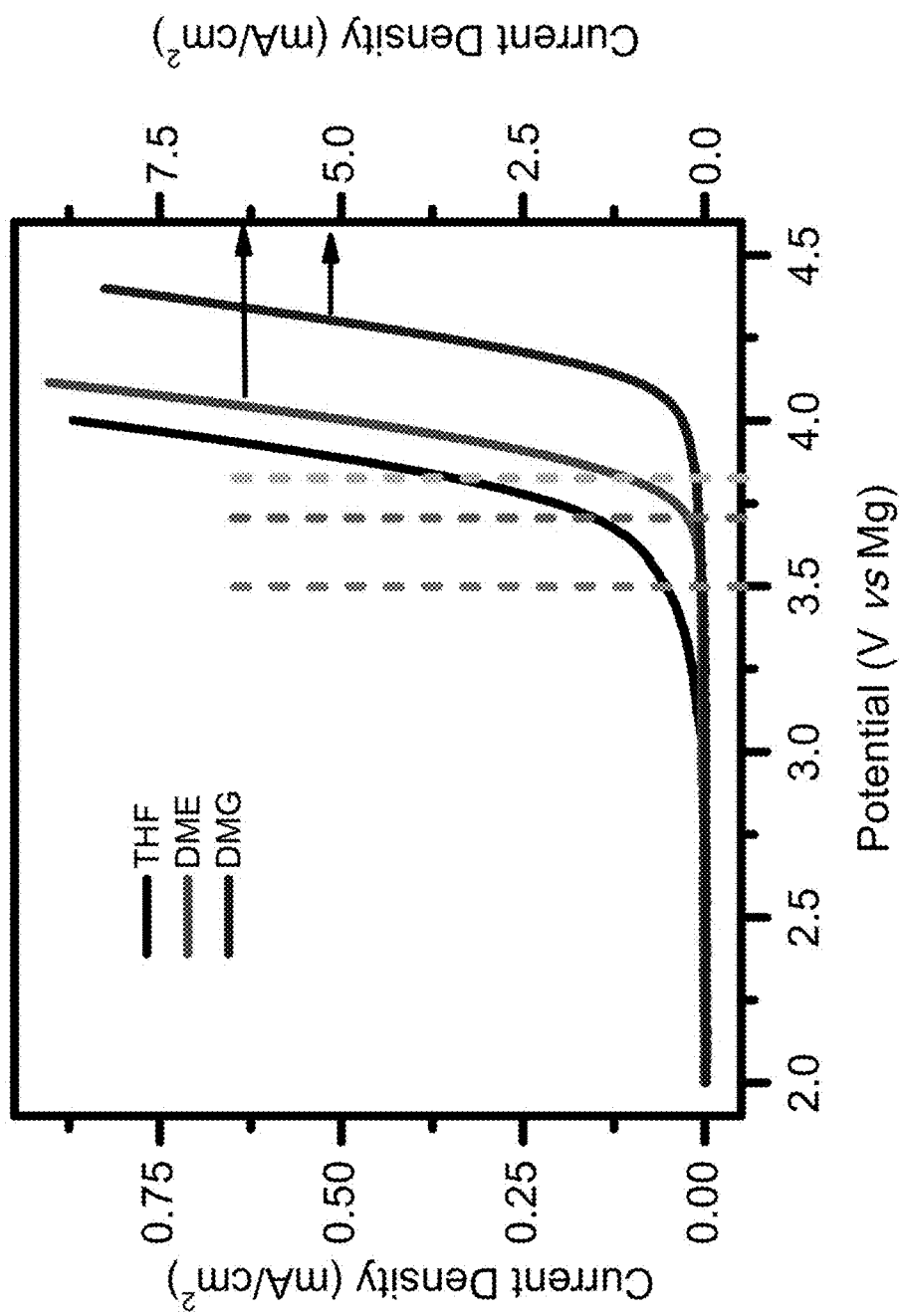
FIG. 12: LSV curves of MMAC electrolytes in different solvent tested by glassy carbon working electrode.
Figure 13:
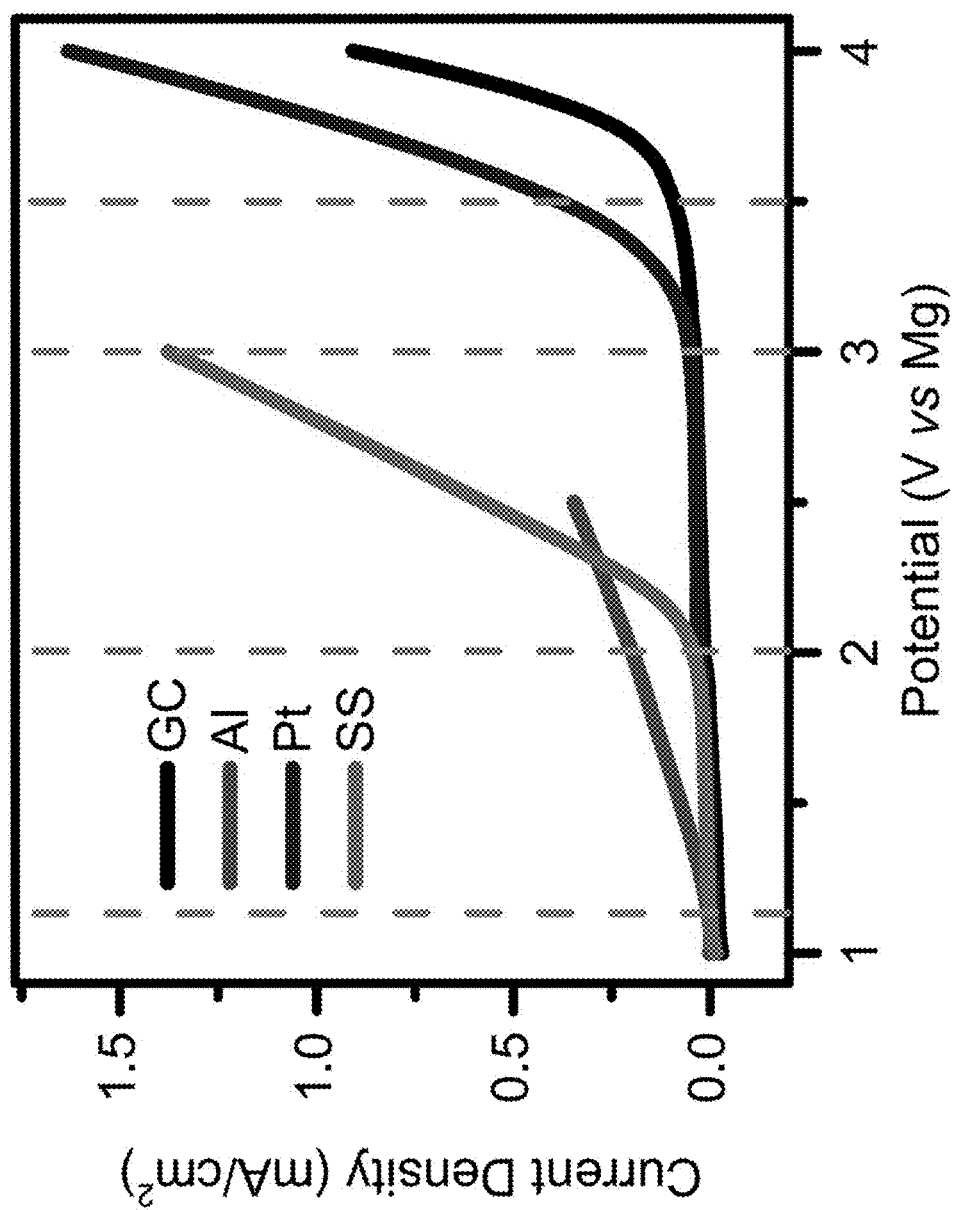
FIG. 13: LSV curves of MMAC-THF electrolyte tested by different working electrodes.
Figure 14:
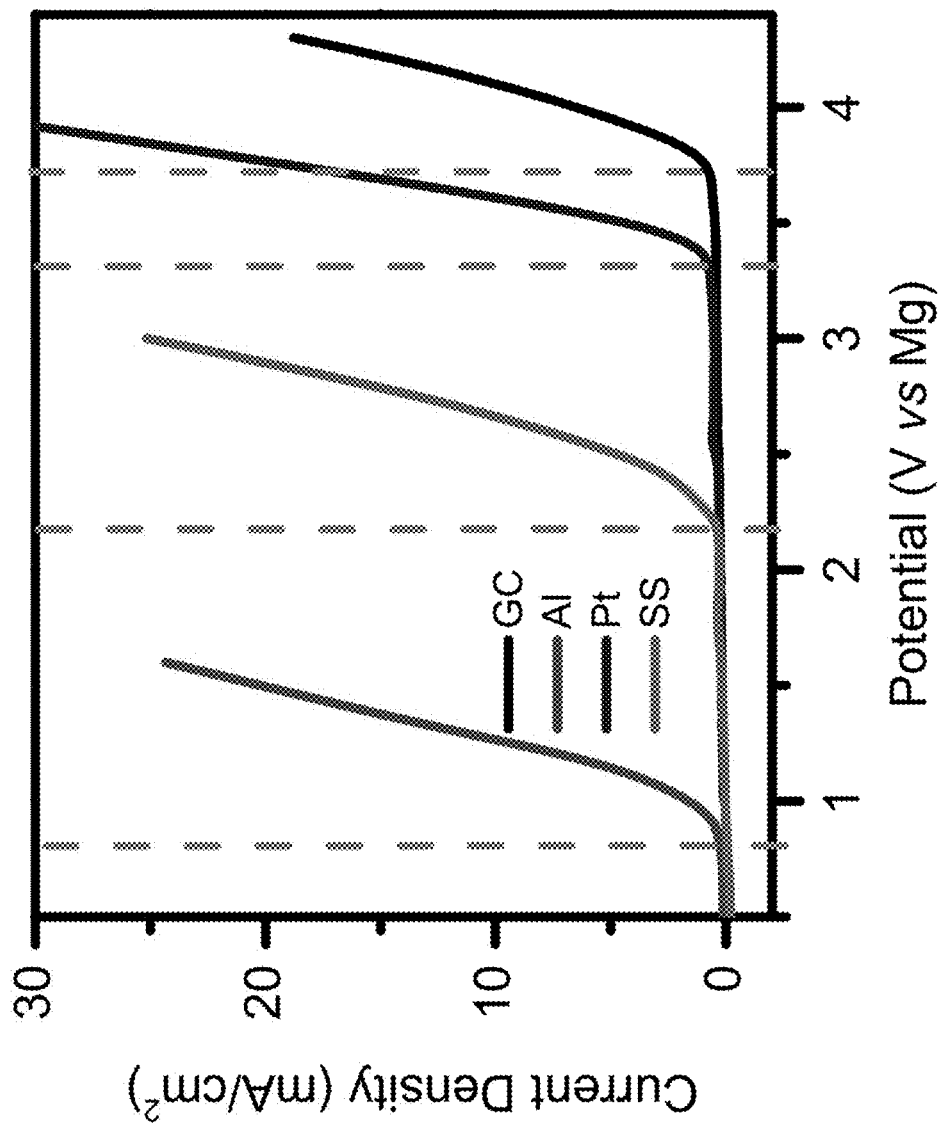
FIG. 14: LSV curves of MMAC-DME electrolyte tested by different working electrodes.
Figure 15:
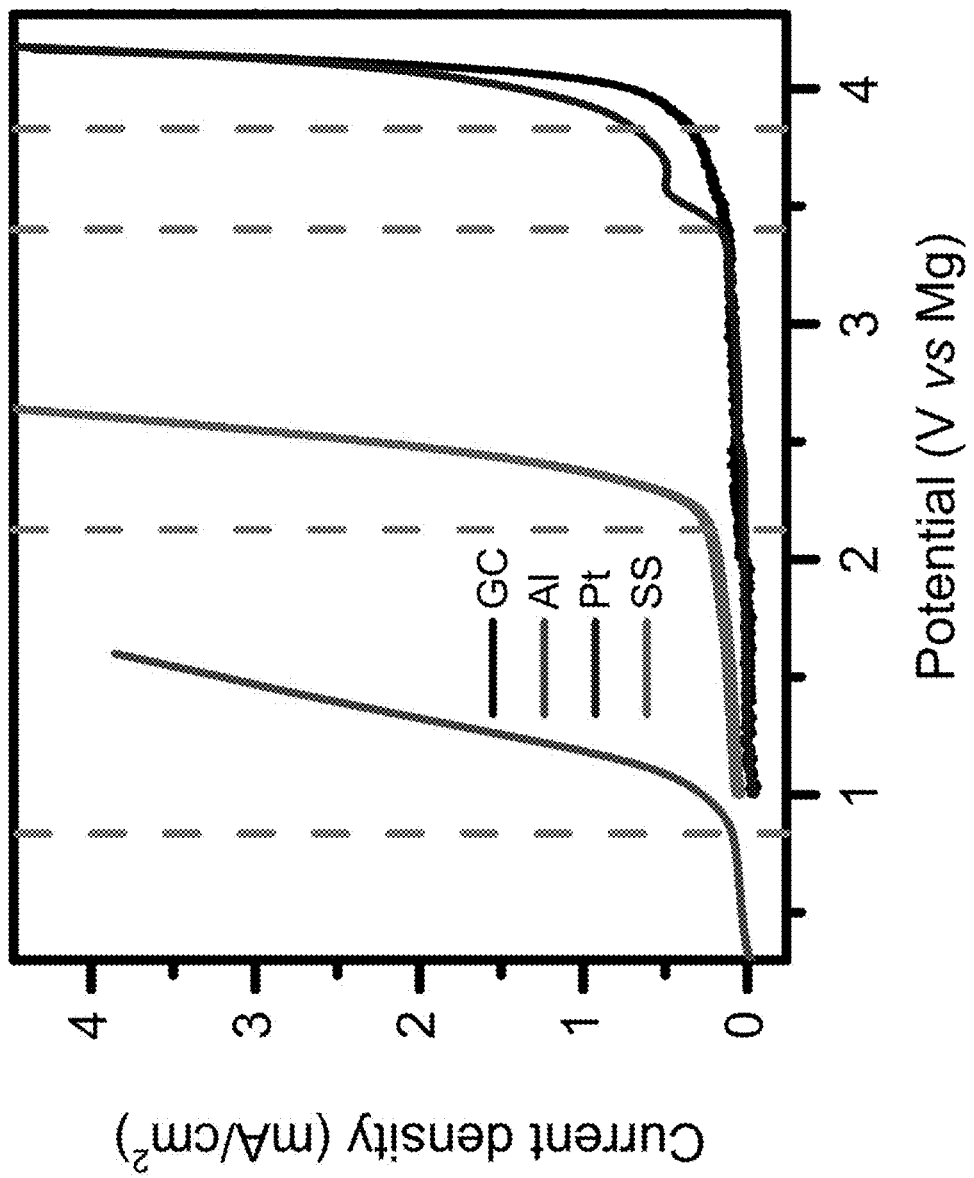
FIG. 15: LSV curves of MMAC-DMG electrolyte tested by different working electrodes.

Preparing high performance MgCl$_2$/AlCl$_3$ electrolyte in THF (MACC-THF) is more challenging than in other organic solvents. First, because of the limited solubility of MgCl$_2$ in THF (usually <0.06 M), a tiny amount of impurity such as H$_2$O can significantly affect the stability and reversibility of the electrolyte. Secondly, the ring-opening polymerization of THF catalyzed by the Lewis acid is another factor that can affect the reversibility of a MACC-THF electrolyte. We hypothesized that reductive Mg powder could function as a scavenger to remove deleterious species present in the reaction of preparing a MgCl$_2$/ACl$_3$-THF electrolyte (MACC-THF). Explorative studies revealed that the MACC-THF electrolyte (0.04 mol/L MgCl$_2$ and 0.02 mol/L AlCl$_3$) with Mg post treatment could significantly improve its electrochemical performance. After 20 hrs of Mg powder treatment (loading at 5.0 mg/mL Mg), 0.263 V (vs Mg) plating onset potential, 165 mV overpotential, and 100% Coulombic efficiency were obtained in comparison to plating onset potential at −0.801 V vs Mg, the overpotential of 411 mV, 49% Coulombic efficiency for untreated MACC-THF electrolyte (FIGS. 1A, 5 and 8).

Figure 6:
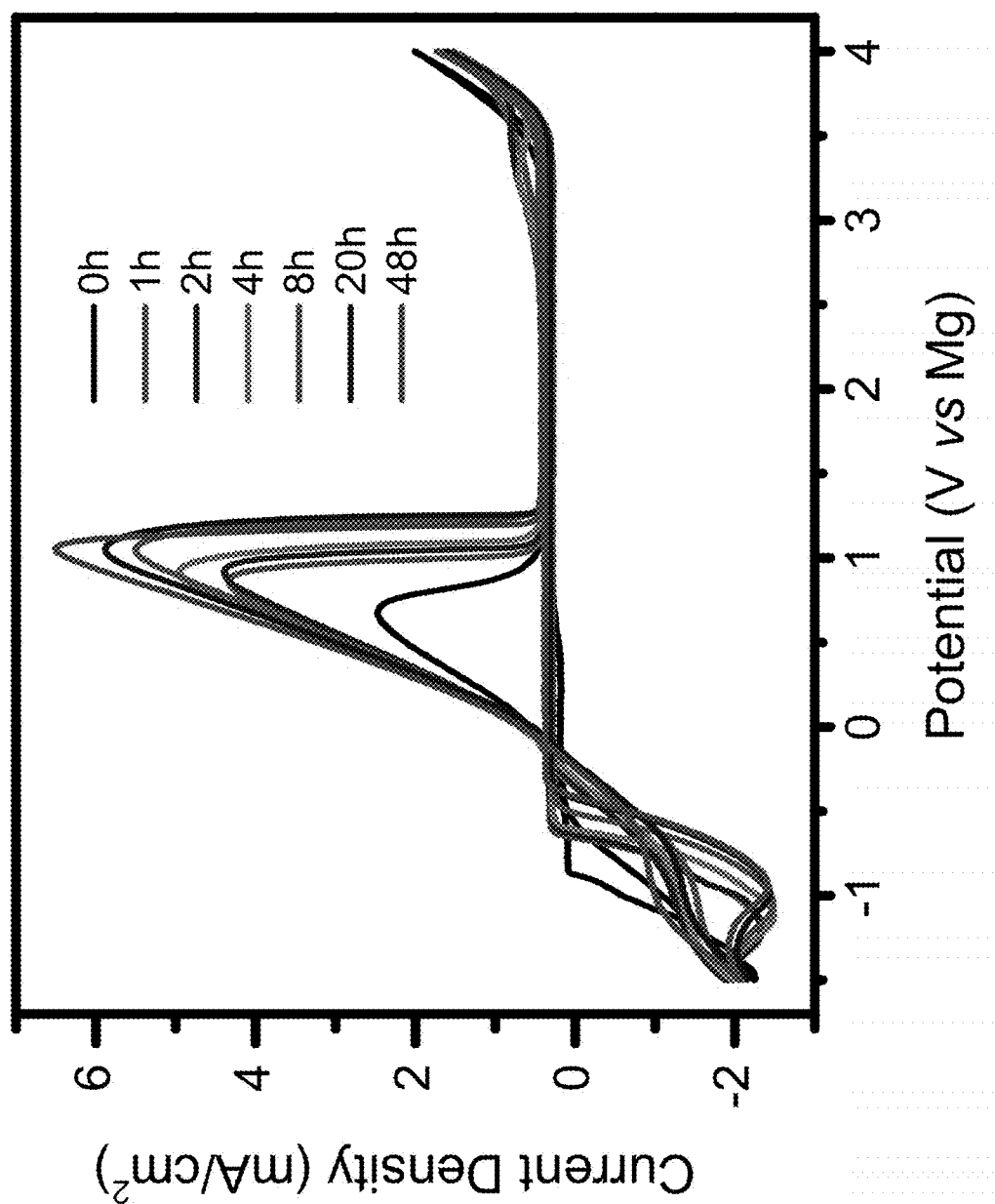
FIG. 6: CV curves of MACC-THF electrolyte with 1.0 mg/mL Mg powder treatment for different time.
Figure 7:
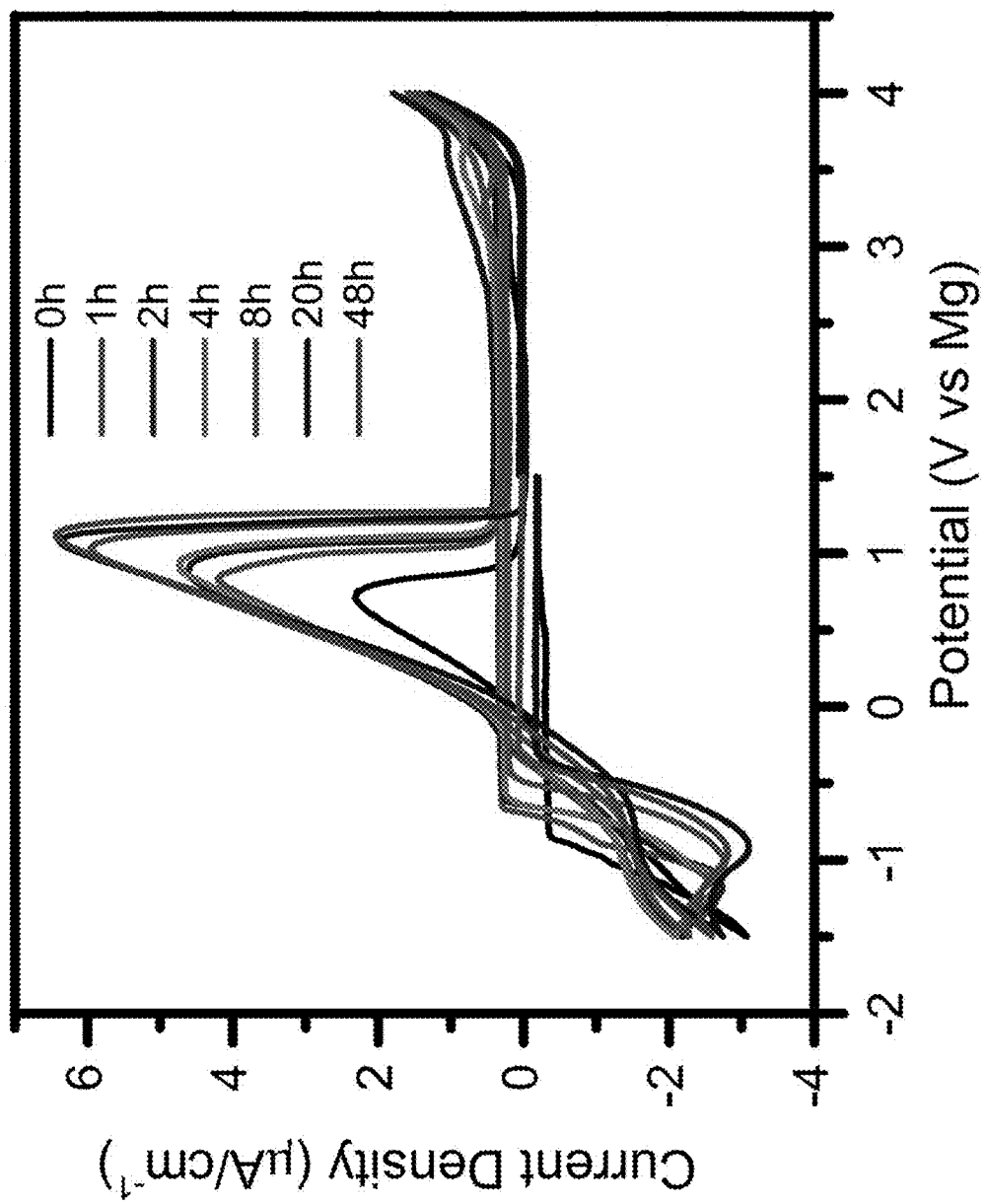
FIG. 7: CV curves of MACC-THF electrolyte with 2.0 mg/mL Mg powder treatment for different time.

In particular, we studied how the electrochemical performance of the MACC-THF electrolyte was improved by adding Mg powder. As shown in FIG. 5, the MACC-THF electrolyte was treated with 1.0, 2.0, and 5.0 mg/mL of Mg powder (~1 eq., 2 eq., and 5 eq. vs. MgCl$_2$), respectively. The upgraded electrolyte was named MMAC-THF electrolyte. The CV curves were recorded with glassy carbon as the working electrode, carbon rod as the counter electrode, and Mg strip as the reference electrode at different treatment time. It is clear that the Mg deposition onset potential, overpotential, and Coulombic efficiency of the electrolytes were significantly improved after treating with Mg powder (FIG. 6-8). During the first 8 hours, there is not an obvious advantage from increasing the Mg powder concentration from 1.0 mg/mL to 2.0 mg/mL, however, after 48 hrs. treatment of 2.0 mg/mL Mg powder, the Mg deposition onset potential was shifted from −0.801 V to −0.256 V vs Mg, the overpotential was decreased from 411 mV to 176 mV, and the Coulombic efficiency was increased from 49% to 100% (FIG. 7). Further increasing the Mg powder concentration to 5.0 mg/mL, the performance improvement of the electrolyte was much faster. After 20 hrs., a −0.263 V (vs Mg) deposition onset potential, 165 mV overpotential, and 100% Coulombic efficiency were obtained (FIG. 8). To our surprise, when the treatment time was extended to 48 hrs., the Mg deposition onset potential was shifted to −0.200 V vs Mg and the overpotential was dropped to 137 mV with 100% Coulombic efficiency (FIG. 8). To the best of our knowledge, the newly invented MMAC-THF electrolyte demonstrated the smallest overpotential compared to previously reported MACC-THF electrolytes. Based on the electrochemical data of different Mg powder concentration and treatment time, 5.0 mg/mL Mg powder treatment at room temperature for 20 hrs. was adopted as the bench-mark condition to prepare MMAC electrolytes in one-pot reactions.

Figure 1B:
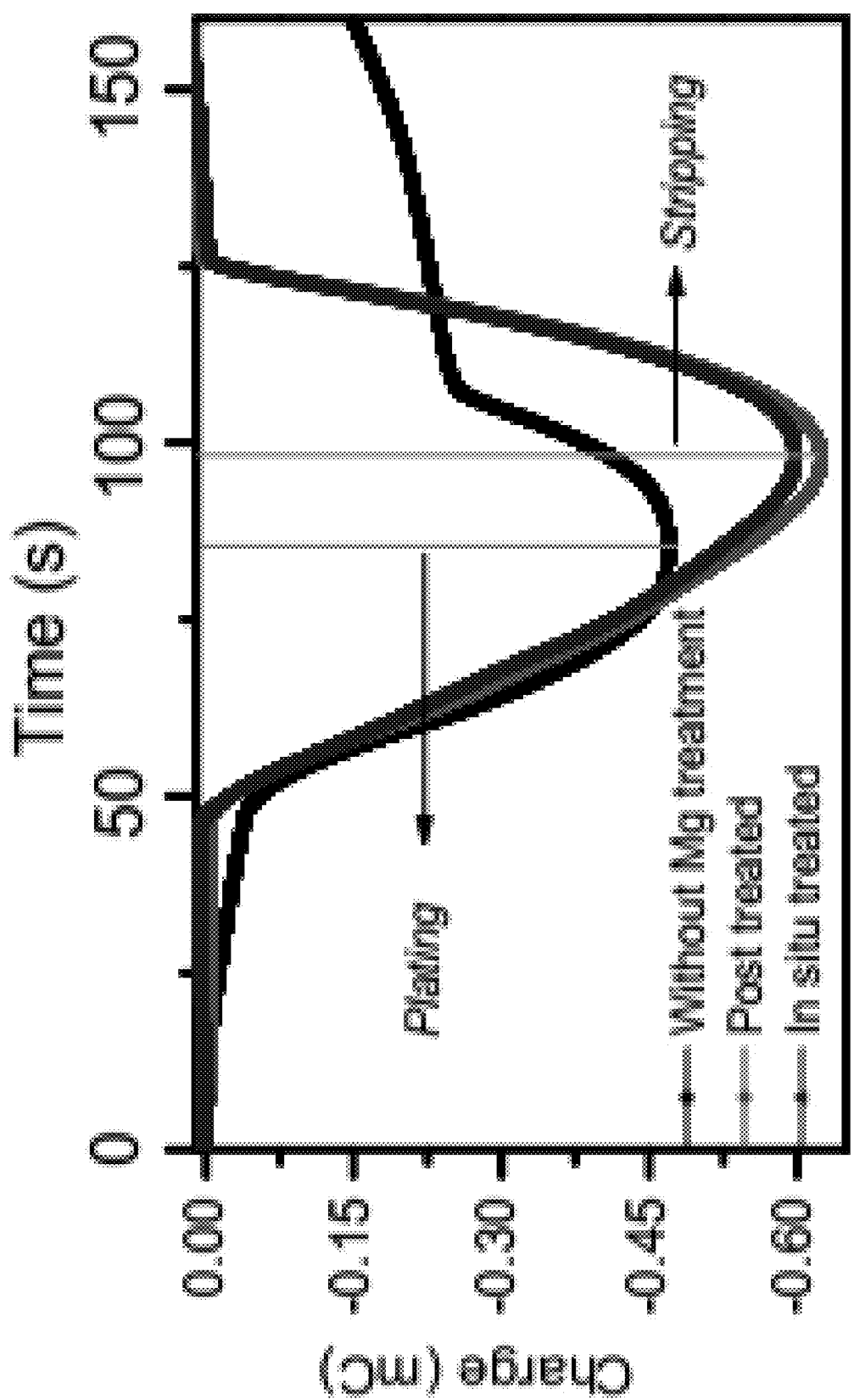
Figure 1C:
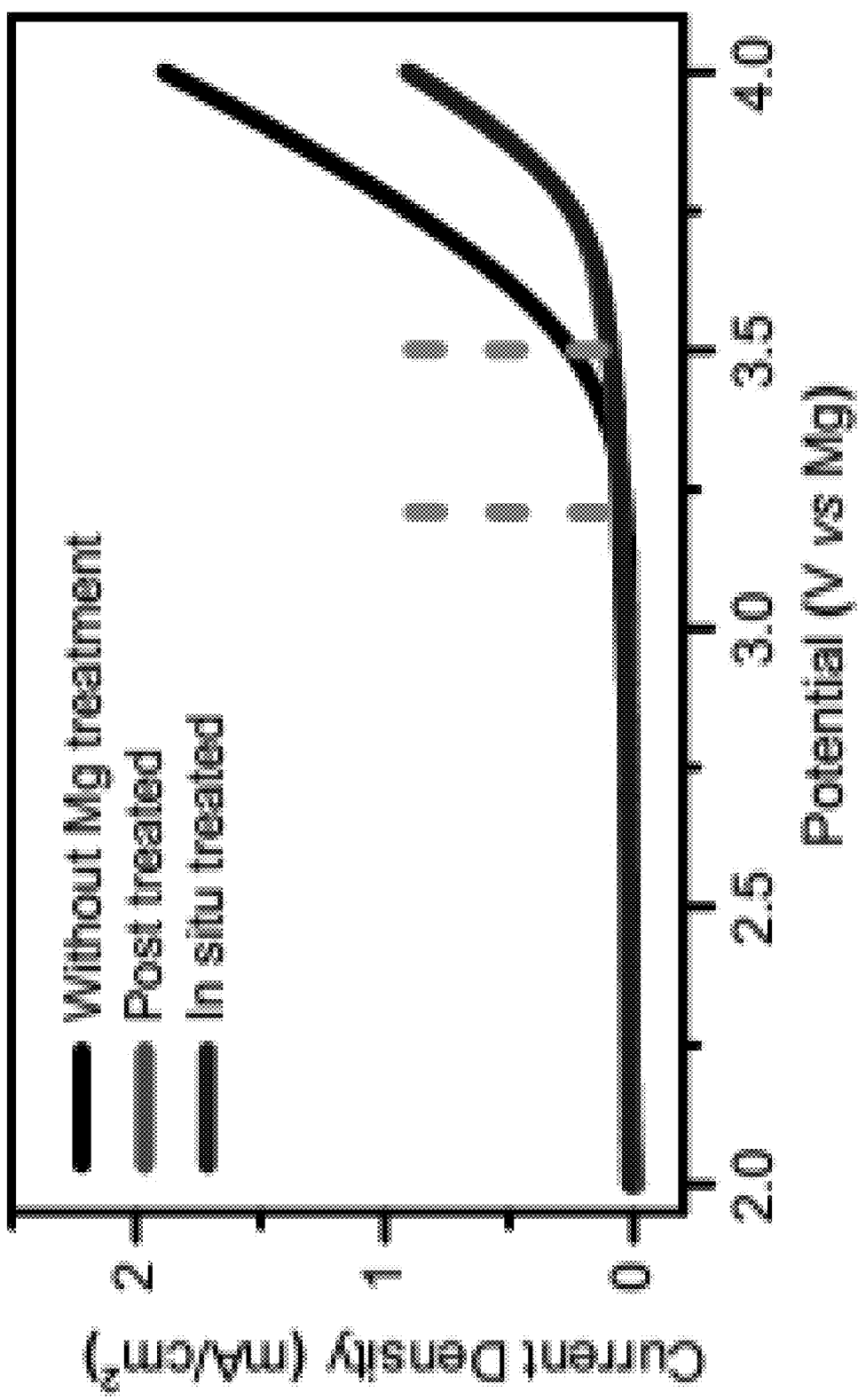
Figure 1D:
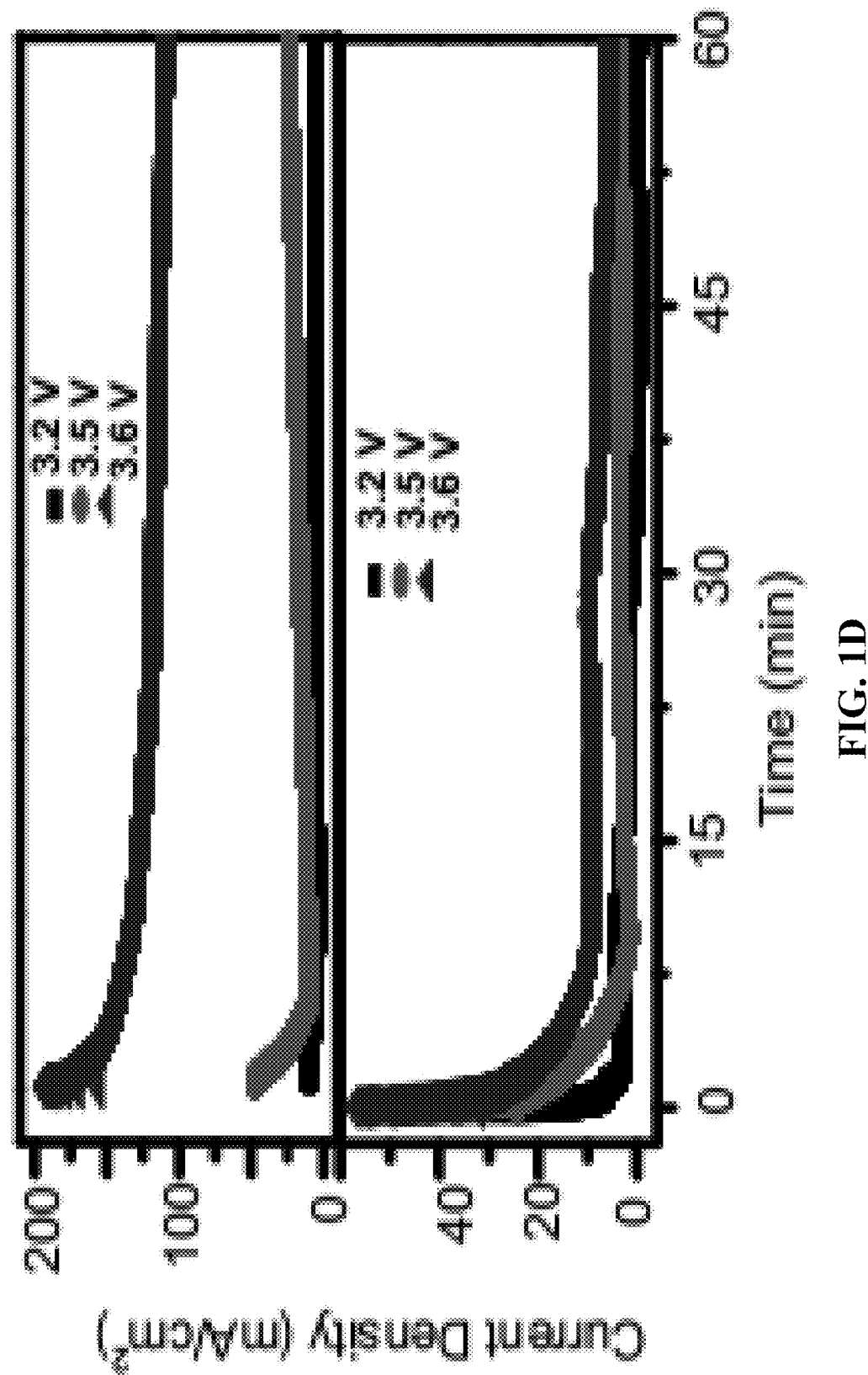

Encouraged by the above results, then three-component electrolyte, Mg/MgCl$_2$/AlCl$_3$-THF electrolyte (abbreviated as MMAC-THF) was directly prepared by mixing 5.0 mg/mL Mg together with MgCl$_2$ (80 μmol) and AlCl$_3$ (40 μmol) in 2.0 mL distilled THF. The Mg powder was removed by filtration; no further purification was needed. As shown in FIG. 1A, after stirring at room temperature for 20 hr., the MMAC-THF electrolyte displayed excellent reversibility and stability. The overpotential of the MMAC electrolyte yielded by in situ Mg treatment was even slightly smaller than that of the post treated one (159 mV for in situ treated one and 165 mV for post treated one). In FIG. 1B, the plots of the charge (including both plating and stripping) over time are shown for MACC-THF (black), post treated (red) and in situ treated (blue) MMAC-THF electrolytes. The equivalent charges of plating and stripping processes for the MMAC-THF electrolytes (red and blue curve) indicate that the Coulombic efficiency of Mg$^{2+}$ plating/stripping for these MMAC-THF electrolytes is nearly 100%. In addition, the stripping process exhibited faster kinetics than the corresponding plating process, e.g. in the case of the in situ treated MMAC-THF electrolyte, 1.1 and 2.32 mC/s for plating and stripping, respectively. Note that the anodic oxidation waves of the electrolytes, at which the oxidation current density is <0.5% of the peak current density, are observed at approximately 3.5 V vs. Mg for the MMAC-THF electrolytes (see the inset in FIG. 1A). An LSV test was used to further examine the anodic stability of each electrolyte with glassy carbon working electrode (FIG. 1C). The LSV curve of post treated and in situ treated MMAC-THF electrolytes were overlapped. The LSV result displayed a 0.3 V improvement of the anodic stability through Mg powder treatment (3.2 V for MACC-THF and 3.5 V for MMAC-THF). Both the CV and LSV measurements indicated the improvement of anodic stability for the electrolytes after the Mg powder treatment. The anodic stability of the MMAC-THF electrolyte was further studied by the bulk electrolysis. As shown in FIG. 1D, we first set up an electrolysis potential at 3.2 V, at which only non-Faradic background current was observed. When electrolysis potential was shifted to 3.5 V and 3.6 V, the stabilized current density was slightly increased to 17 μA/cm² and 51.7 μA/cm² for the in situ treated MMAC-THF electrolyte (FIG. 1D, lower). However, for the untreated MACC-THF electrolyte, the stabilized current density was 25 μA/cm² and 114 μA/cm² under 3.5 V and 3.6 V, respectively (FIG. 1D, upper).

Figure 2A:
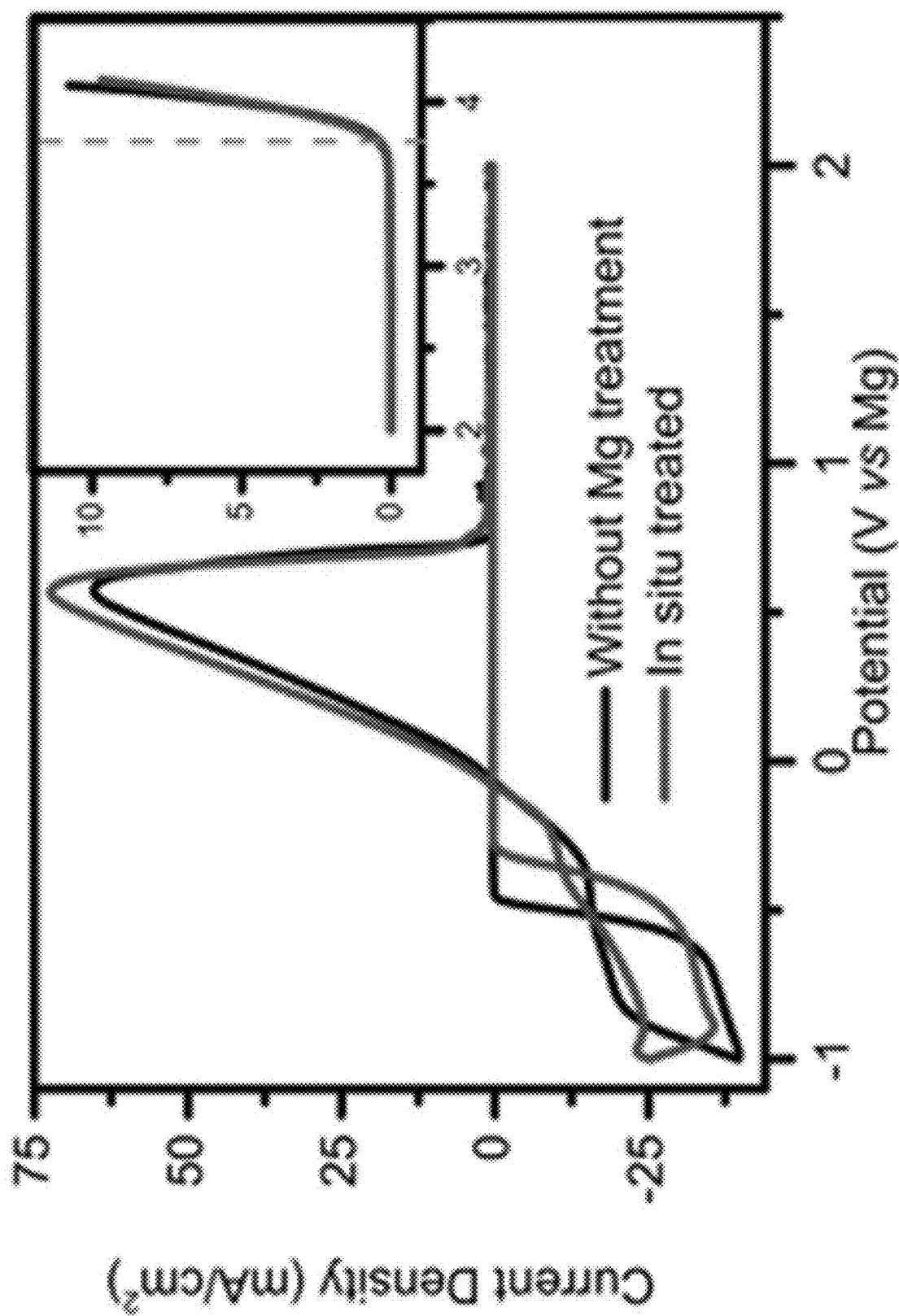
FIG. 2A-FIG. 2D.
Figure 2B:
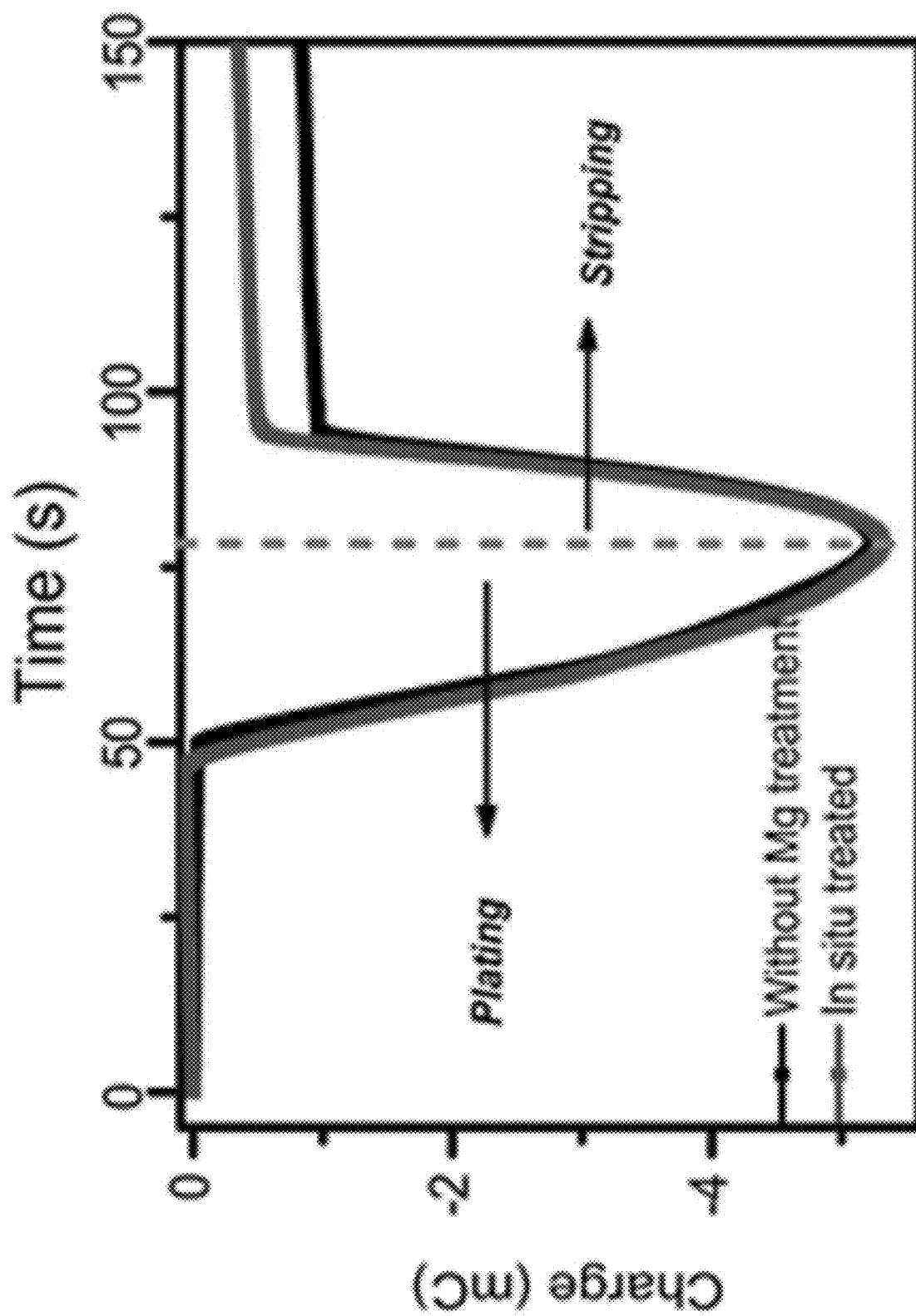
Figure 2C:
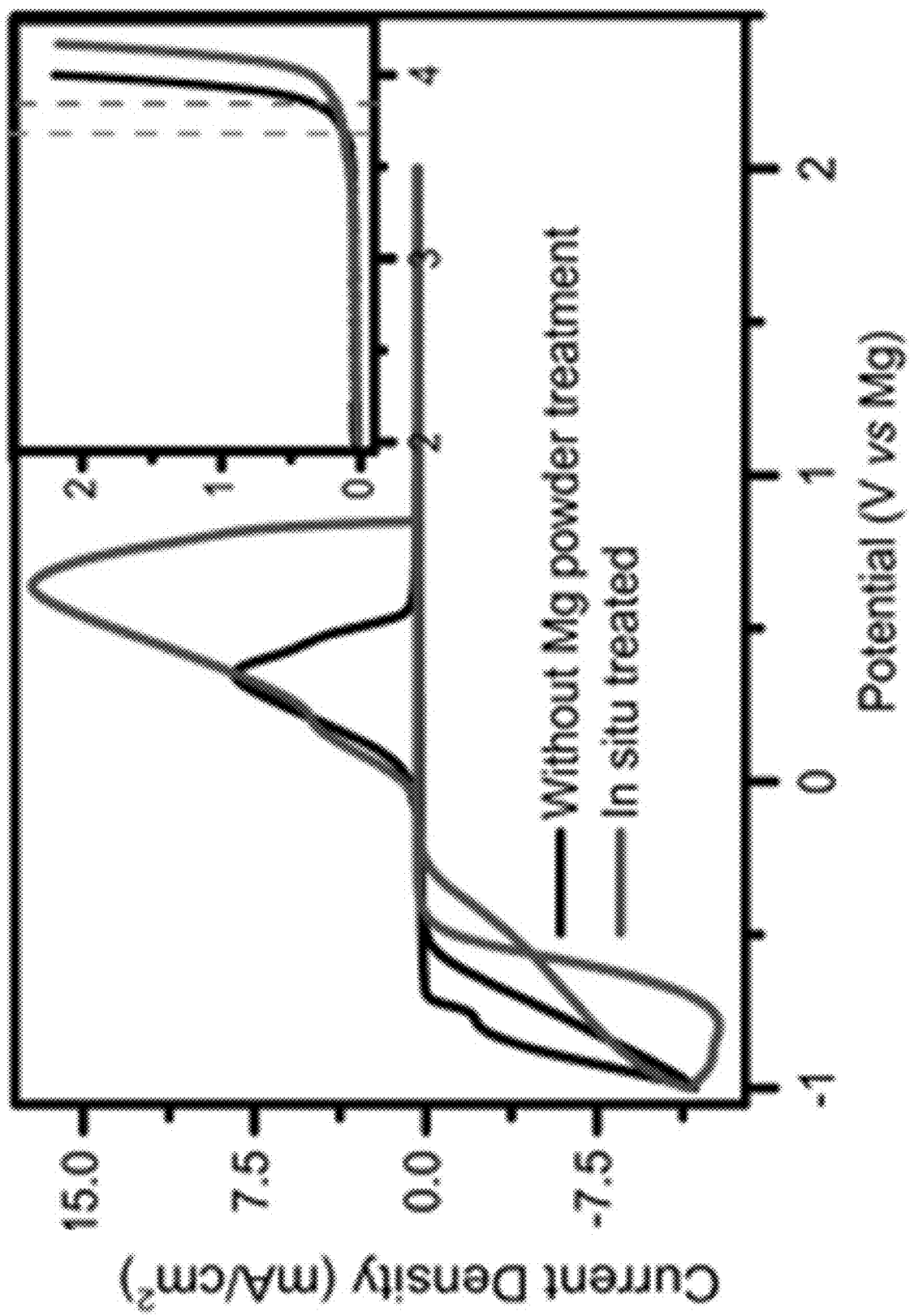
Figure 2D:
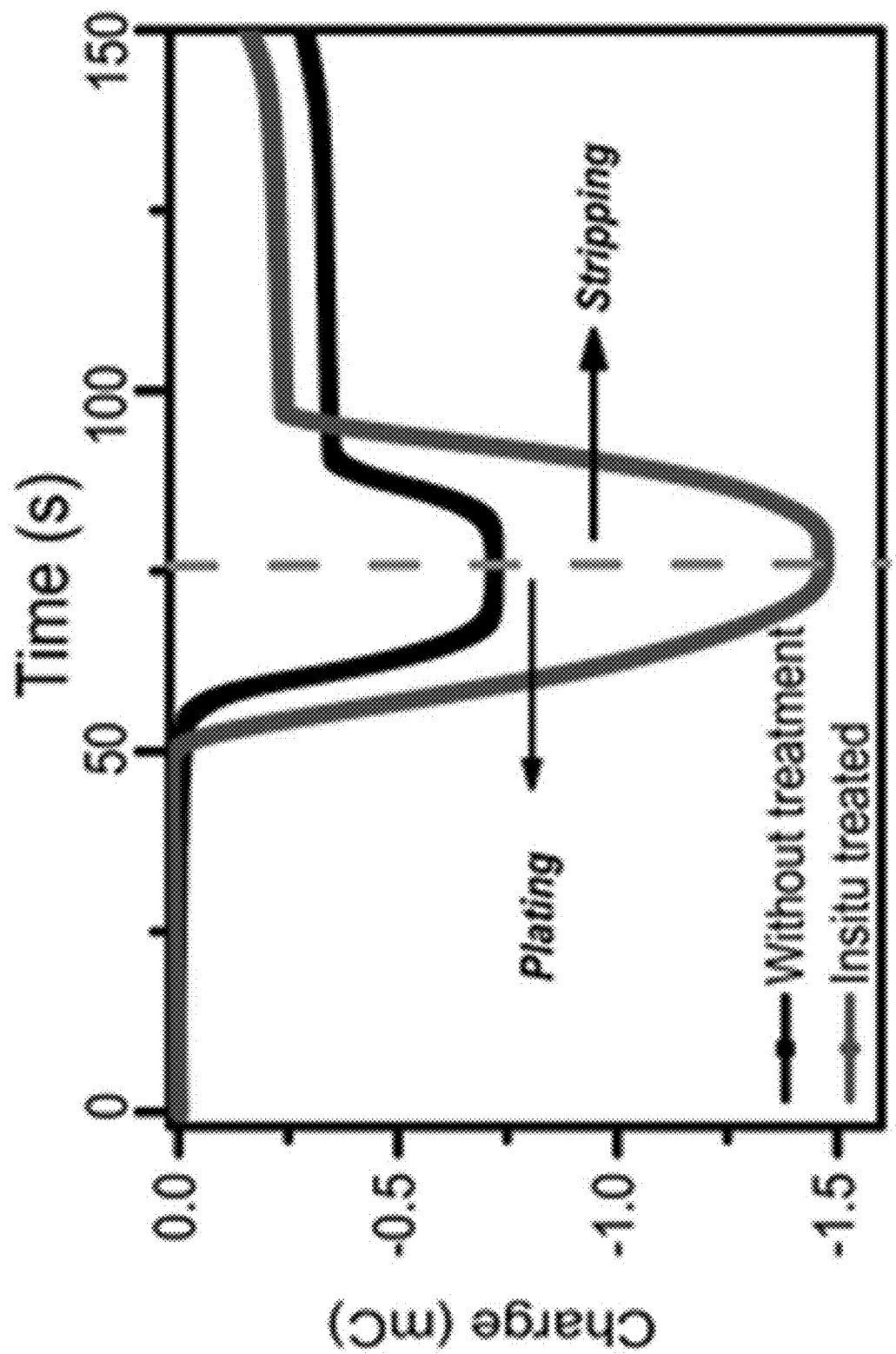
Figure 16A:
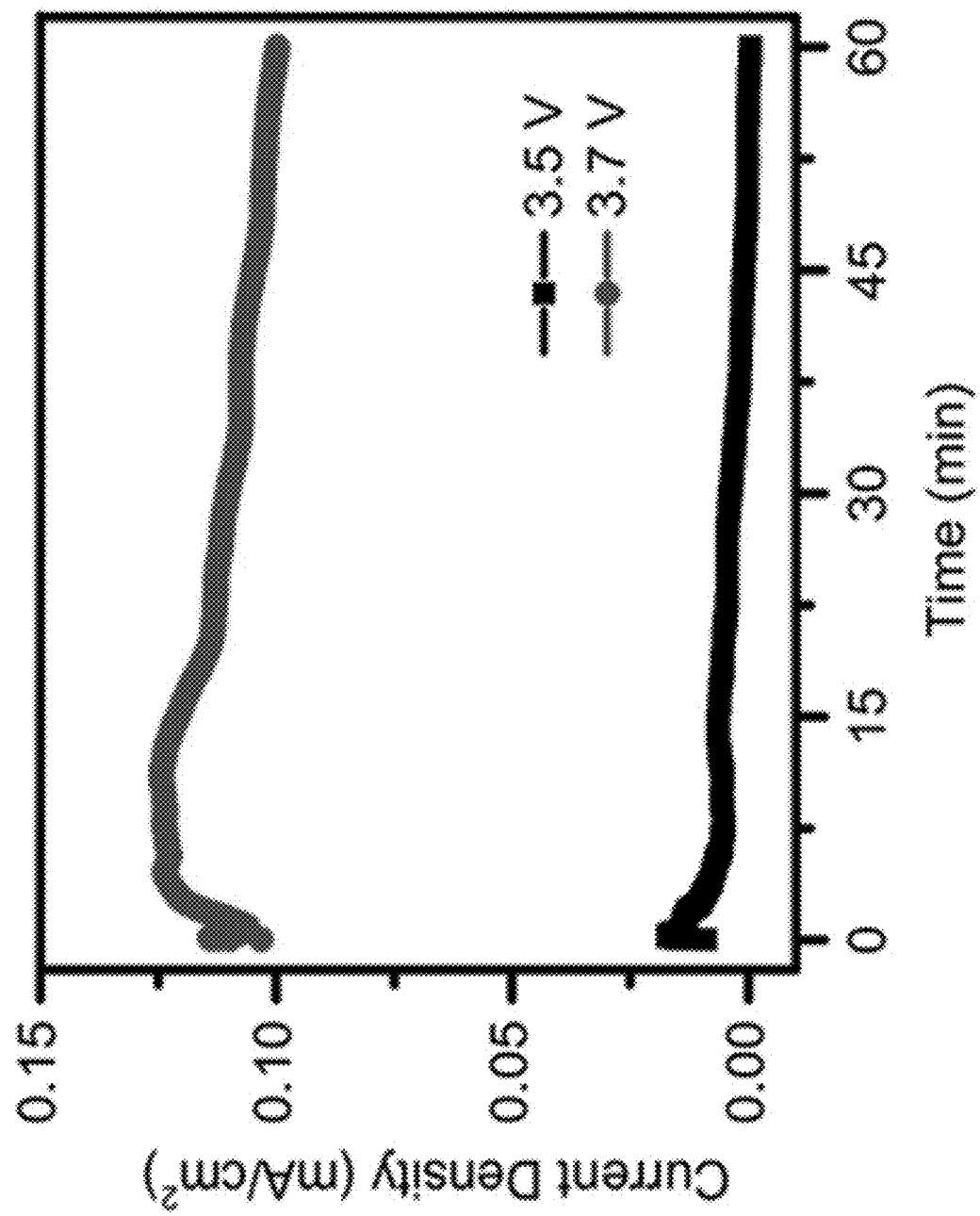
FIG. 16A-FIG. 16B: Bulk electrolysis of (FIG. 16A) MMAC-DME and (FIG. 16B) MMAC-DMG electrolytes at 3.5 V and 3.7 V for 60 min.
Figure 16B:
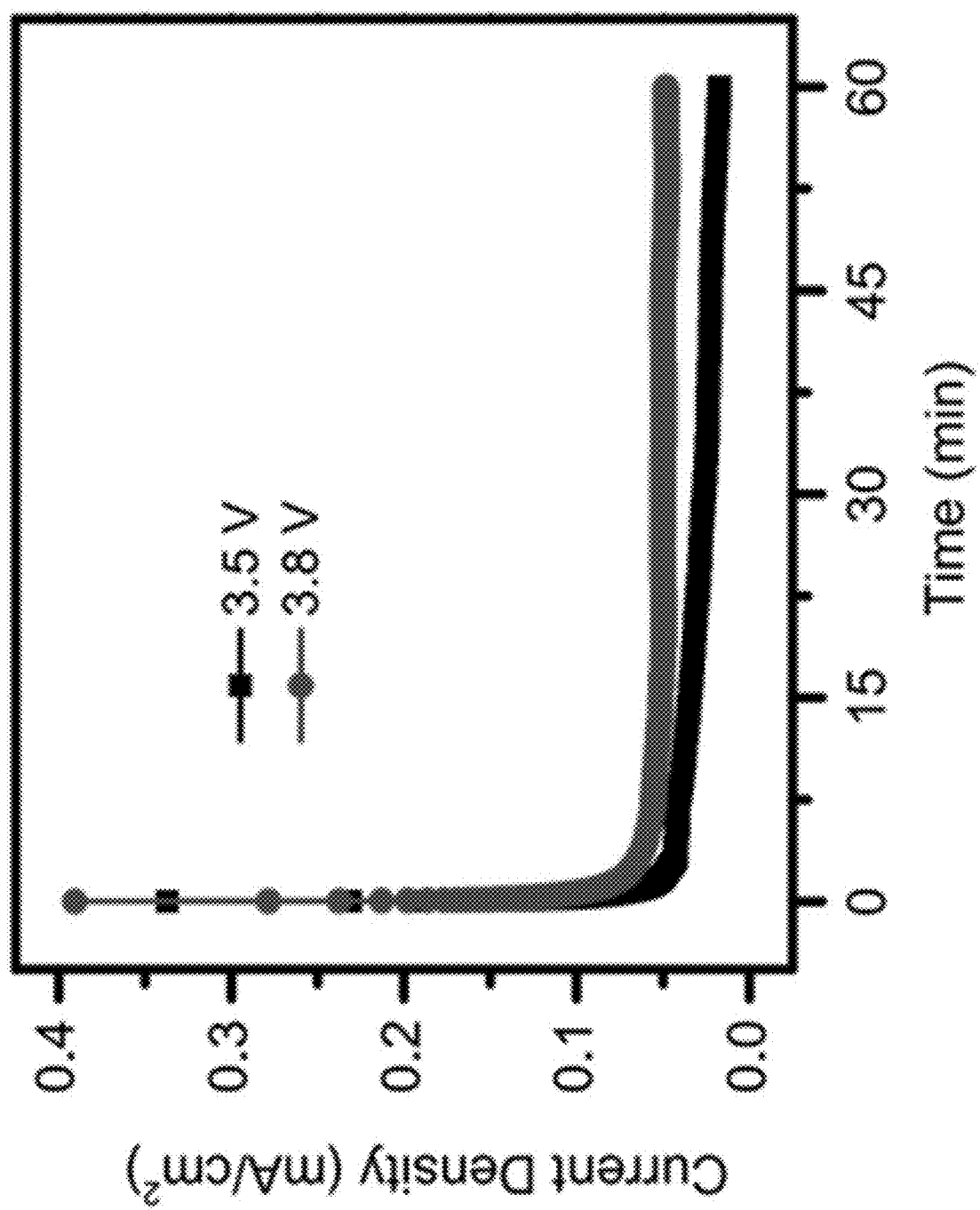

We further studied the electrochemical performance of the MMAC electrolytes in DME and DMG solvents. As shown in FIGS. 2A and B, the electrochemical performance of the MMAC-DME electrolyte with Mg powder treatment was clearly improved over the MACC-DME electrolyte. Due to the higher concentration of $Mg^{2+}$ in MMAC-DME electrolyte (0.4 M), 38 mg/mL of Mg powder was used for the preparation of the MMAC-DME electrolyte. For comparison of the MMAC-DME electrolyte over the MACC-DME electrolyte, the Mg plating onset potential was positively shifted about 0.2 V (from −0.429 V to −0.234 V vs Mg), the overpotential was dropped 180 mV (from 354 mV to 171 mV), and the Coulombic efficiency was increased from 85% to 92%. In the case of the MMAC-DMG electrolyte in comparison to the MACC-DMG electrolyte, the Mg plating onset potential was positively shifted more than 0.3 V (from −0.667 V to −0.332 V vs Mg), the overpotential decreased 41 mV (from 253 mV to 212 mV), and the Coulombic efficiency was increased from 57% to 85%. Compared to the MMAC-THF electrolyte, the MMAC-DME and MMAC-DMG electrolytes exhibited higher anodic stability, their irreversible oxidation wave was shown up to 3.7 V and 3.8 V vs. Mg, respectively (FIGS. 2A, 2C, inset). It could be because of the improved stabilization effect of chain DME and DMG over THF for the $AlCl_4^-$ anion. The anodic stability of MMAC-DME and MMAC-DMG electrolytes were further confirmed by the bulk electrolysis. As shown in FIG. 16, when the electrolysis potential of the MMAC-DME electrolyte was set at 3.7 V vs. Mg, the current is 0.1 mA/cm² higher than the background current (the current under 3.5V electrolysis), which is ~0.13% of the peak current density. Similarly, for the MMAC-DMG electrolyte, when the electrolysis potential was set at 3.8 V, the current is 0.05 mA/cm² higher than the background current (the current under 3.5V electrolysis), which is ~0.33% of the peak current density.

Figure 17:
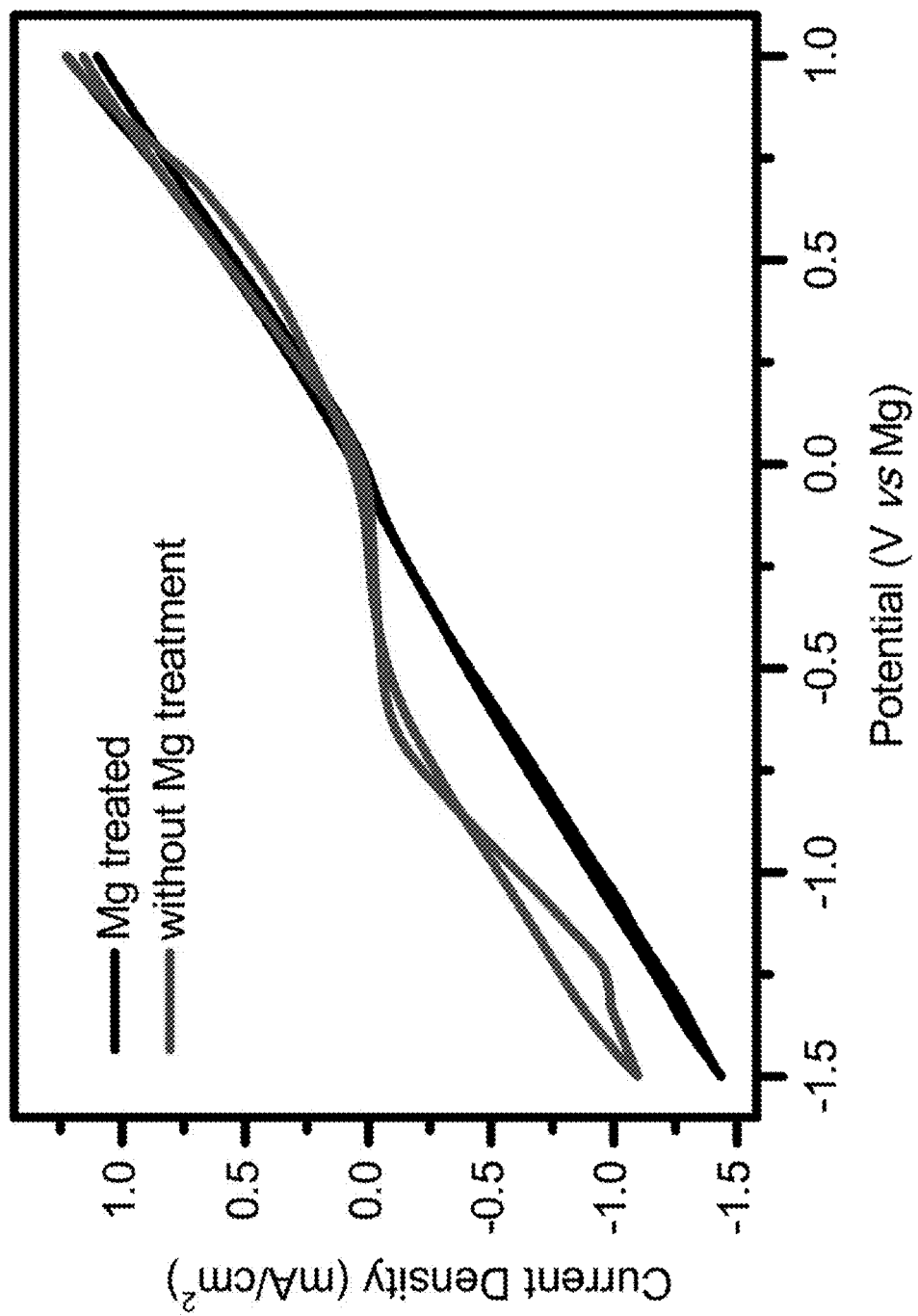
FIG. 17: CV curves of MMAC-THF (black) and MACC-THF (red) electrolytes tested by Mg as working electrode.

MMAC-DME exhibited 100% Columbic efficiency and 3.3 V anodic stability on Pt compared to 92% Columbic efficiency and 3.7 V anodic stability on GC. The performance of the electrolytes by using Al as a working electrode is poor because of the less positive oxidative potential of Al (+0.71 V vs. Mg). When testing the MMAC-THF electrolyte using Mg strip as the working electrode, the Mg plating onset potential is 0V vs Mg and the overpotential is 0V (FIG. 17). The result indicates that the observed additional onset potential and the overpotential on other working electrodes come from the heterogeneous junction of the Mg metal and an applied working electrode.

Figure 18:
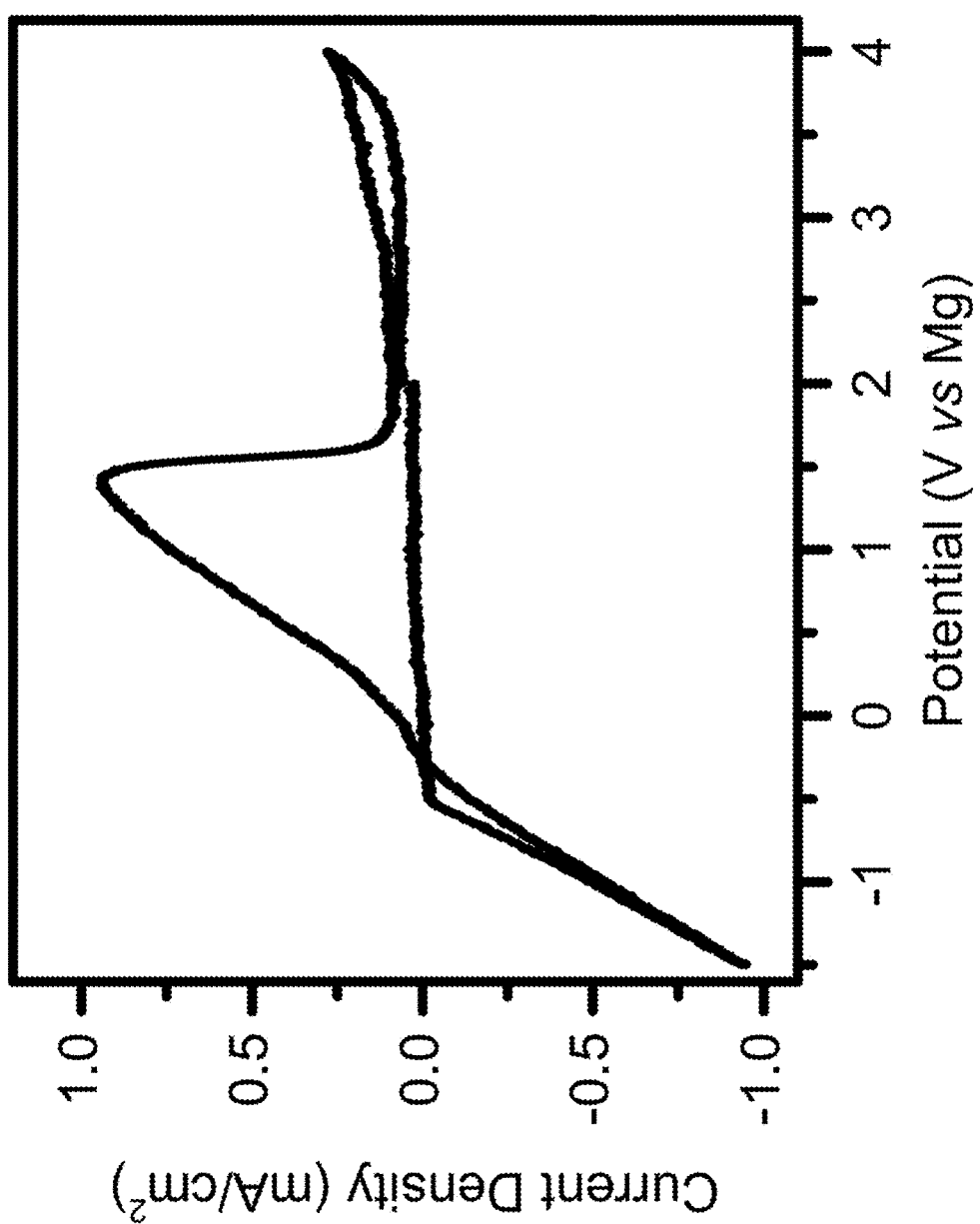
FIG. 18: CV curve of 0.047 M $AlCl_3$ in THF stirring with 10 eq. Mg powder at room temperature for 20 hrs.

To test if there was a composition difference between the as-prepared MACC electrolytes and the MMAC electrolytes, the concentration of $Mg^{2+}$ and $Al^{3+}$ in the solution after the Mg powder treatment was tested by ICP-MS. As shown in Table 4, in the presence of Mg powder, the $Mg^{2-}:Al^{3+}$ ratio in the solution was increased from 2:1 for MACC-THF to 2.39:1 for MMAC-THF, from 1:1 for MACC-DME to 1.45:1 for MMAC-DME, and from 1:2 for MACC-DMG to 1:1.22 for MACC-DMG. The $Mg^{2+}$ concentration was increased by 7%, 22% and 39%, respectively. The $Al^{3+}$ concentration was correspondingly decreased due to the reduction by Mg. The change amount of $Mg^{2+}$ and $Al^{3+}$ is consistent with the conversion of $3Mg+2Al^{3+} \rightarrow 3Mg^{2+}+2Al$. This means that during the Mg powder treatment, $Al^{3+}$ from $AlCl_3$ was partly reduced by metallic Mg. Which was further confirmed by the Mg plating/stripping signal shown in the THF solution of $AlCl_3$ treated by Mg powder (note: $MgCl_2$ was not added. FIG. 18). Even free of $CrCl_2$, the activity of the combined $AlCl_3$ and Mg powder performs at least as well as the $AlCl_3/Mg/CrCl_2$ electrolyte reported by Oh et al. As the reaction temperatures of MMAC-DME and MMAC-DMG were higher than that of MMAC-THF, there was more $Al^{3+}$ being replaced in DME and DMG than in THF.

Figure 22A:
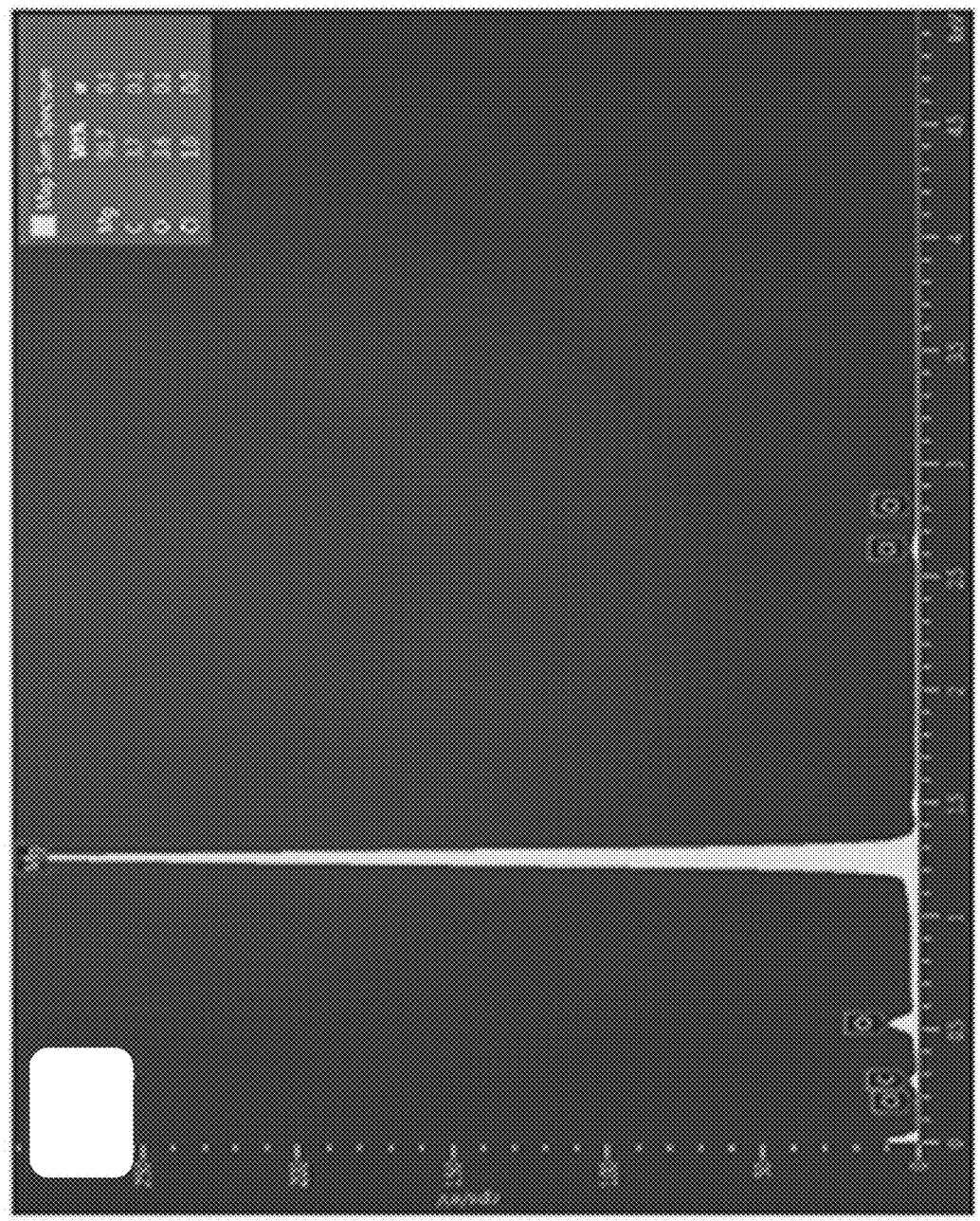
FIG. 22A-FIG. 22B.
Figure 22B:
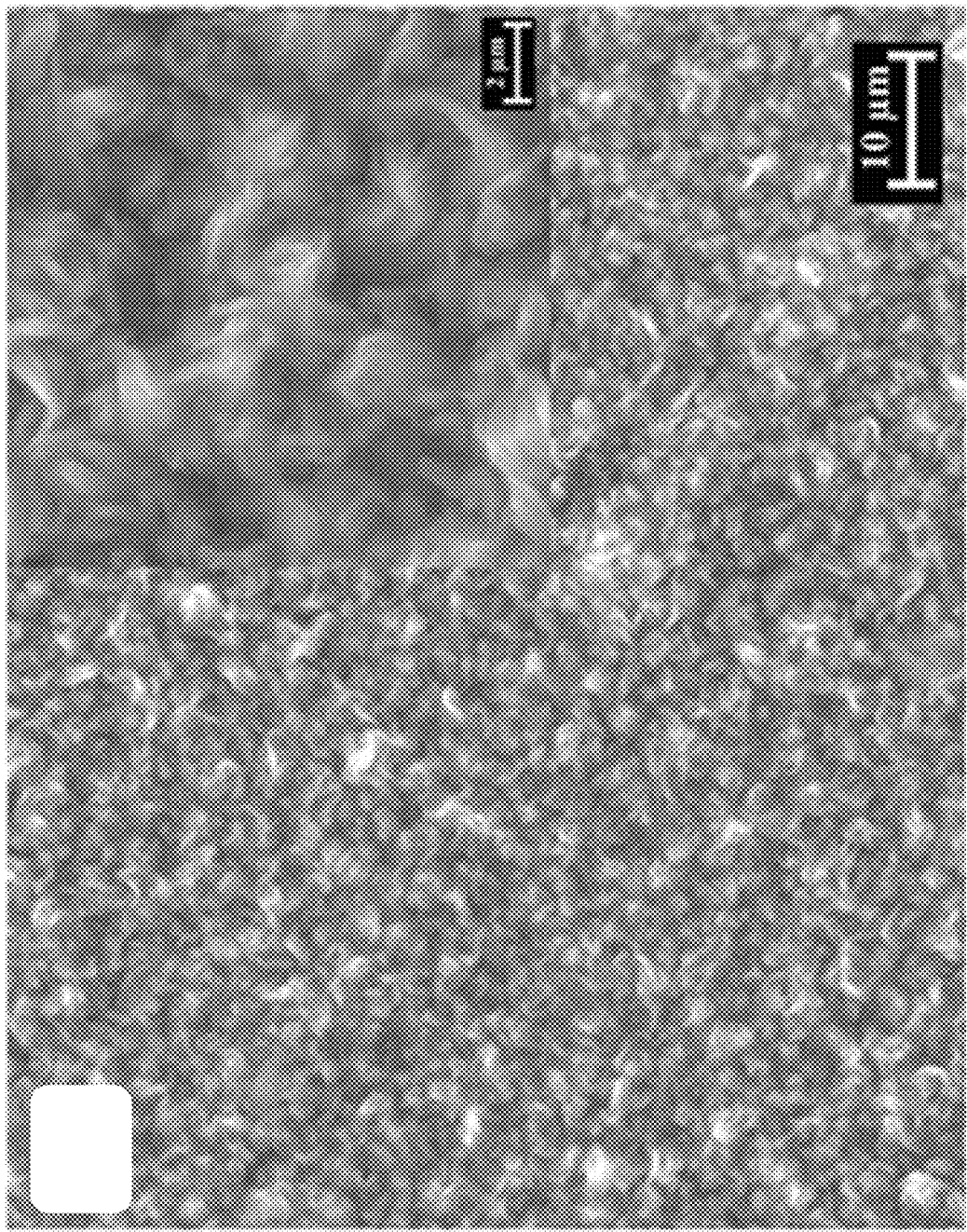

The EDX confirmed the plating of metallic Mg on the surface of the GC using the MMAC-DME electrolyte (FIG. 22). There is 1.0% of Cl shown in the EDX spectrum. When the $Al^{3+}$ was partly replaced by Mg, there was free $Cl^-$ anion

TABLE 1

Electrochemical performance data of the MMAC electrolytes prepared in different solvents tested with different working electrodes. All the electrolytes were prepared by the in situ treatment with 5.0 mg/mL Mg powder (38 mg/mL for MMAC-DME). The data given in the table is the plating onset potential (V)/overpotential η (mV)/Coulombic efficiency (%)/anodic stable potential (V).

|  | GC | Pt | Al | SS |
| --- | --- | --- | --- | --- |
| MMAC-THF | −0.245/159/100/3.5 | −0.220/125/100/3.0 | −0.245/220/—/1.1 | −0.267/118/94/2.0 |
| MMAC-DME | −0.234/164/92/3.7 | −0.225/126/100/3.3 | −0.127/56/—/0.8 | −0.149/105/94/2.2 |
| MMAC-DMG | −0.332/212/85/3.8 | −0.359/203/94/3.4 | −0.284/65/—/0.9 | −0.333/195/77/2.1 |

*GC is glassy carbon working electrode, SS is stainless steel working electrode.

The electrochemical data of the MMAC electrolytes in different solvents tested with different working electrodes was summarized in Table 1 and FIG. 9-15. In general, the MMAC electrolytes show better reversibility in THF but higher anodic stability in DME and DMG. Among the different working electrodes, GC and Pt working electrode displayed the best reversibility and stability in all of these three solvents. These electrolytes showed a higher Columbic efficiency with Pt working electrode than GC working electrode while GC working electrode delivered a better anodic stability than Pt working electrode. For example, generated. It is noted that no Al plating was observed. As shown in FIG. 22, a dendrite free, smooth, and uniform Mg film was deposited on the GC.

Figure 19:
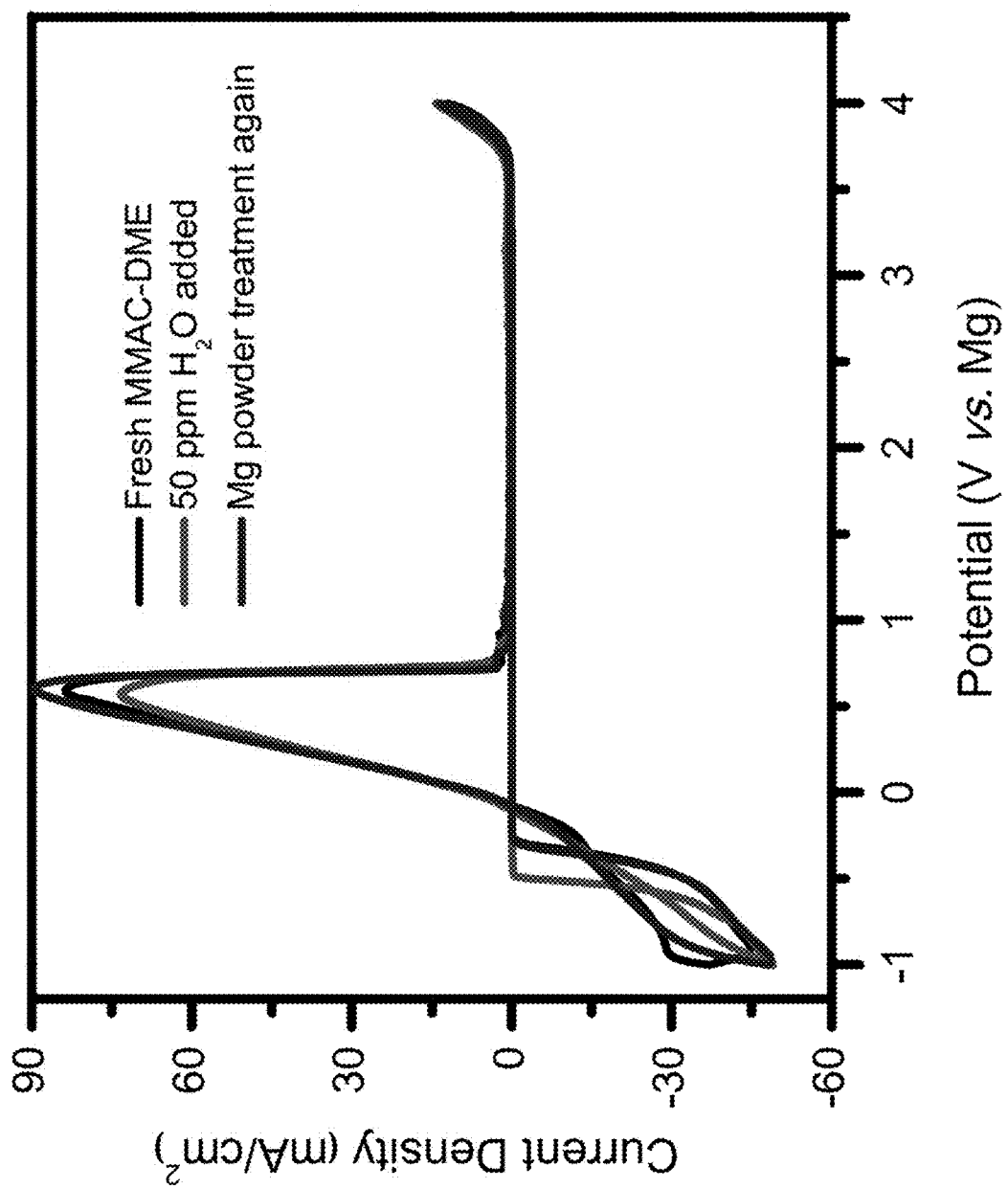
FIG. 19: CV curves of fresh MMAC-DME electrolyte (black), MMAC-DME with 50 ppm $H_2O$ added (red), and retreat with Mg powder (blue).

Water can strongly jeopardize the performance of Mg electrolytes. As shown in FIG. 19, another control experiment was conducted to test if adverse effects of water could be recovered by Mg powder treatment. After 50 ppm water was added into the fresh MMAC-DME electrolyte, the Coulombic efficiency was dropped to 86% and the overpotential was increased to 350 mV. After retreated with Mg powder, both Coulombic efficiency and overpotential were completely recovered. It indicated that Mg powder could effectively remove water impurity in the electrolyte solution during the treatment.

To get in-depth understanding of the electrochemical reaction during the Mg plating/stripping process, a systematic kinetic study was conducted. The kinetic study can provide fundamental information of how the solvents, electrodes, and structure of the active species affect the performance of the electrolytes. The current density corresponds to the reaction rate of Mg plating/stripping on the electrode surface, which is mainly controlled by two aspects (beside the concentration of the electrolytes): the electron transfers on the interface between electrode and electrolyte, and the mass transport from the bulk solution to the electrode surface.

Figure 3:
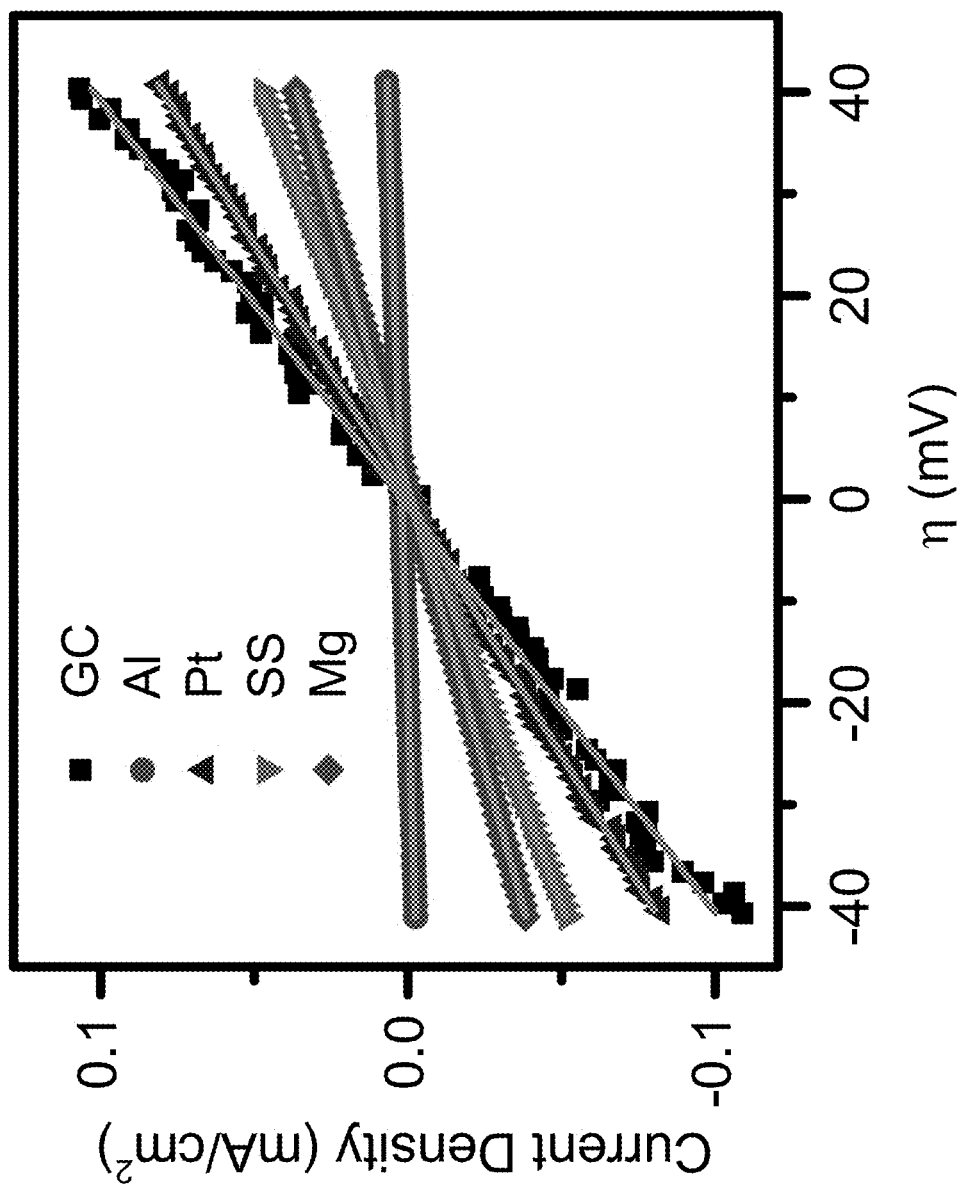
FIG. 3: The exchange current density measurement of MMAC-THF electrolytes in different working electrodes.
Figure 4:
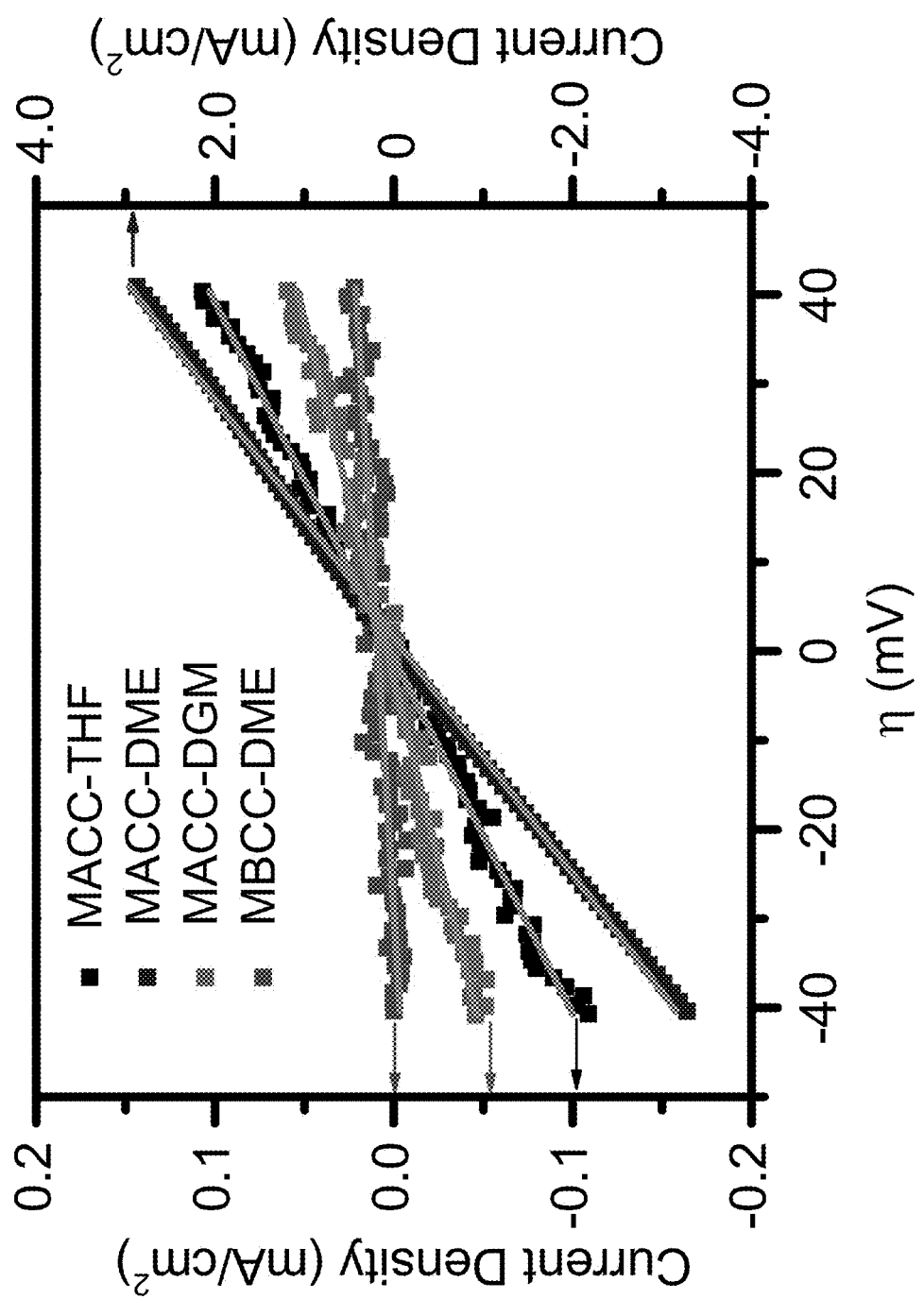
FIG. 4: MMAC-THF electrolytes in different solvents and a $Mg/MgCl_2/BCl_3$ (MMBC) electrolyte using a glassy carbon electrode.
Figure 21:
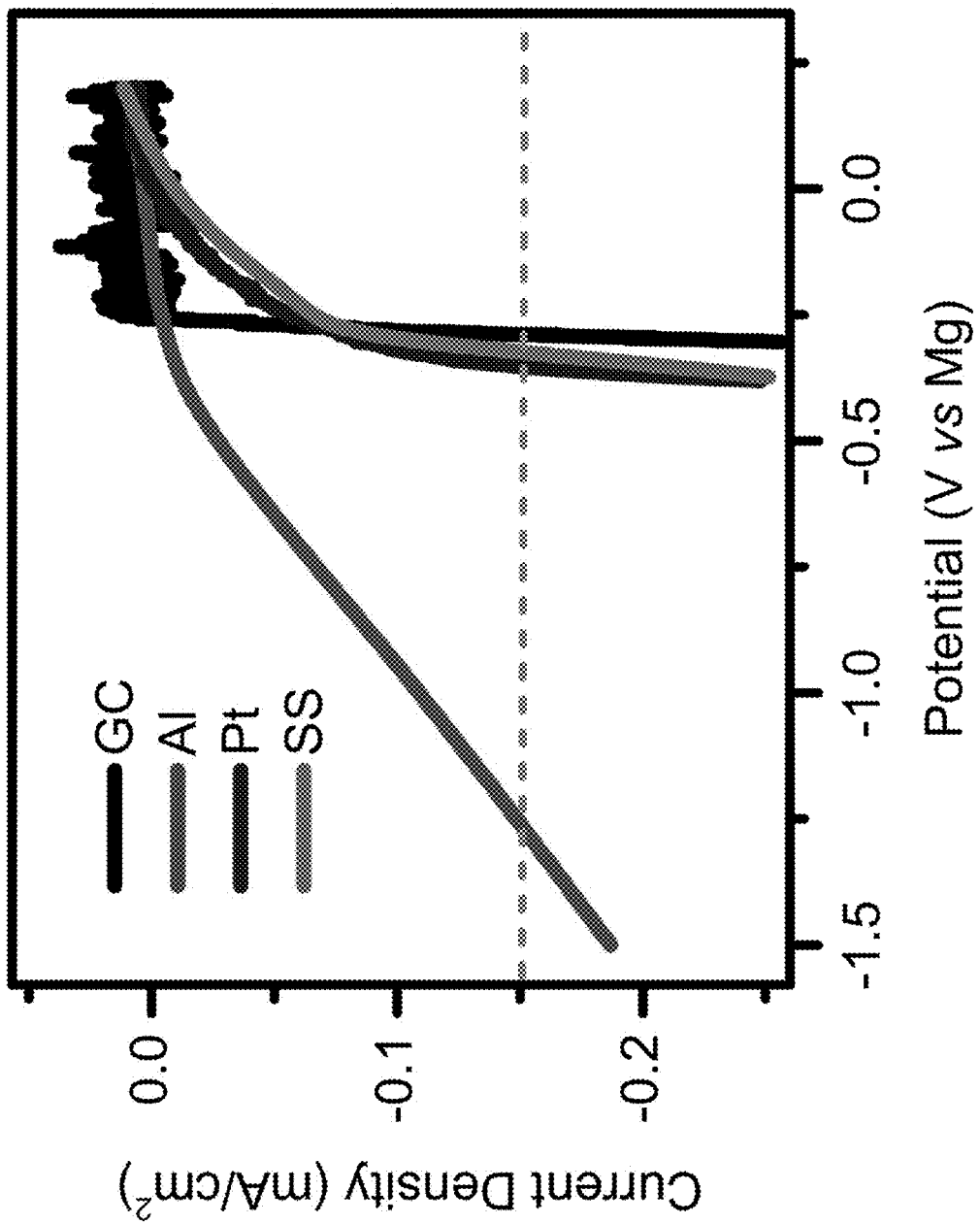
FIG. 21: The current density-potential curves for a MMAC-THF electrolyte tested by different working electrodes. The dash line highlight the potential needed for a current density of 0.15 mA/cm$^2$.

The exchange current density $i_0$ and electron transfer constant $k^0$ can be calculated from the Butler-Volmer equation (eq. 1 and 2). When the overpotential $\eta$ is small, the reaction rate is mainly controlled by the electron transfer process. As shown in FIGS. 3 and 4, a linear relationship of $i$–$\eta$ was obtained in an $\eta$ range of −40 mV~+40 mV. The $i_0$ of each electrolyte was determined by fitting i versus $\eta$ with eq. 3 derived from the Butler-Volmer equation. $k^0$ was calculated from eq. 2. The measured exchange current density $i_0$ and electron transfer constant $k^0$ of the $MgCl_2$-based electrolytes are listed in Table 2 and 3. In the case of MMAC-THF electrolyte, the exchange current density ($i_0$=0.0317 mA/cm$^2$) and electron transfer constant ($k^0$=8.21×10$^{-8}$ m/s) show the highest value on GC. And the electron transfer rate of the MMAC-THF electrolyte on the Al working electrode displayed one order of magnitude slower than that on other working electrodes, which is in agreement with the larger overpotential $\eta$ (220 mV) of the Al working electrode. As shown in FIG. 21, because of the slower electron transfer on Al working electrode, to obtain the same current density (−0.15 mA/cm$^2$), the Al working electrode needs a more negative potential (−1.2 V vs Mg) to supply a higher driving force.

In different solvent, the MMAC electrolytes showed different electron transfer constants. Besides the property of electrode, the structure of the electroactive species and physical properties of the solvent, such as viscosity and polarity, also affect the electron transfer process. With different $Mg^{2+}$:$Al^{3+}$ ratios and coordinate solvent molecules, the $Mg^{2+}$ carrying species in different solvents would have different activities. As shown in Table 3, the slower electron transfer rate of MMAC-DMG electrolyte is also in agreement with the higher viscosity of DMG (1.06 mPa/s at 20° C.). The largest $k^0$ of MMAC electrolytes was obtained in DME (2.52×10$^{-7}$ m/s). With changing the electrolyte Lewis acid component, the electron transfer constant of the MMBC-DME electrolyte displayed a one order of magnitude slower ($k^0$=1.02×10$^{-8}$ m/s). It further confirmed the structure of electroactive species affects the electron transfer of the electrochemical reaction.

TABLE 2

Exchange current densities ($i_0$) and electron transfer constants ($k^0$) of the MMAC-THF electrolytes by using different working electrodes.

| Working Electrodes | i/η | $i_0$ (mA/cm$^2$) | $k^o$ (m/s) |
|---|---|---|---|
| GC | 2.51 | 0.0317 | 8.21 × 10$^{-8}$ |
| Pt | 1.99 | 0.0257 | 6.66 × 10$^{-8}$ |
| SS | 1.22 | 0.0158 | 4.09 × 10$^{-8}$ |

TABLE 2-continued

Exchange current densities ($i_0$) and electron transfer constants ($k^0$) of the MMAC-THF electrolytes by using different working electrodes.

| Working Electrodes | i/η | $i_0$ (mA/cm$^2$) | $k^o$ (m/s) |
|---|---|---|---|
| Mg | 0.917 | 0.0115 | 3.01 × 10$^{-8}$ |
| Al | 0.112 | 1.45 × 10$^{-3}$ | 3.75 × 10$^{-9}$ |

TABLE 3

Exchange current densities ($i_0$), electron transfer constants ($k^0$) and the diffusion coefficient (D) of the MMAC electrolytes in different solvents and counterions.

| Electrolytes | i/η | $i_0$ (mA/cm$^2$) | $k^o$ (m/s) | $it^{1/2}$ | D (cm$^2$/s)* |
|---|---|---|---|---|---|
| MMAC-THF | 2.51 | 0.0317 | 8.21 × 10$^{-8}$ | 7.20 × 10$^{-6}$ | 7.10 × 10$^{-7}$ |
| MMAC-DME | 75.2 | 0.972 | 2.52 × 10$^{-7}$ | 4.21 × 10$^{-6}$ | 2.42 × 10$^{-7}$ |
| MMAC-DMG | 1.24 | 0.016 | 8.28 × 10$^{-9}$ | 2.86 × 10$^{-6}$ | 1.12 × 10$^{-7}$ |
| MMBC-DME | 0.305 | 0.00394 | 1.02 × 10$^{-8}$ | — | — |

*The diffusion coefficient (D) was tested in the presence of 5.0 eq. of $Bu_4NPF_6$ (vs. [Mg]) as supporting electrolyte.

The ion diffusion reveals the fundamental property of mass transport in the electrolytes. Herein, Chronoamperometry (CA) was used to evaluate the cation diffusion coefficient (D) of the MMAC electrolytes that is solvent and composition dependent. In the presence of supporting electrolyte, 250 mV overpotential for the Mg stripping was applied on the GC working electrode. The consumption of the active species near the working electrode, appears as the current decays, leads to an inverse of $t^{1/2}$ function. Such a trend suggests a typical diffusion controlled process. The diffusion coefficient D of each electrolyte was determined by fitting i vs $t^{1/2}$ with the Cottrell equation (eq. 5). As reported in Table 3, the MMAC-THF exhibited the fastest diffusion (D=7.10×10$^{-7}$ cm$^2$/s). The cation diffusion in DME and DMG were relative slower (2.42×10$^{-7}$ cm$^2$/s for MMAC-DME and 1.12×10$^{-7}$ cm$^2$/s for MMAC-DMG).

Figure 20:
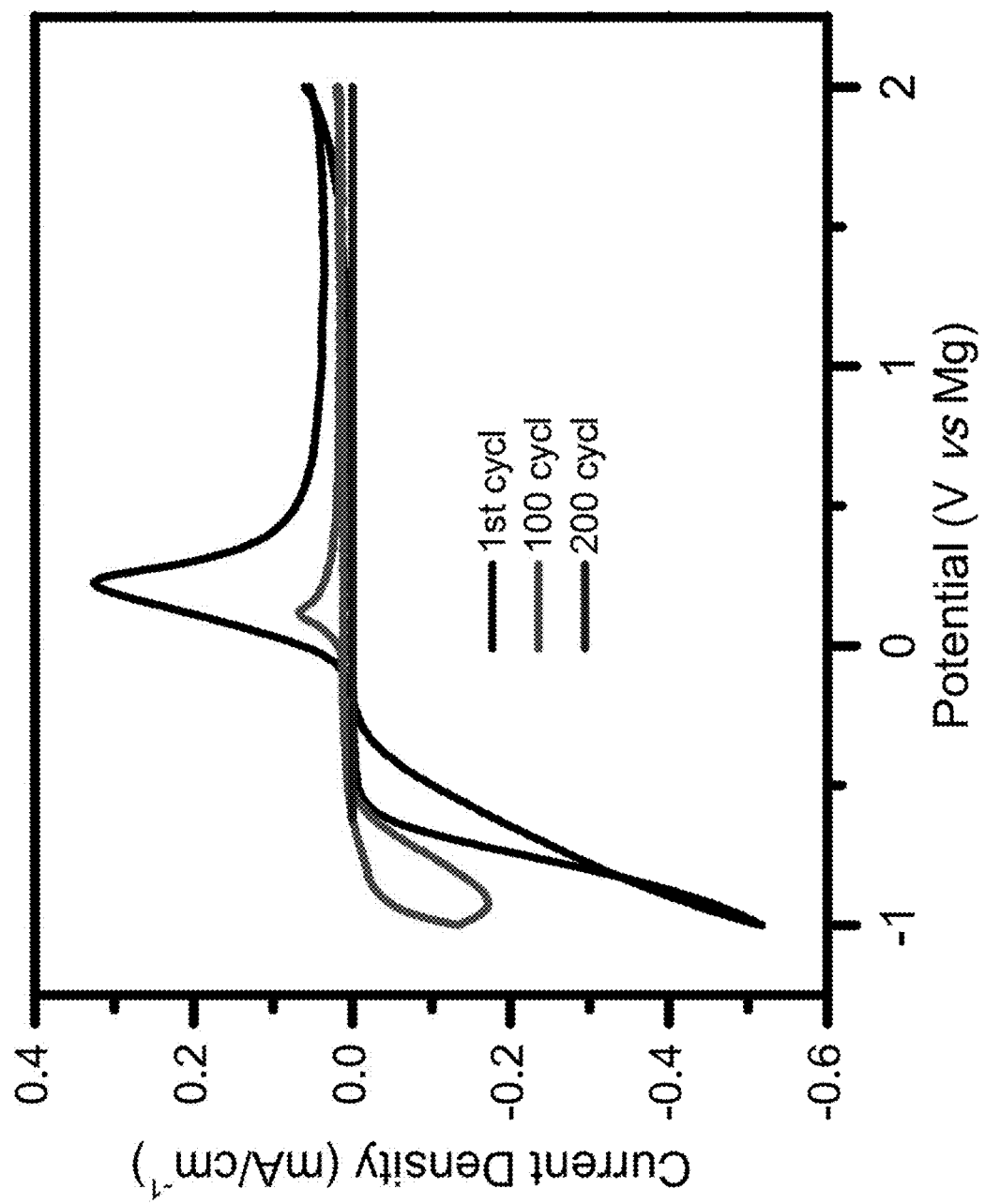
FIG. 20: CV conditioning process of MBCC-DME electrolyte after 5.0 mg/mL Mg powder treatment.

To compare with the electrochemical conditioning method, a more sensitive MBCC-DME electrolyte was prepared. The plating/stripping peak for the as-prepared MBCC-DME electrolyte was not shown. After 5 mg/mL Mg powder treated for 20 hrs., a pair of reversible plating/stripping peaks appear in the CV curve with 162 mV overpotential and 79% Coulombic efficiency (FIG. 20). The Mg deposition onset potential for the MMBC-DME electrolyte is −0.35 V vs Mg; that is comparable with the literature reported (−0.3 V vs Mg). An electrochemical conditioning process was further conducted on the MMBC-DME electrolyte, as shown in FIG. 20, the plating/stripping peaks get weaker with the CV cycling. After 200 CV cycles, the plating/stripping peaks totally disappear. It indicated that the Mg powder treatment is more effective than the electrochemical conditioning method.

In summary, we report a convenient and reliable method involving Mg powder treatment to prepare high performance MMAC electrolytes in ethereal solvents. The presented MMAC electrolytes in THF, DME, and DMG exhibited unprecedented electrochemical performance for reversible Mg plating/stripping including Coulombic efficiency up to 100%, the overpotential below 200 mV, and/or the anodic oxidative stability up to 3.8 V. A systematic kinetic study of the MACC electrolytes displayed the electron transfer and mass transport during the Mg plating/stripping process were affected by the solvent, working electrode, and the composition of the electrolytes. It is believed that these reliable high performance inorganic MMAC electrolytes will find wide applications in Mg rechargeable batteries.

TABLE 4

The metal composition of the electrolytes before and after the Mg powder treatment.

| Electrolytes | [Mg] (mg/mL) | [Al] (mg/mL) | [Mg]/[Al] (mol ratio) | Increase of [Mg] (%) |
|---|---|---|---|---|
| Untreated MACC-THF | 0.97 ± 0.02 | 0.54 ± 0.02 | 2:1 | — |
| MMAC-THF | 1.04 | 0.48 | 2.39:1 | 7% |
| Untreated MACC-DME | 9.72 ± 0.02 | 10.79 ± 0.02 | 1:1 | — |
| MMAC-DME | 11.81 | 9.15 | 1.45:1 | 22% |
| Untreated MACC-DMG | 2.43 ± 0.02 | 5.40 ± 0.02 | 1:2 | — |
| MMAC-DMG | 3.38 | 4.64 | 1:1.22 | 39% |

*The $Mg^{2+}$ and $Al^{3+}$ concentrations of the as-prepared MACC electrolytes were calculated from the amount of $MgCl_2$ and $AlCl_3$ used for the preparation.

Example 2

Mg Treatment on Different Mg Salts—I

The Mg treatment method can be combined with other Mg salts as shown below. Mg salts including but not limited to $MgX_2$ (X=F, Cl, Br, I), $Mg(TFSI)_2$, $Mg(HMDS)_2$ (HMDS=1,1,1,3,3,3-Hexamethyldisilazane), $Mg(ClO_4)_2$, $Mg(PF_6)_2$, $Mg(BR_4)_2$, and $Mg(GaR_4)_2$, (R=X, alkyl, aryl, PEG, or other organic groups). In some embodiments, the combination of the electrolytes includes $MgCl_2/AlCl_3$, $MgCl_2/BCl_3$, $MgCl_2/GaCl_3$, $MgCl_2/Mg(TFSI)_2$, $MgCl_2/Mg(HMDS)_2$, $Mg(HMDS)_2/AlCl_3$, or $MgCl_2$.

Mg Treatment to Prepare an Electrolyte of $Mg(TFSI)_2$/$MgCl_2$ in DME:

In a 4 mL glass vial, 190.18 mg of $MgCl_2$ (2.0 mmol), 582.08 mg of $Mg(TFSI)_2$ (1.0 mmol) and 10 mg of Mg powder was added into 2.0 mL of distilled DME. The mixture was stirred at room temperature for 22 h. The Mg powder and insoluble species were removed by filtration, and then a clean solution was obtained. No further purification was needed.

Figure 23:
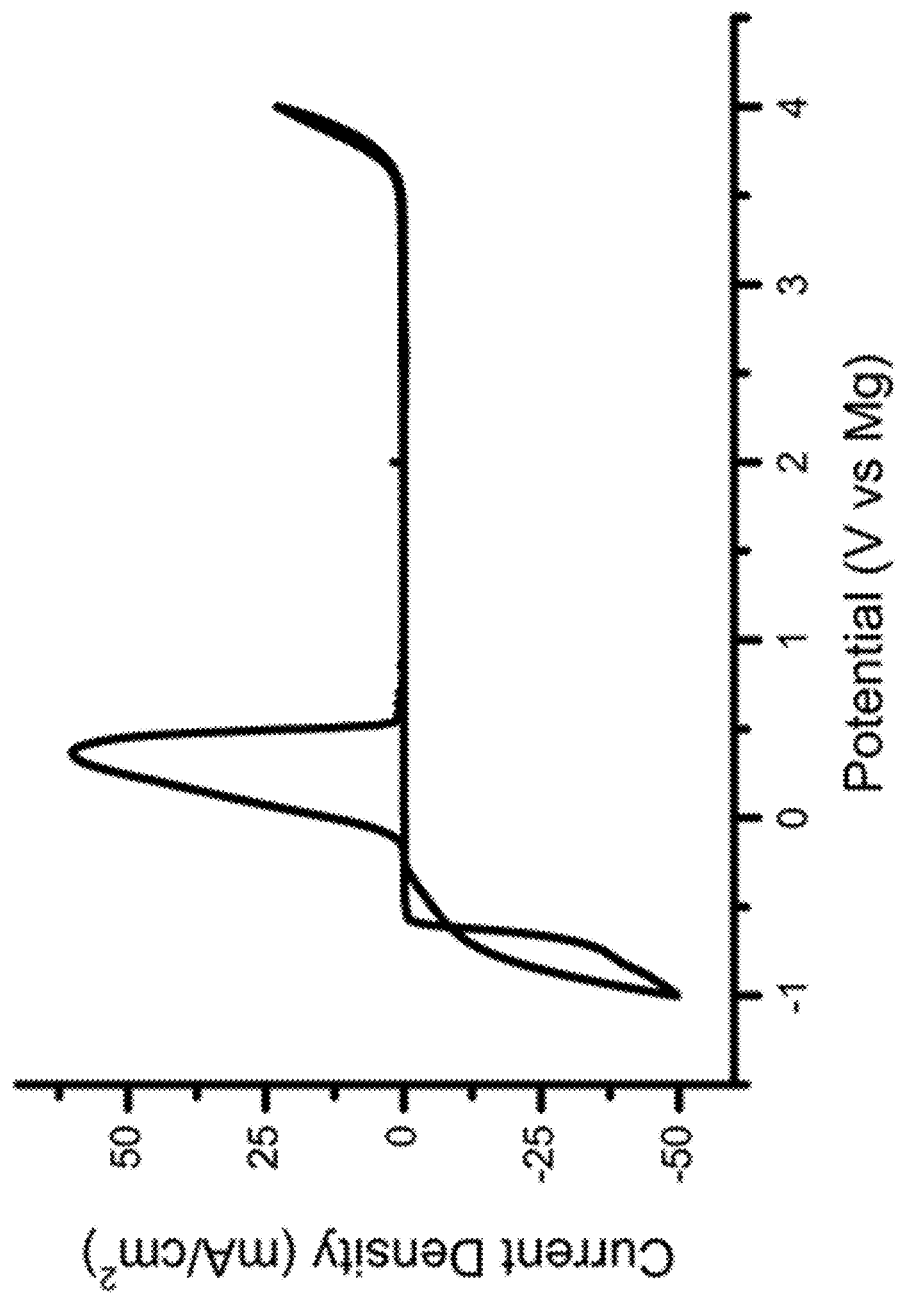
FIG. 23: CV measurements of Mg treatment to prepare an electrolyte of Mg(TFSI)$_2$/MgCl$_2$ in DME.

CV measurements were performed by a Gamery Instruments 1000 electrochemical workstation with a three-electrode cell system, in which a glassy carbon electrode (GC, 1.0 mm diameter), were used as the working electrode, a carbon rod as counter electrode, and a Mg strip as reference electrode. The scan rate was set as 50 mV/s. (203 mV overpotential, 91% CE). See FIG. 23.

Mg Treatment to Prepare an Electrolyte of $Mg(HMDS)_2$/$MgCl_2$ in THF):

In a 4 mL glass vial, 76.38 mg of $MgCl_2$ (0.8 mmol), 70.15 mg of $Mg(HMDS)_2$ (0.2 mmol) and 10 mg of Mg powder was added into 2.0 mL of distilled THF. The mixture was stirred at room temperature for 24 h. The Mg powder and insoluble species were removed by filtration, and then a clean solution was obtained. No further purification was needed.

Figure 24:
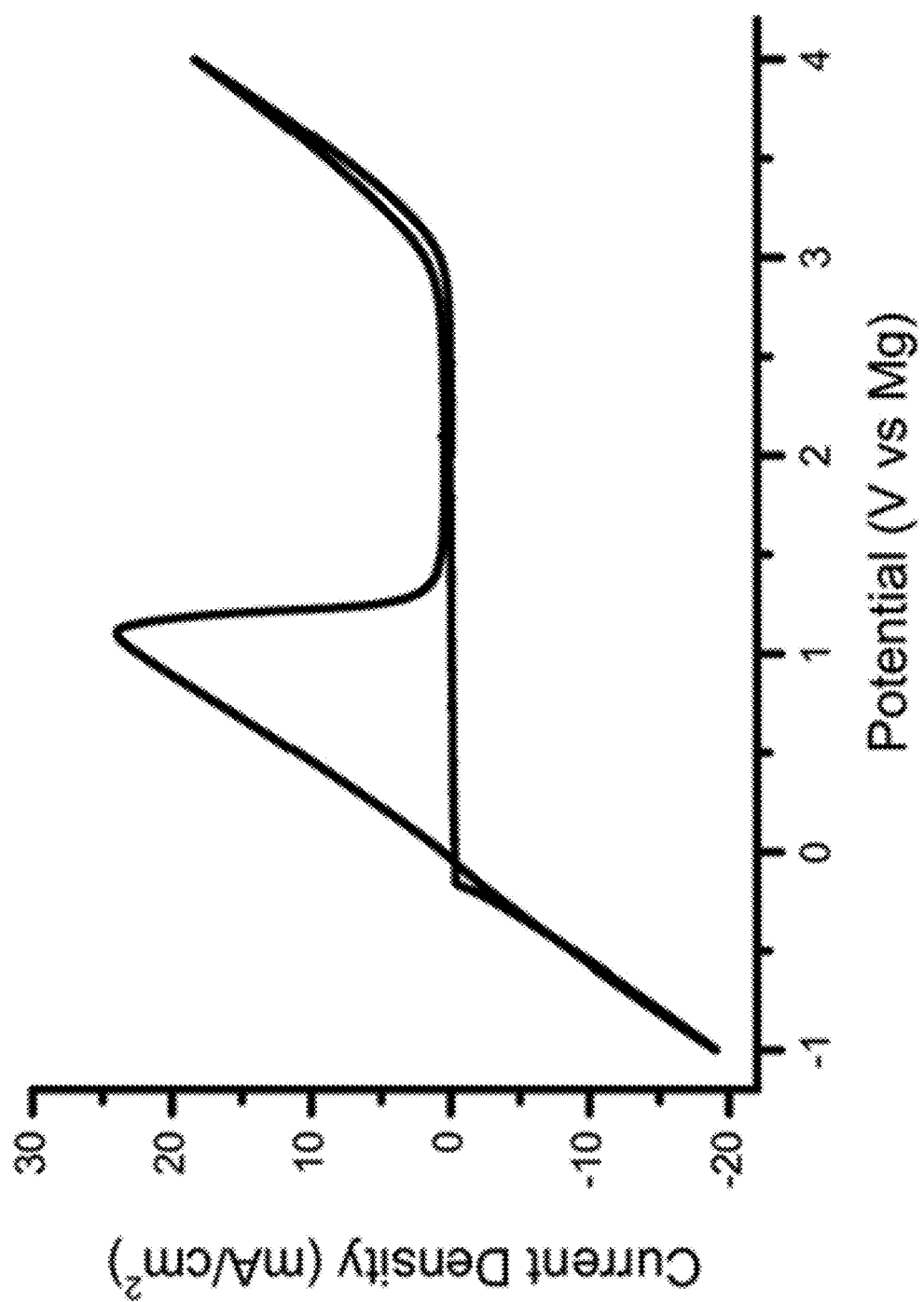
FIG. 24: CV measurements of Mg treatment to prepare an electrolyte of Mg(HMDS)$_2$/MgCl$_2$ in THF.

CV measurements were performed by a Gamery Instruments 1000 electrochemical workstation with a three-electrode cell system, in which a glassy carbon electrode (GC, 1.0 mm diameter), were used as the working electrode, a carbon rod as counter electrode, and a Mg strip as reference electrode. The scan rate was set as 50 mV/s. (240 mV overpotential, 95% CE). See FIG. 24.

Mg Treatment to Prepare an Electrolyte of $MgCl_2$ in dipropyl sulfone/THF (1/1, V/V:

1.0 mL of distilled THF/dipropyl sulfone (1/1, V/V) was added into a 4 mL vial with 47.6 mg $MgCl_2$ (0.5 mmol) and 5.0 mg of Mg powder. The mixture was stirred at 50° C. for 12 h. The Mg powder and insoluble species were removed by filtration, and then a clean solution was obtained. No further purification was needed.

Figure 25:
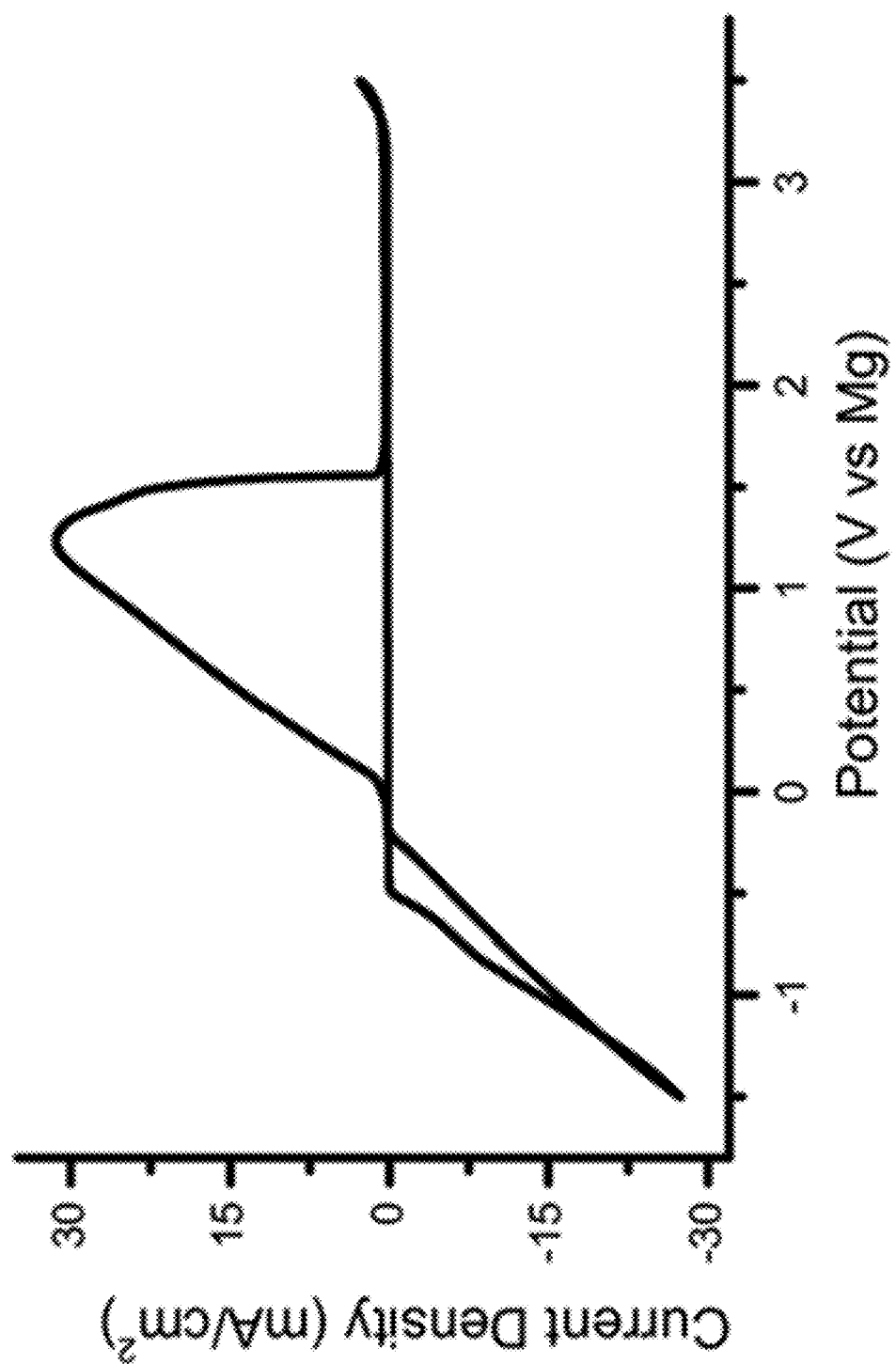
FIG. 25: CV measurements of Mg treatment to prepare an electrolyte of MgCl$_2$ in dipropyl sulfone/THF (1/1, V/V).

CV measurements were performed by a Gamery Instruments 1000 electrochemical workstation with a three-electrode cell system, in which a glassy carbon electrode (GC, 1.0 mm diameter), were used as the working electrode, a carbon rod as counter electrode, and a Mg strip as reference electrode. The scan rate was set as 50 mV/s. (240 mV overpotential, 94% CE). See FIG. 25.

Example 3

Mg-Based Electrolytes for Mg—Sulfur (Mg—S) Batteries

Reliable Electrolyte and Advanced Sulfur Cathode for Stable Rechargeable Mg—S Battery:

Ionic liquids are reported as having the advantage of high boiling point, low melting point, high chemical and electrochemical stability, non-flammability and low vapor pressure. Py14Cl was initially selected as the additive candidate for magnesium-sulfur battery. Free chlorides will cause the corrosion to current collector and coin cell shell, $AlCl_3$ was added into the electrolyte with Py14Cl to generate $AlCl_4^-$ anion group and release the chloride corrosion problem, the reaction is shown as following.

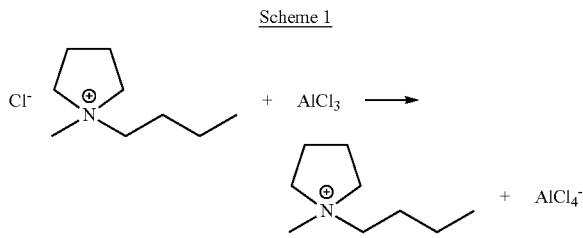

Scheme 1

Figure 26A:
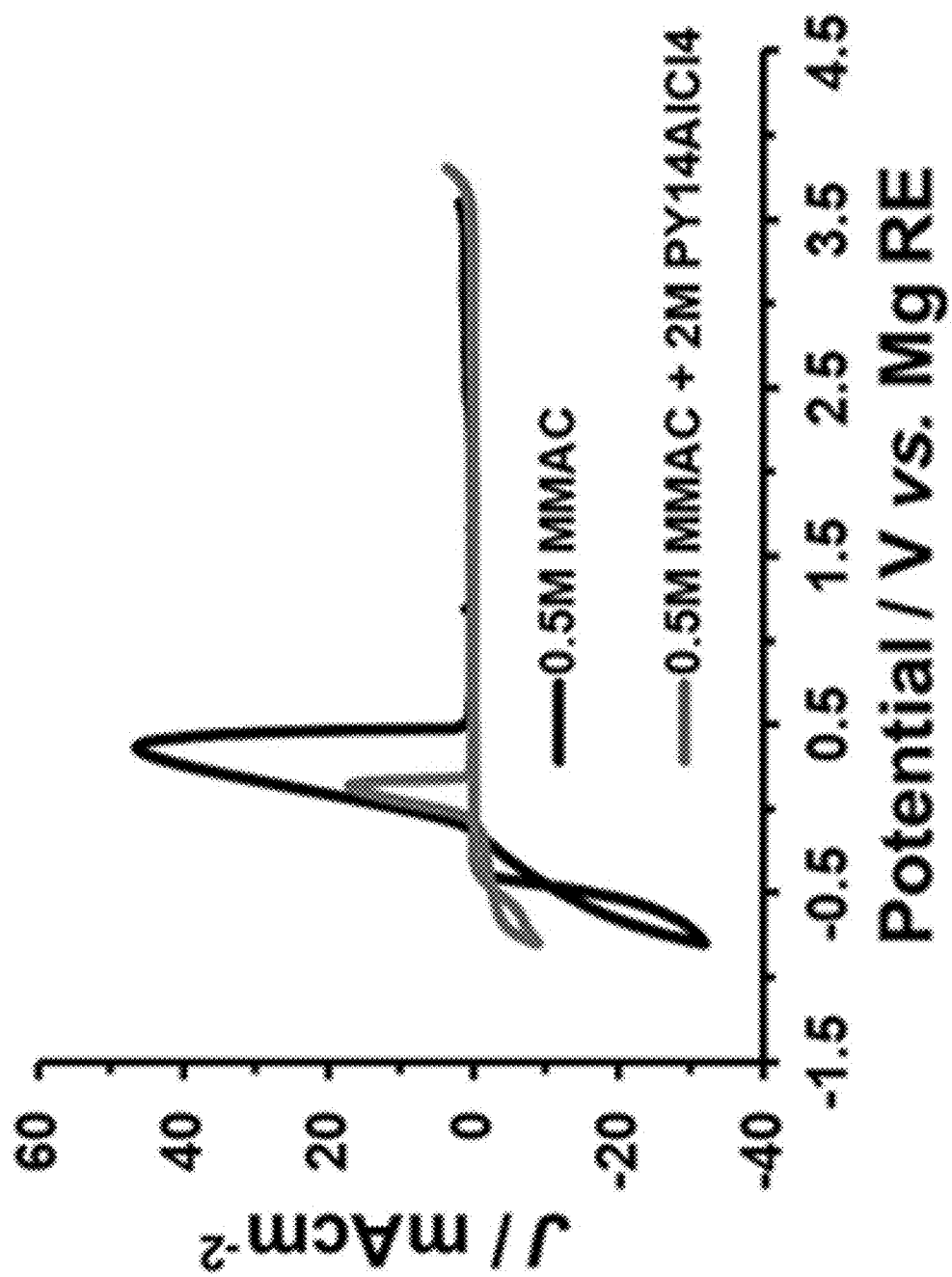
FIG. 26A-FIG. 26B: CV curves of Mg/MgCl$_2$/AlCl$_3$-DME (MMAC) electrolyte with Py14AlCl$_4$ ionic liquid additive at different concentrations.
Figure 26B:
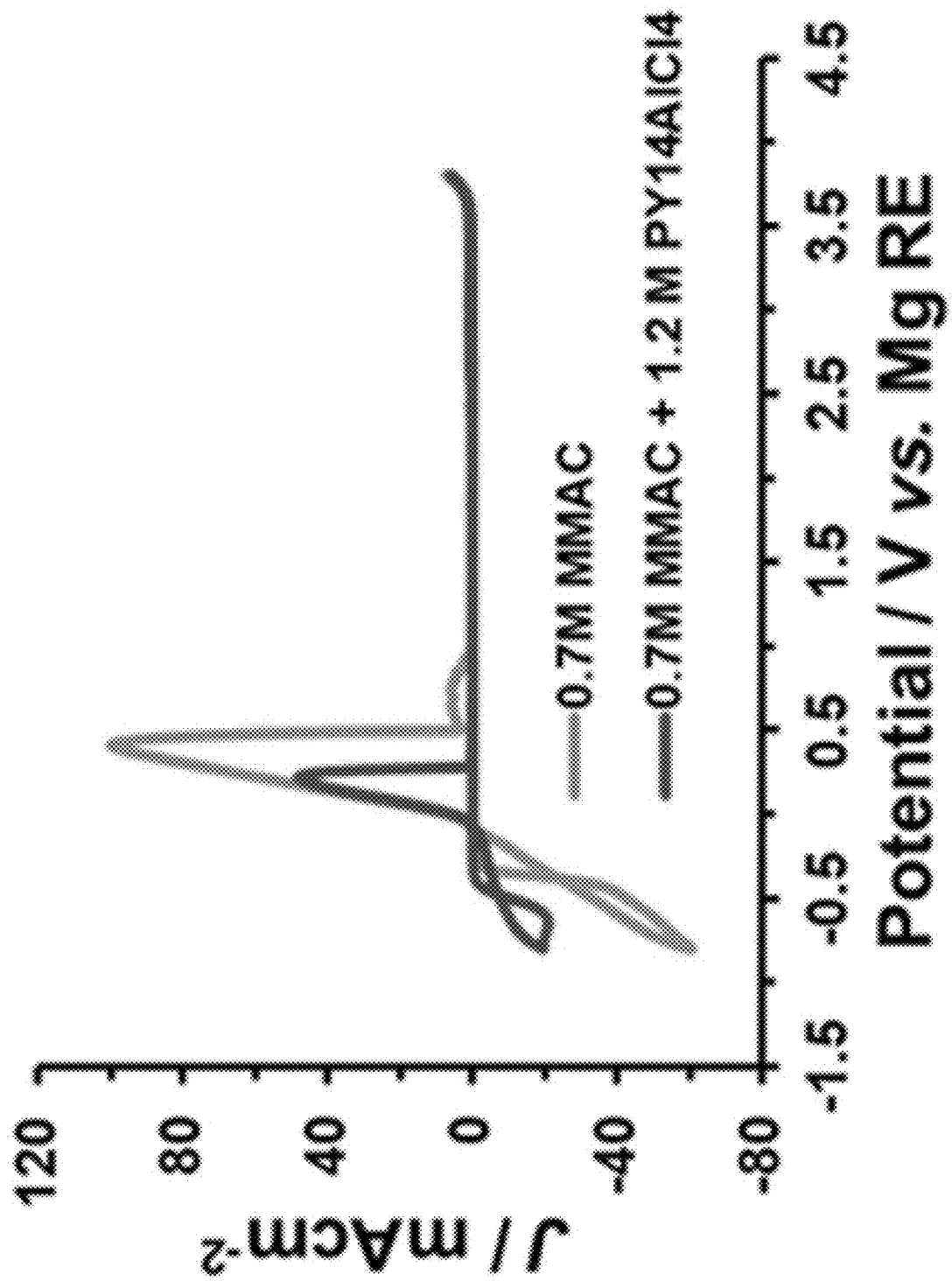

0.5M and 0.7M $MgCl_2/AlCl_3$-DME electrolytes were selected and added with ionic liquid Py14AlCl4. Py14Cl and $AlCl_3$ with 1:1 ratio was gradually added into $MgCl_2/AlCl_3$-DME electrolyte, as a result, $Py14AlCl_4$ saturated concentration in 0.5M and 0.7M $MgCl_2/AlCl_3$-DME could reach to 2M and 1.2M, respectively. The CV curves of $MgCl_2/AlCl_3$-DME with and without saturated $Py14AlCl_4$ additive are compared in FIG. 26A. With and without ionic liquid additive, all the anodic stability of $MgCl_2/AlCl_3$-DME electrolyte is higher than 3.6V (vs. $Mg/Mg^{2+}$) which is benefited from Mg powder treatment. The over-potential of 0.5M $MgCl_2/AlCl_3$-DME electrolyte is 120.0 mV. After adding 2M saturated $Py14AlCl_4$ in 0.5M $MgCl_2/AlCl_3$-DME electrolyte, the over-potential is 149.9 mV which is a little higher than the electrolyte without ionic liquid additive. While the ion conductivity is increased from 5.94 mS/cm to 15.54 mS/cm. This phenomenon is also observed in 0.7 M $MgCl_2/AlCl_3$-DME electrolyte (FIG. 26B).

Figure 27A:
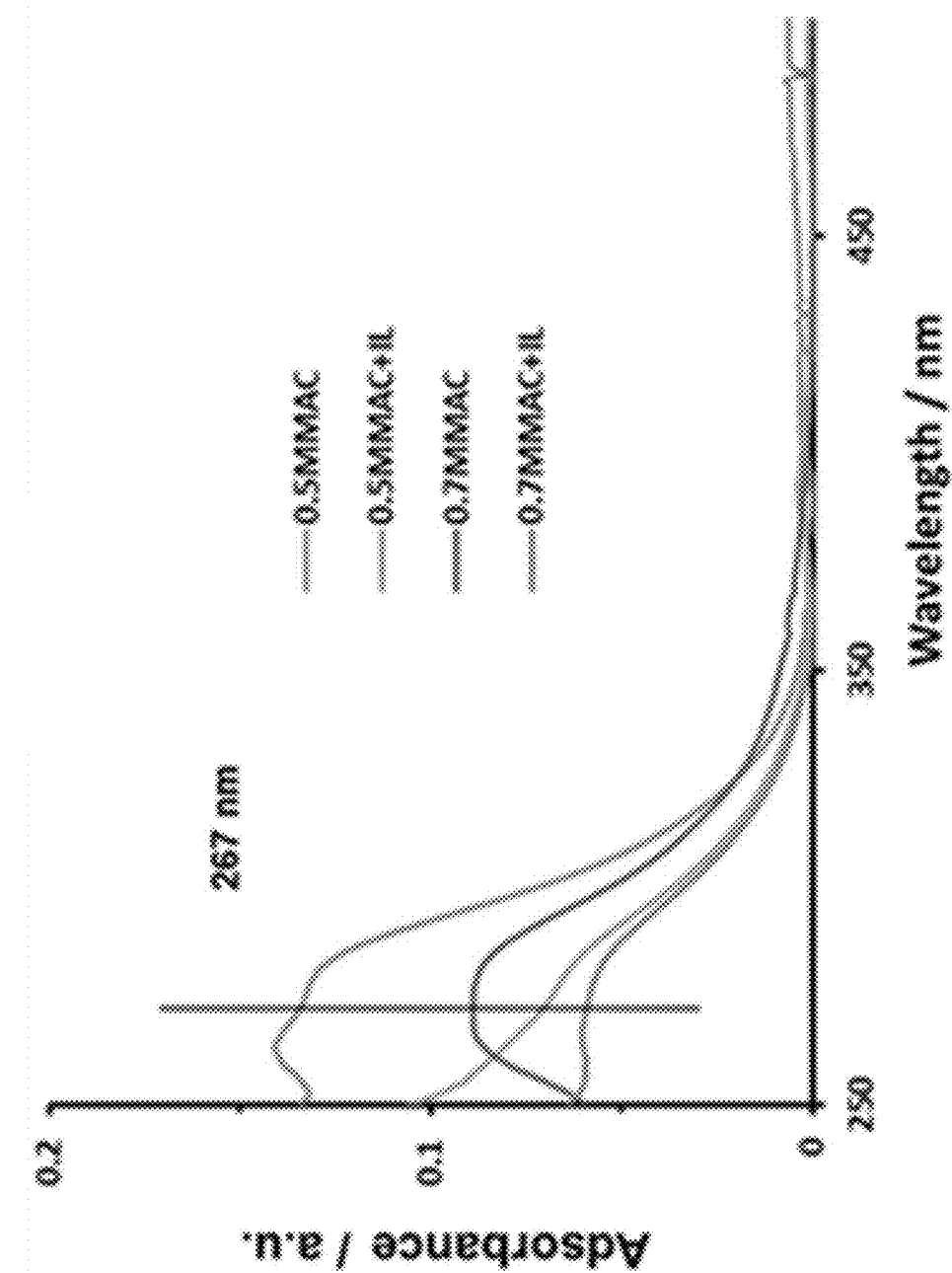
FIG. 27A-FIG. 27B: Ultra violet (UV)-visible (vis) spectra comparison of sulfur saturated Mg/MgCl$_2$/AlCl$_3$-DME electrolyte with and without ionic liquid.
Figure 27B:
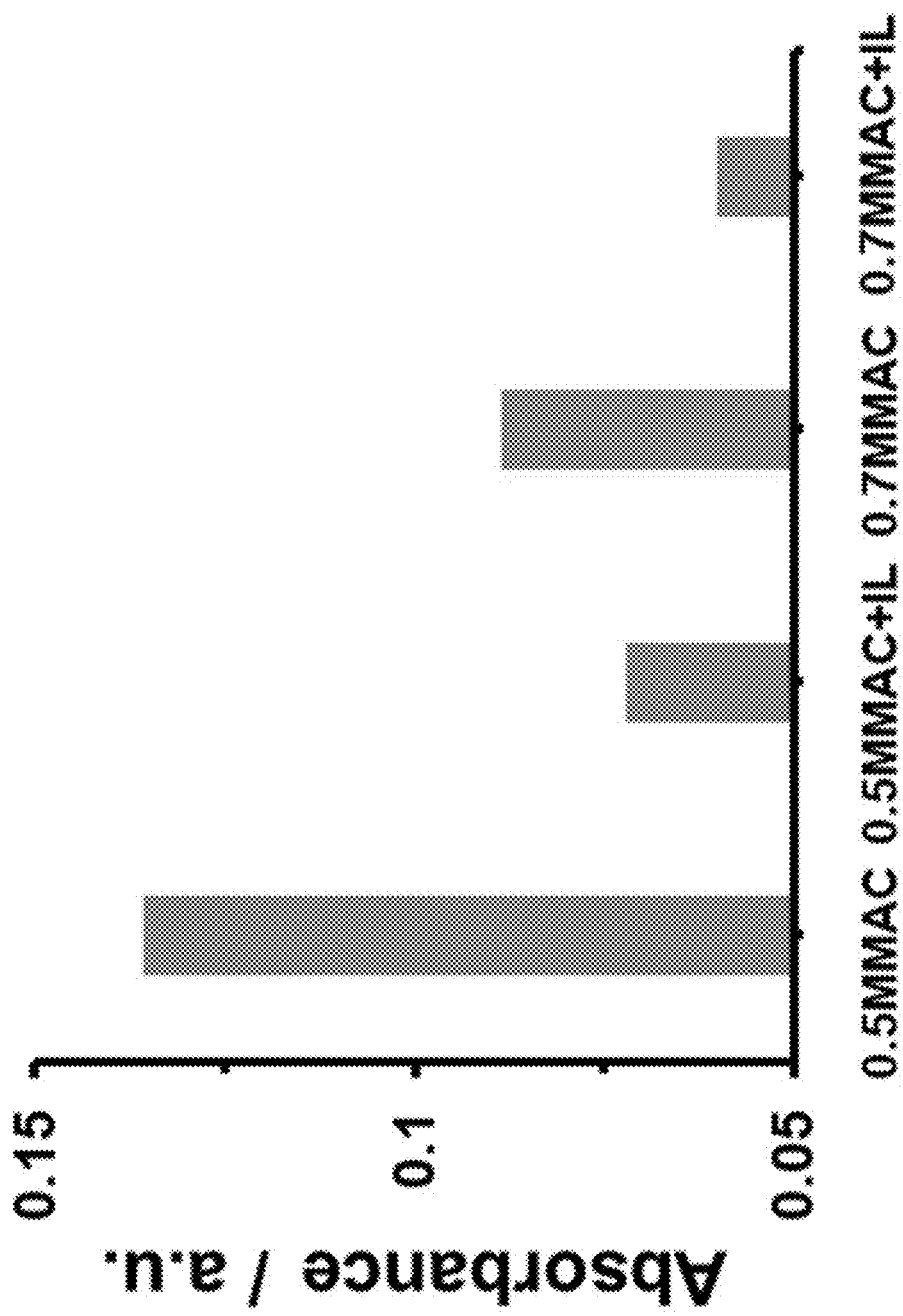

Then we compared the sulfur solubility in different electrolytes. Excess sulfur was soaked in electrolyte for 10 days, then the electrolytes were filtered and diluted for UV-vis tests. As compared in FIG. 27A, sulfur peak at 267 nm was tested. With saturated Py14AlCl$_4$ ionic liquid additive, sulfur solubility is significantly suppressed (FIG. 27B). The result provides the experimental evidence that Py14AlCl$_4$ could decrease the sulfur/magnesium polysulfide solubility in MgCl$_2$/AlCl$_3$-DME electrolyte to help the stable Mg—S battery cycling.

Figure 28A:
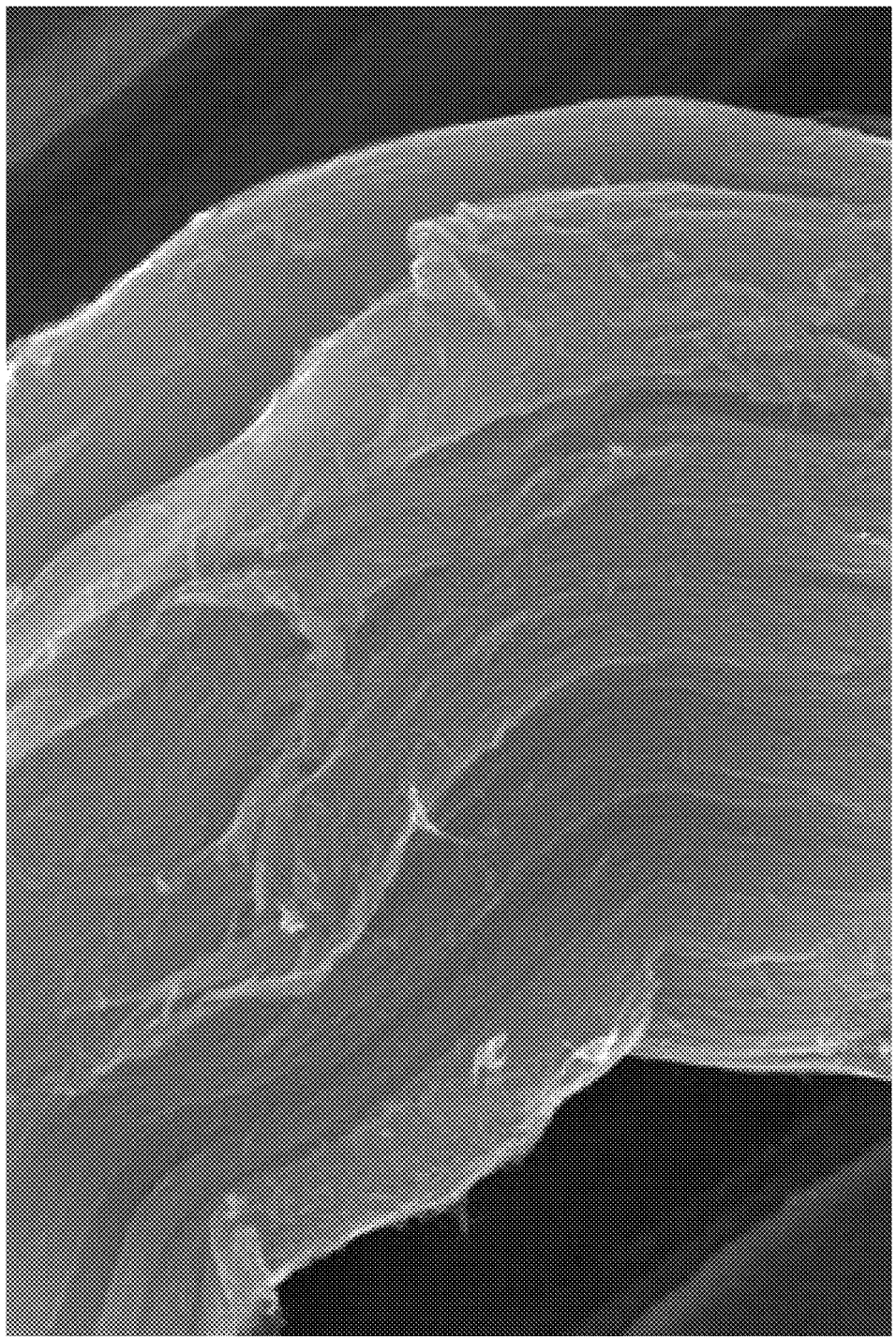
FIG. 28A-FIG. 28C: SEM image and EDX spectroscopy mapping results of mesoporous carbon and sulfur filled mesoporous carbon.
Figure 28B:
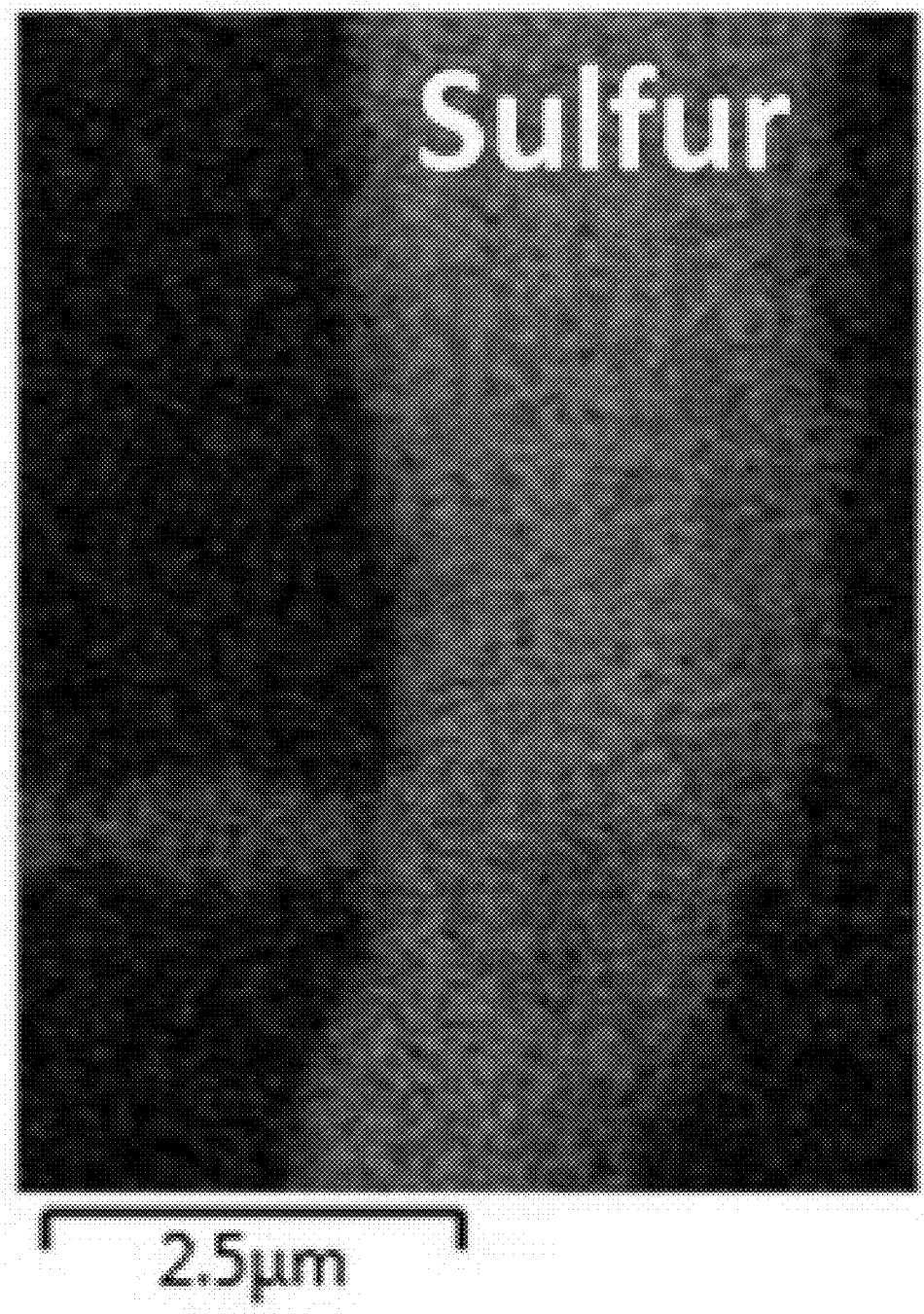
Figure 28C:

Mg/S Battery Studies with Improved Designed Sulfur Electrode
CMK/S Cathode Material with MMAC-IL Electrolytes:

Ordered mesoporous carbon (CMK) was purchased from ACS Material LLC, sulfur, magnesium chloride (99.99%), aluminum chloride (99.999%), N-Methyl pyrrolidone (NMP) was purchased from Sigma-Aldrich, graphite was purchased from Alfa-aser, carbon black (C45) and polyvinylidene fluoride (PVdF) was ordered from MTI, carbon paper was purchased from Fuel Cell Store. CMK was oxidized in nitric acid at 80° C. for 2 h before combing with sulfur. In order to prepare carbon and sulfur complex cathode material, CMK and sulfur were grinded and sealed into hydrothermal autoclave, then heated at 165° C. for 12 hours. After heating, CMK/S complex was transferred to an Ar filled glovebox to avoid moisture absorption. CMK/S, PVdF, and carbon black were used to prepare electrode materials at ratio of 8:1:1 and dispersed in NMP solvent. After stirring for 6 hours, the slurry was coated onto carbon paper, then dried at 80° C. for 12 hrs. The coated carbon paper was pouched to φ1.0 cm disc and used as a cathode in magnesium sulfur battery. Ordered mesoporous carbon (CMK) has order porous space to store sulfur. The melted sulfur could diffuse into the porous in CMK and form CMK/S complex. As shown in FIG. 28A-FIG. 28C, sulfur is uniform in the CMK/S complex.

Figure 29A:
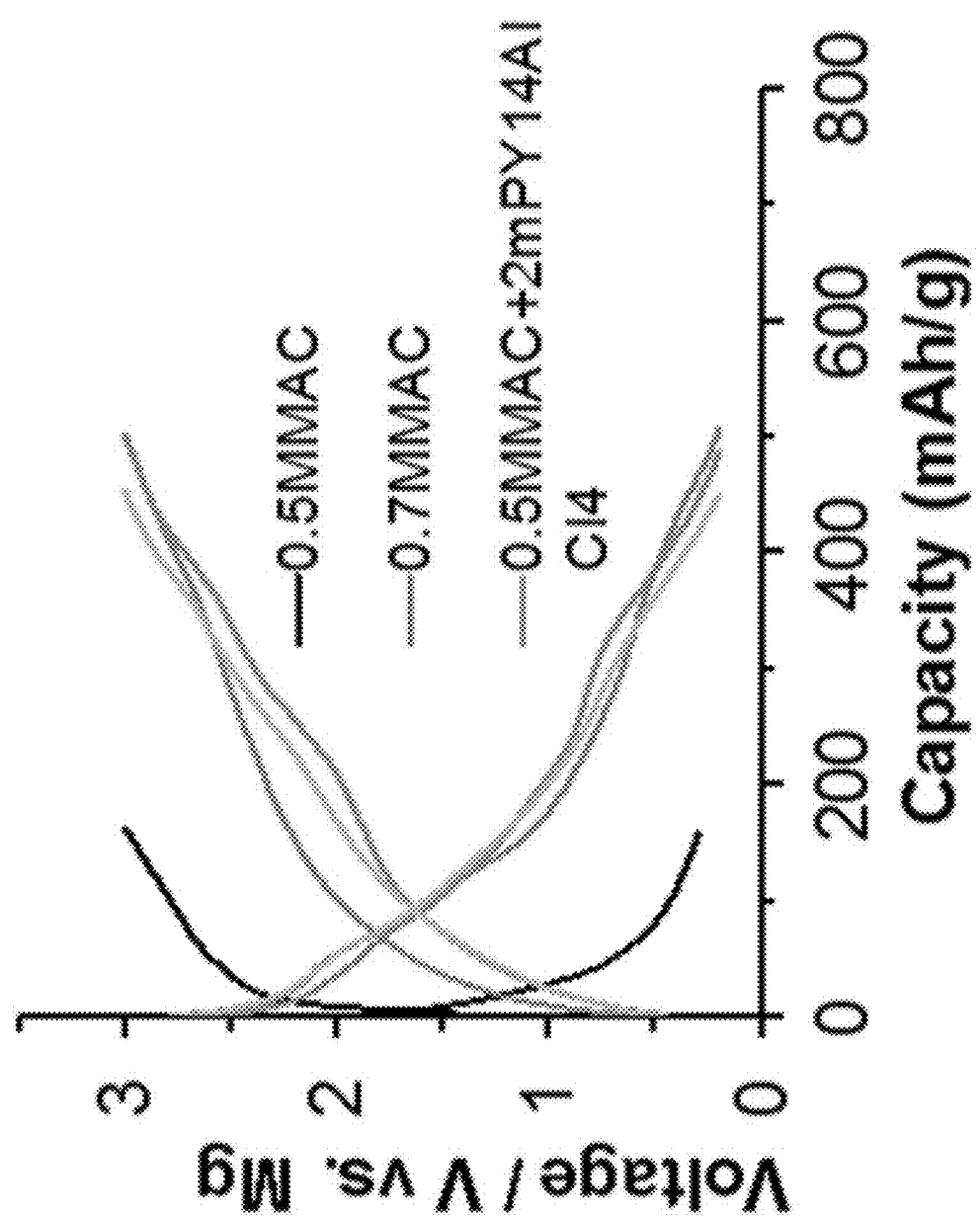
FIG. 29A-FIG. 29B.
Figure 29B:
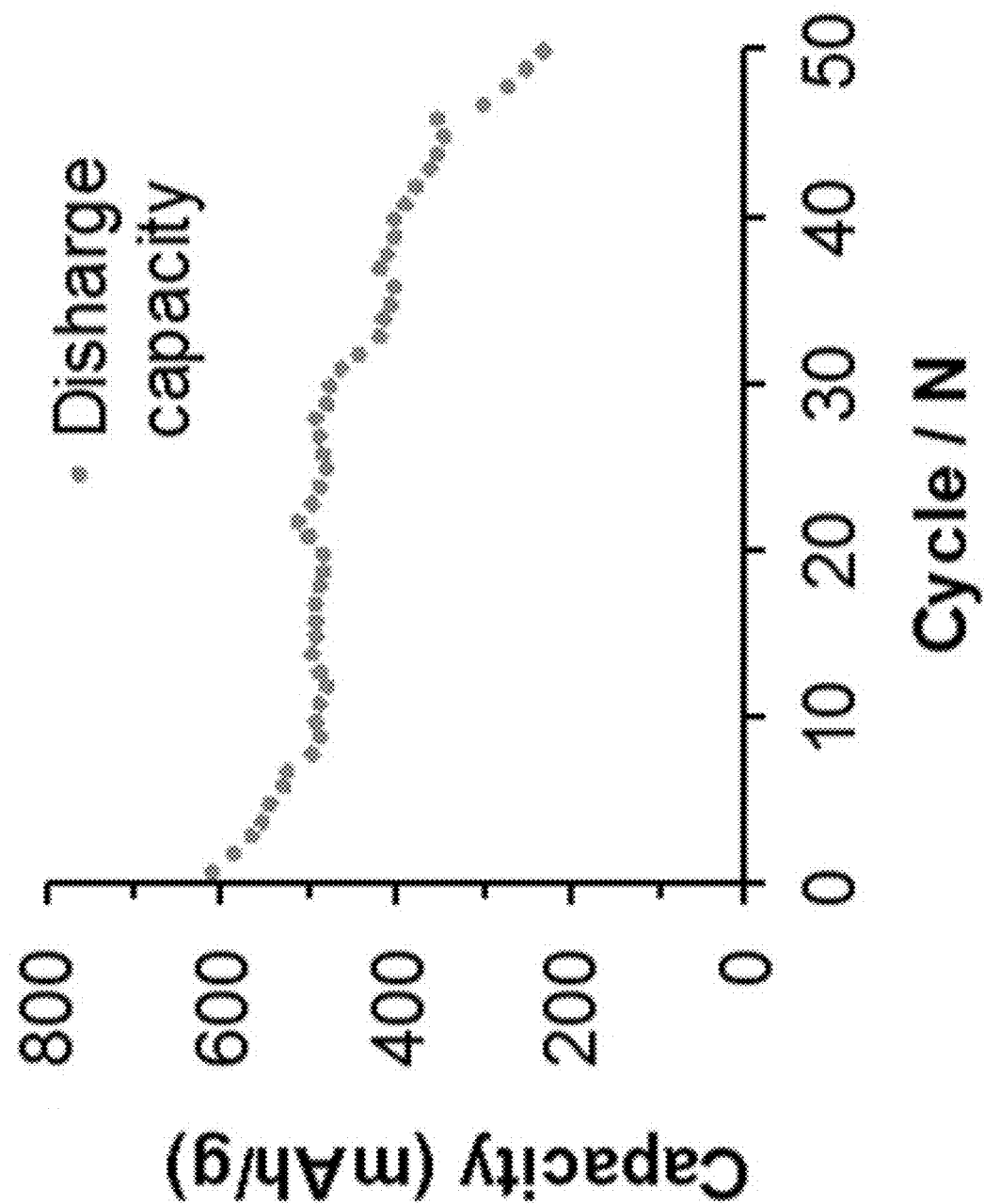

The optimized Mg/MgCl$_2$/AlCl$_3$-DME/Py14AlCl$_4$ electrolytes were used in magnesium-sulfur battery with the CMK/S electrode. The electrochemical performance is compared in FIG. 29A. At 0.1 C current density, the discharge capacity of magnesium-sulfur battery with 0.7 M MMAC, 0.5 M MMAC/2M Py14AlCl4, and 0.7 M MMAC/1.2M Py14AlCl4 are 509 mAh/g, 496 mAh/g, 467 mAh/g, respectively. Without Py14AlCl4 additive, the discharge capacity of magnesium-sulfur battery with 0.5 M MMAC electrolyte displayed only 180 mAh/g capacity and large polarization, confirming the importance of the ionic additive. As seen, the Mg—S batteries have an average cell voltage of 1.75 V. Then the Mg—S (CMK/S) battery was tested with 0.5 M MMAC/2M Py14AlCl4 for 60 cycles (FIG. 29B). As seen in FIG. 29B, CMK/S cathode could deliver an initial capacity of 605.7 mAh/g at 100 mA/g current density. Slow capacity decay was observed due to the dissolution of MgS$_X$ (Mg polysulfides). However, without the Py14AlCl4 additive, 0.5 M MMAC did not show stable cyclability even for 20 cycles. Thus, 0.5 M MMAC/2M Py14AlCl4 electrolyte was used in subsequent battery studies.

Sulfur Cathode Material Based on Graphene Oxide (GO)/Carbon Nanotube (CNT) 3D Carbon Framework (GO/CNT/S):

Graphene oxide (GO) was prepared by modified Hummer method. GO/S complex was prepared by one pot reaction. First, 127 mg elemental sulfur and 104 mg Na$_2$S was stirred in 14 mL of water/ethanol (5:2 volume ratio) mixture at room temperature for 12 hours. The 12 mL of generated Na$_2$S$_x$ was dropped into 14 mL water/ethanol (1:1 volume ratio) mixed solvent which has 20 mg GO and 3 mg cetyltrimethylammonium bromide. The mixture was stirred at 40° C. for 9 h and then at 60° C. for another 9 h. The pH was adjusted to 5-6 using 0.5 M formic acid aqueous solution and continued to stir for another 9 h. After that, a dispersion of 6 mg of CNT in 3 mL of ethanol was added to the suspension and stirred for 2 h. The product was collected by filtration, rinsing and drying at 70° C. overnight. Finally, the product was sealed in hydrothermal autoclave at 165° C. for 12 h.

Figure 30A:
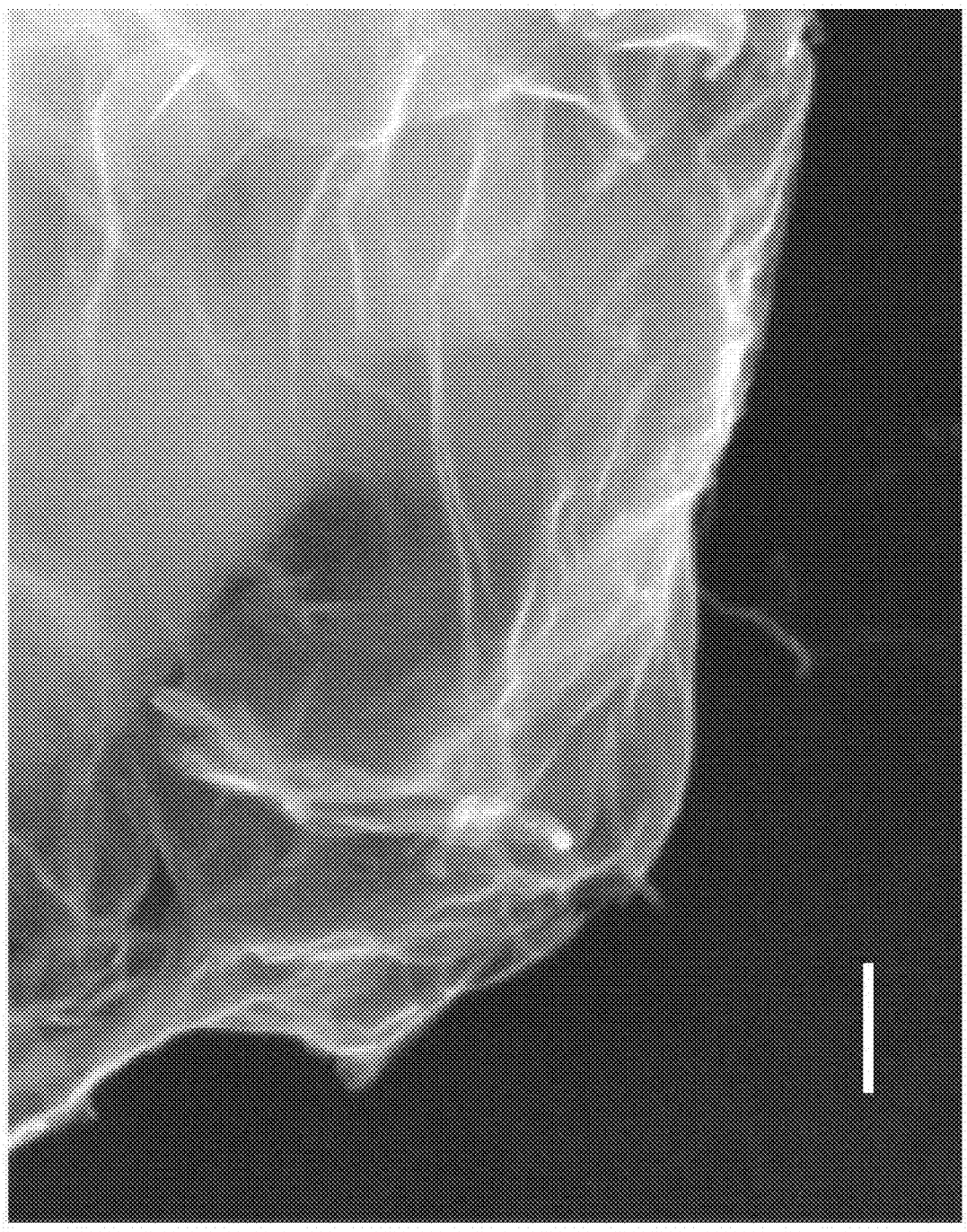
FIG. 30A-FIG. 30C: Morphology and electrochemical performance of Graphene (GO)/carbon nanotube (CNT)/S cathode in Mg—S battery.
Figure 30B:
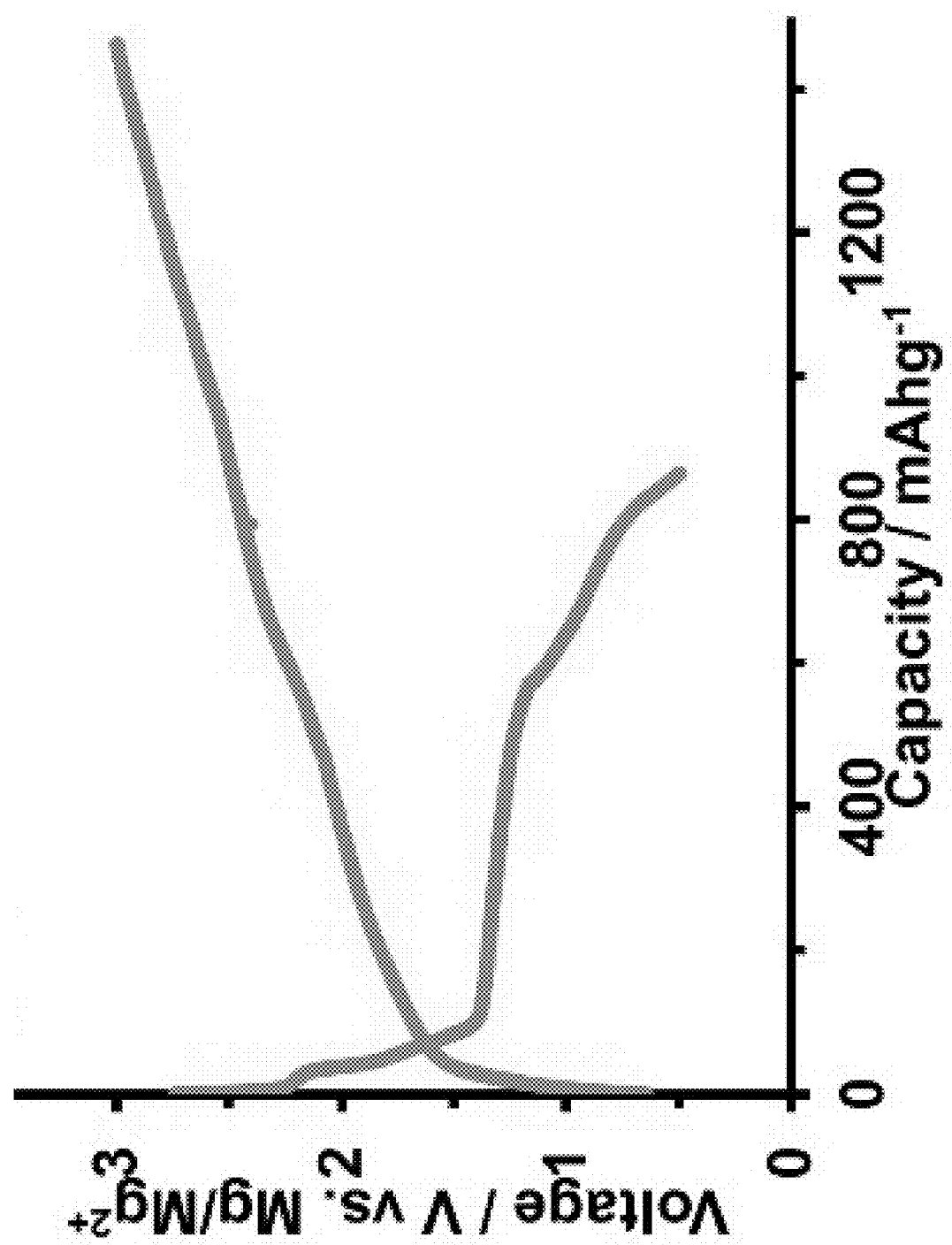
Figure 30C:
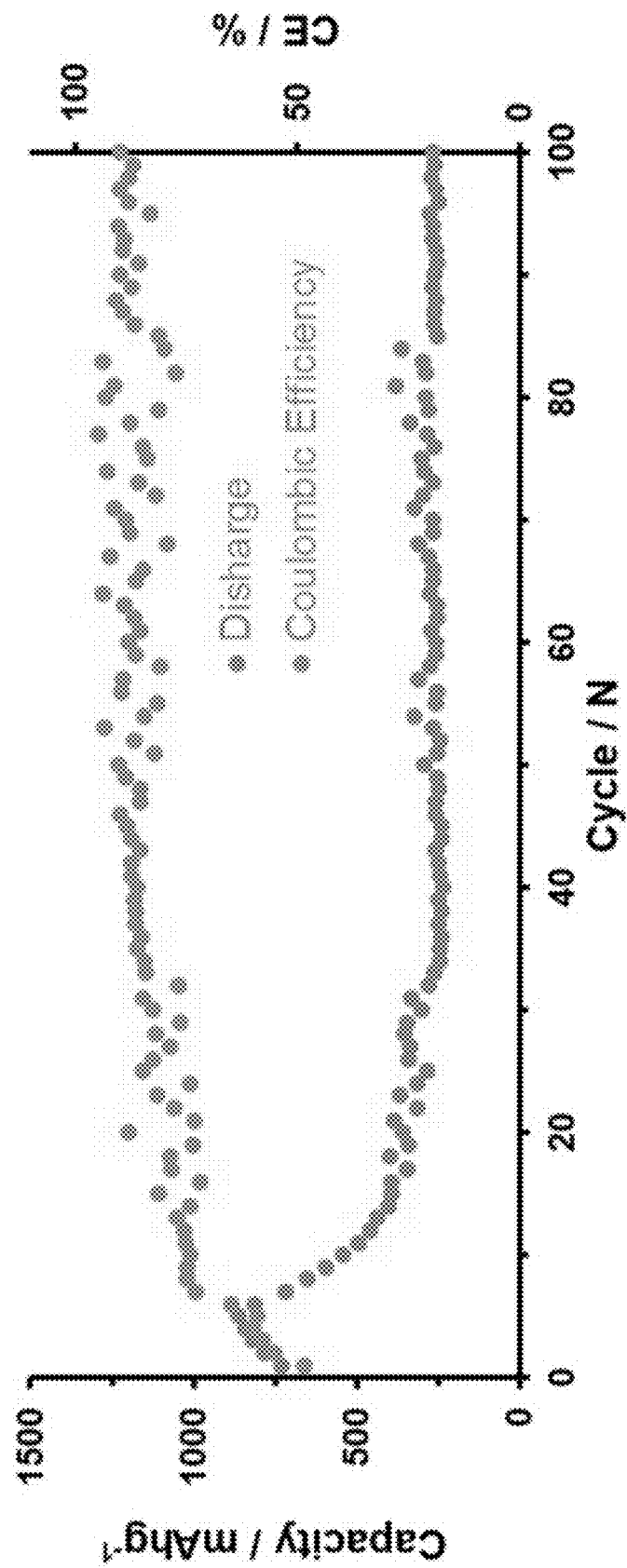

We sought to study the alternative design of sulfur cathodes. Graphene oxide has abundant oxygenic groups which have the ability to trap soluble MgS$_x$ by chemical bonding. A modified Hummer method (see, e.g., Park, J.; Kim Eui, T.; Kim, C.; Pyun, J.; Jang, H.-S.; Shin, J.; Choi Jang, W.; Char, K.; Sung, Y.-E. The Importance of Confined Sulfur Nanodomains and Adjoining Electron Conductive Pathways in Subreaction Regimes of Li—S Batteries Adv. Energy Mater. 2017, 7, which is incorporated by reference herein in its entirety) was used to prepare graphene oxide by reacting with sodium polysulfide and formic acid to form graphene oxide and sulfur (GO/S) composite cathode material. In order to further chemical trapping MgS$_x$, carbon nanotube was added during GO/S composite preparation. The prepared GO/CNT/S cathode material is shown in FIG. 30A-FIG. 30C. This structure could physically hold the elemental sulfur and magnesium polysulfide inside during charge and discharge process. Using the GO/CNT/S cathode material, magnesium sulfur battery could deliver 763.9 mAh/g capacity at 100 mA/g current density. The discharge capacity is higher than CMK/S cathode material. It means that more sulfur is involved in Mg/MgS$_x$ redox reaction which contribute to the capacity. The capacity contribution is believed that contributed from 3D carbon framework composite of graphene oxide and carbon nanotube. After a 20 cycle stabilization process, the Mg—S battery could maintain a stable capacity around 267.4 mAh/g for the rest of cycling. The capacity retention ratio is higher than CMK/S cathode (FIG. 29B). Due to the higher surface area and more surface function group (hydroxide, carboxyl, carbonyl, et al.) than CMK, 3D carbon framework has higher ability to hold sulfur and trap magnesium polysulfide to improve the cycle stability.

Example 4

Mg Treatment on Different Mg Salts—II

Materials & Methods

MgCl$_2$ (99.99%), AlCl$_3$ (99.999%) were purchased from Sigma-Aldrich without additional treatment prior to use. Mg(TFSI)$_2$ (99.5%) was purchased from Solvionic (France), and heated at 200° C. under vacuum for 48 hrs before use. Mg powder was purchased from Alfa-Aesar (99.8%, 325 mesh, particle size <45 µm) and used as received. Mg strips (99.5%) were purchased from GalliumSource and polished with sandpaper in a glovebox before use. Tetrahydrofuran (THF) and dimethoxyethane (DME) were purified by distillation with Na before use. Diglyme (DGM) and triglyme (TGM) were stirred with Na metal for two days. Diproply sulfone (DPSO) was purchased from TCI and used without further purification. Mesoporpous carbon (CMK-8) was purchased form ACS material, LLC. Sulfur was purchased from Sigma-Adrich.

For MgCl$_2$/AlCl$_3$ and MgCl$_2$/Mg(TFSI)$_2$ electrolytes, magnesium salts and AlCl$_3$ were weighted and added into a 5 mL vial, then the needed solvents were added into the vial. For the Mg powder treatment, 5 mg/mL Mg powder was added into the solution. All the electrolytes were stirred and heated at 45° C. for 6 hours to totally dissolve magnesium salts. For $MgCl_2$ electrolyte in THF/DPSO, 95 mg $MgCl_2$ and 10 mg Mg powder were added into 2 mL mixture solvent of THF and dipropyl sulfone (V/V=1/1). Then the mixture was heated at 50° C. for 8 hours. Mg powder in the electrolytes was removed by filtration before any electrochemical tests.

Electrolytes were tested via a three electrodes cell in an argon atmosphere glovebox (where $H_2O$<1 ppm, $O_2$<1 ppm) and performed by a Gamry Interface 1000E. The three electrodes cell is assembled with a glassy carbon (GC, 1.0 mm diameter) as working electrode, a carbon rod as counter electrode and Mg strip as reference electrode. Cyclic voltammetry (CV) and linear sweep voltammetry tests were conducted at the scan rate of 50 $mVs^{-1}$.

The Mg ion battery was tested in 2032 coin cells. CMK-8 and sulfur were mixed and ground homogeneously in a mortar, then heated at 155° C. in a stainless reactor for 12 h. The cathode was prepared by using the CMK/S active material, PVDF and carbon additive with 7:2:1 mass ratio. Polished Mg metal disc worked as the anode. The batteries were tested on Land battery tester (Wuhan, China) between 0.5 and 2.5 V vs. Mg at 10 $mAg^{-1}$ current density.

Results & Discussion

Figure 31A:
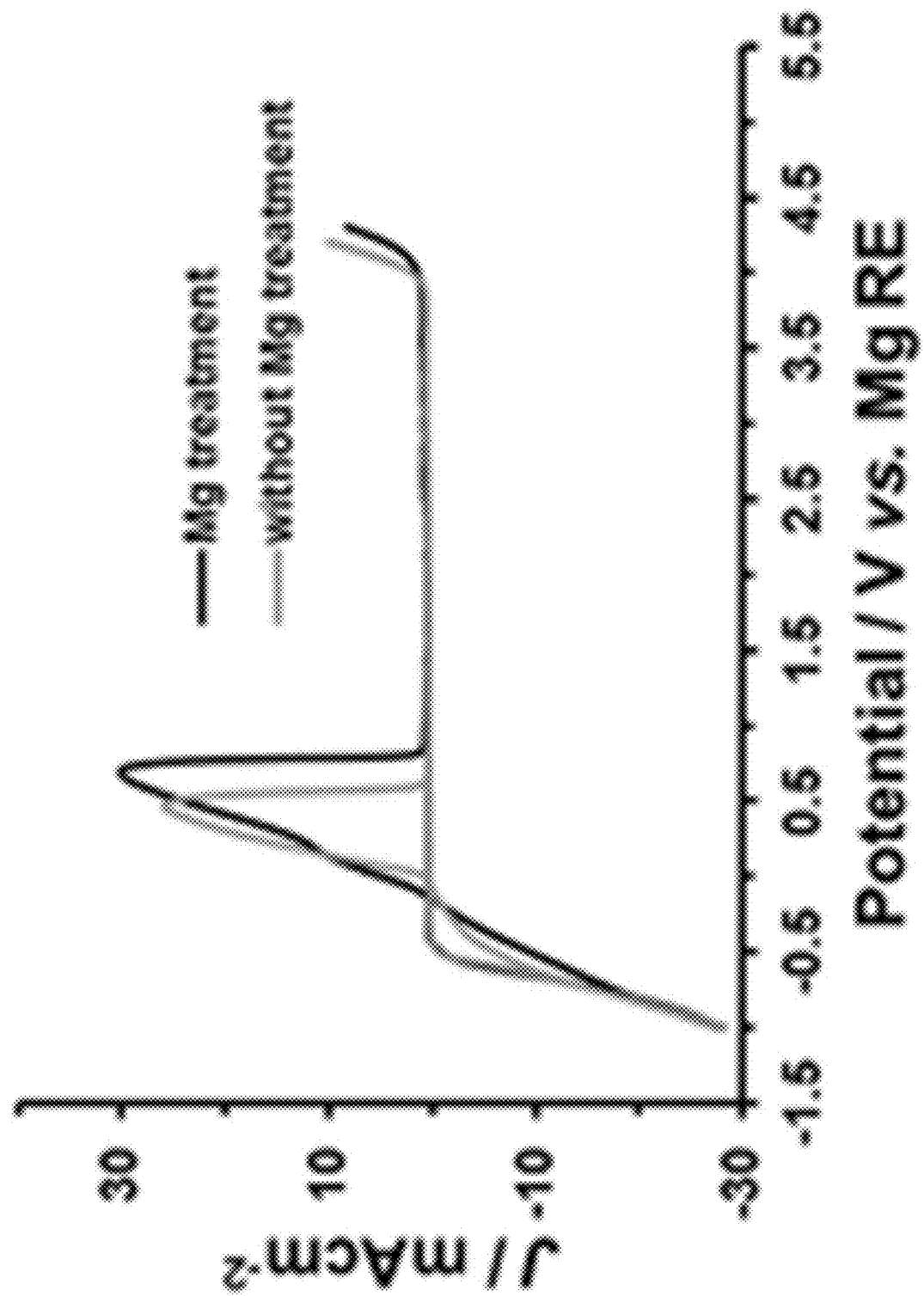
FIG. 31A-FIG. 31B: Comparison of 0.4 M MgCl$_2$ and 0.8 M AlCl$_3$ in TGM with and without Mg powder treatment.
Figure 31B:
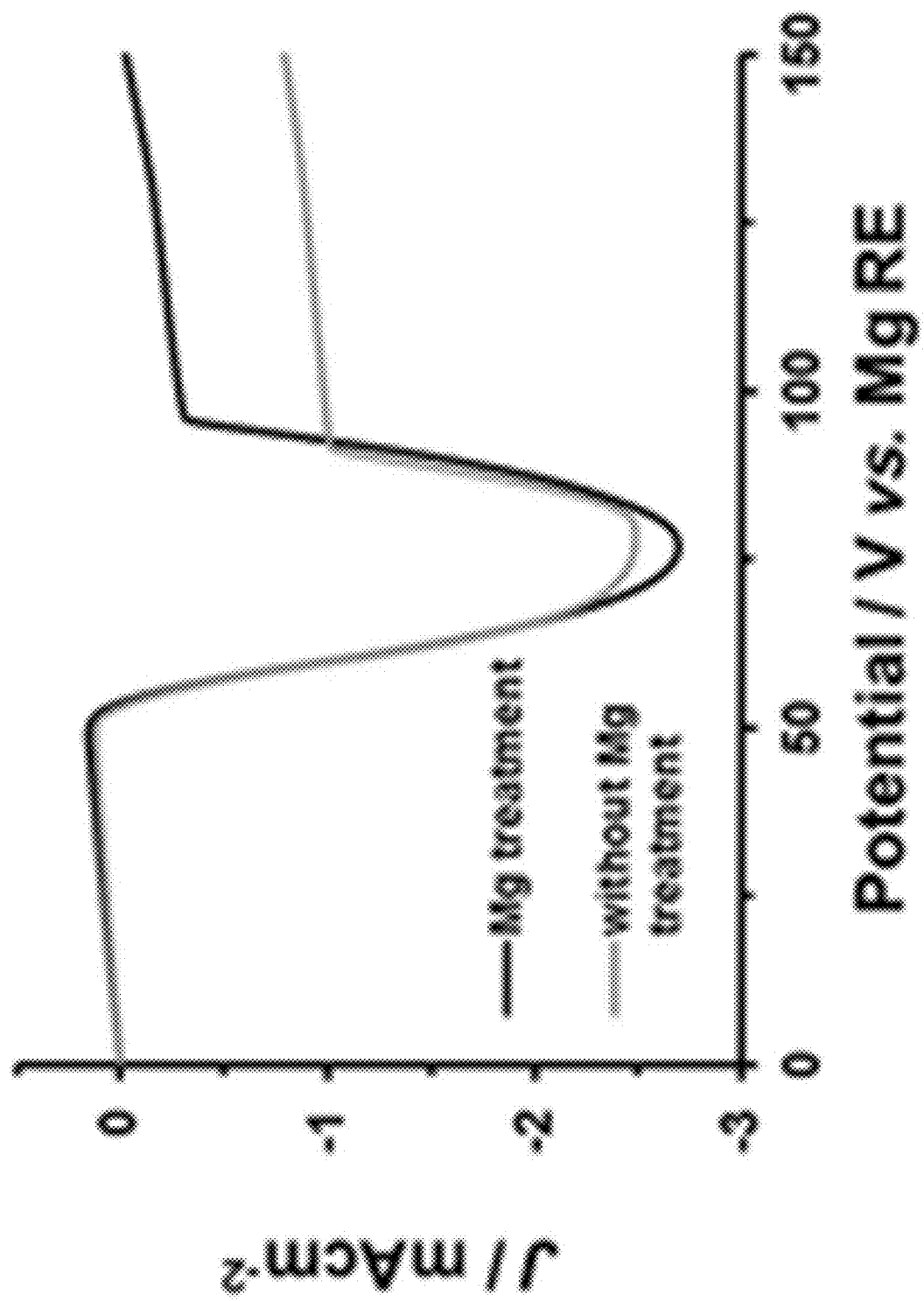

Ternary $Mg/MgCl_2/AlCl_3$ electrolytes in THF, DME, and DGM (MMAC) presented outstanding electrochemical performance in our previous example, which is attributed to the Mg powder scavenger to remove deleterious species such as $H_2O$. Herein, Mg powder treatment was further studied in TGM solvent with an 1:2 ratio of $MgCl_2$ and $AlCl_3$. After heated with Mg powder at 45° C. for 6 hours, over potential of 0.4 M $MgCl_2$/0.8 M $AlCl_3$-TGM electrolyte was decreased from 436 mV to 249 mV (FIG. 31). Coulombic efficiency of Mg powder treated electrolyte was increased to 86% (FIG. 1A), which is much higher than the one without Mg treated (57%), as compared in FIG. 1B. In TGM solvent, Mg powder also contributes to the improvement of anodic stability. The onset decomposition potential was increased by 0.1 V after Mg powder treatment.

Figure 32A:
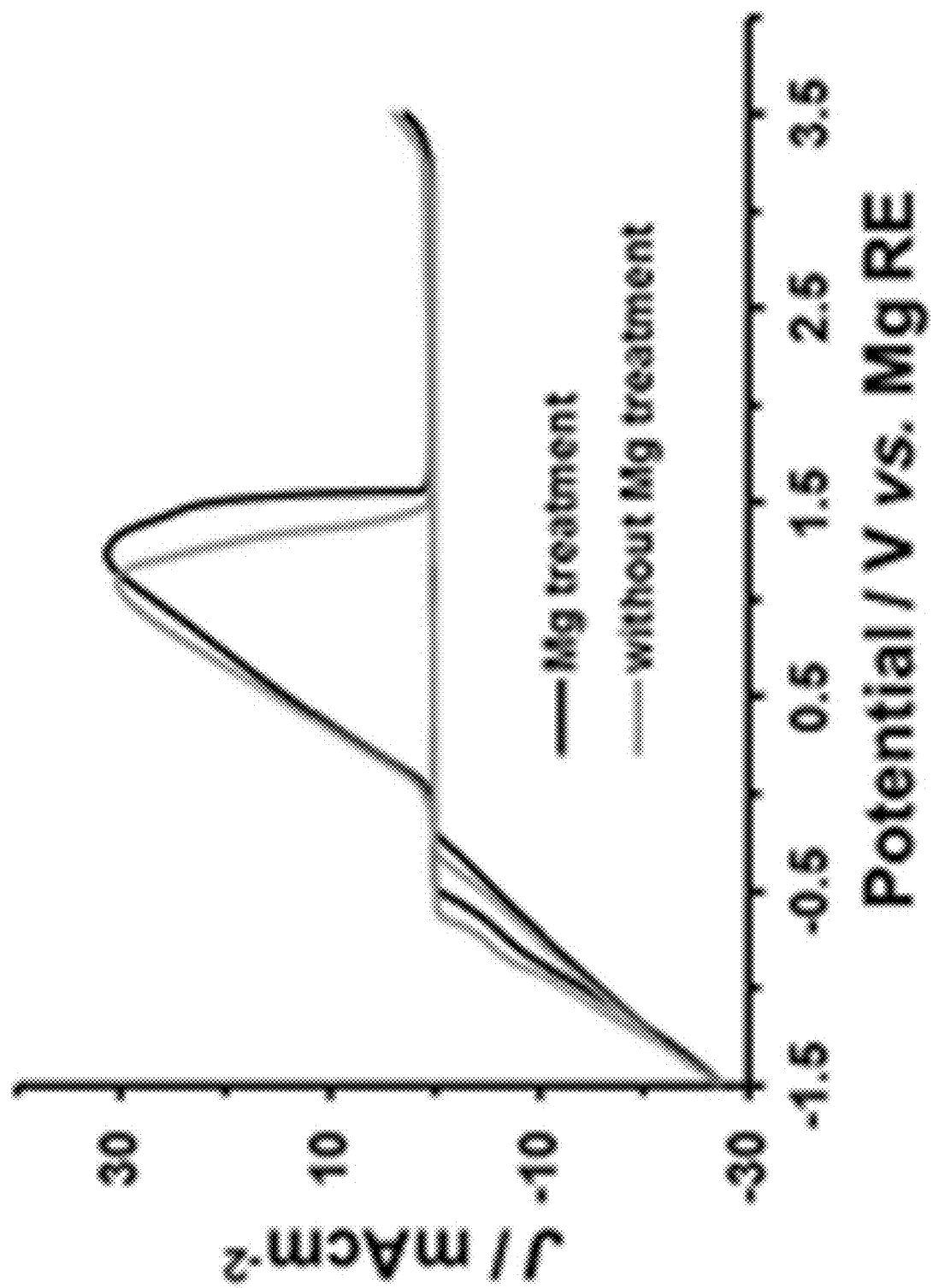
FIG. 32A-FIG. 32B: Comparison of 0.5 M MgCl$_2$ in THF and DPSO with and without Mg powder treatment.
Figure 32B:
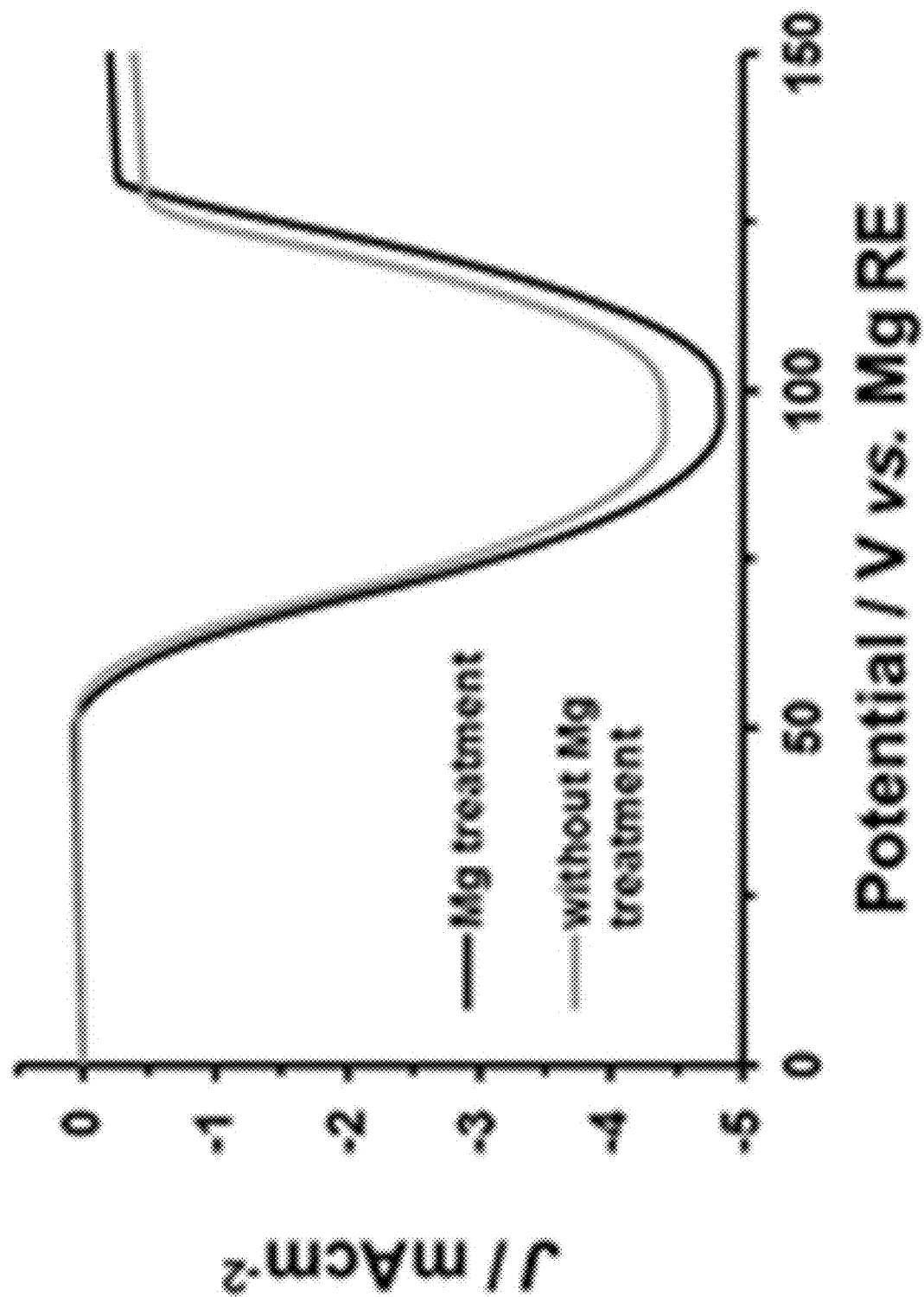

Pure $MgCl_2$ was dissolved into THF/DPSO (dipropyl sulfone) mixed solvent at 1:1 ratio. As shown in FIG. 32A-FIG. 32B, the Mg deposition onset potential of Mg powder treated electrolyte was −449.2 mV, which is 73.7 mV more positive than that of without Mg treated electrolyte. This difference illustrates that the Mg ion is easier to reduce and deposit on the electrode after Mg powder treatment. Columbic efficiency was increased from 90.1% to 94.5% after the Mg powder treatment.

Figure 33A:
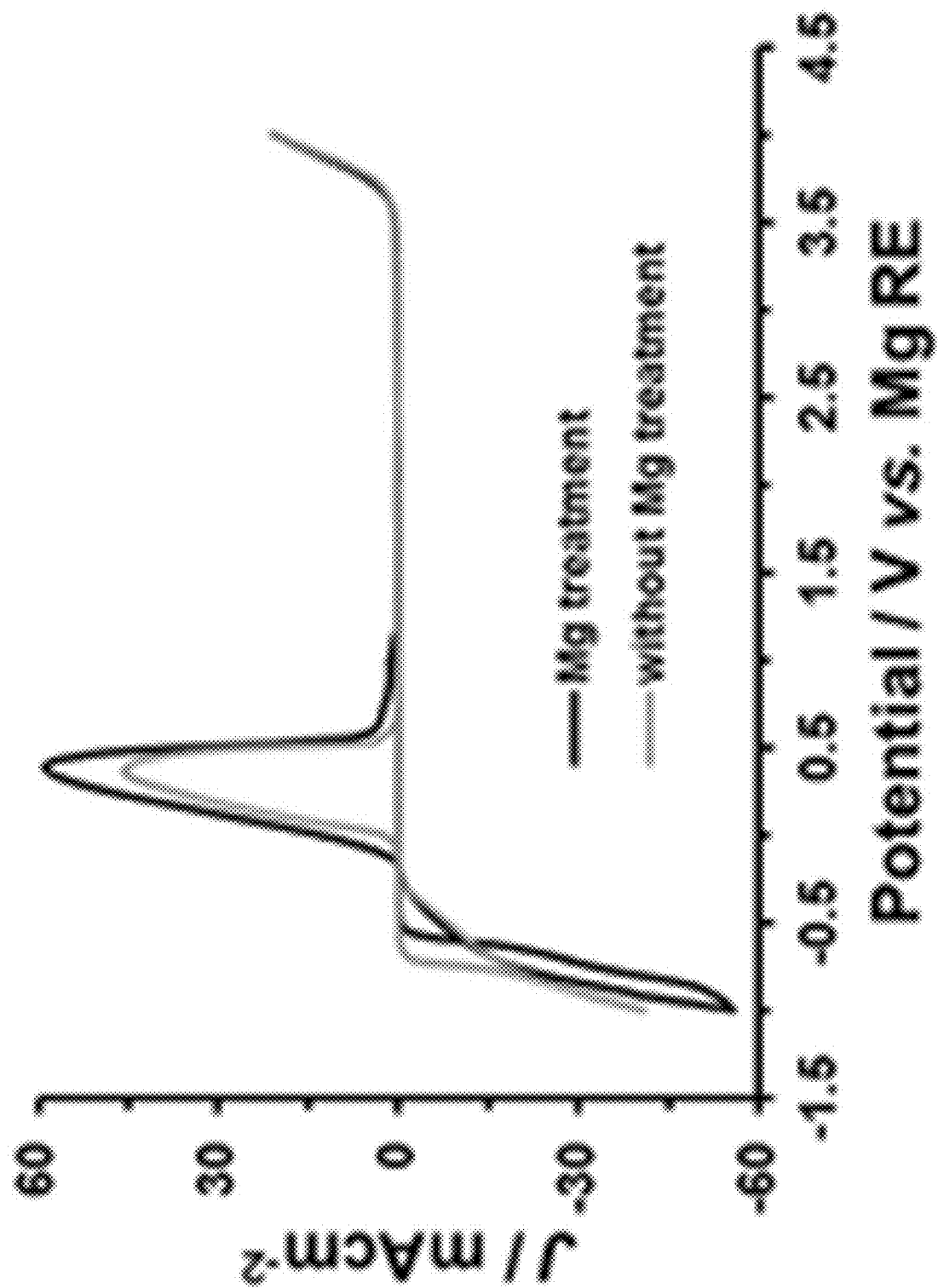
FIG. 33A-FIG. 33B: Comparison of 1.0 M MgCl$_2$ and 0.5 M Mg(TFSI)$_2$ in DME with and without Mg powder treatment.
Figure 33B:
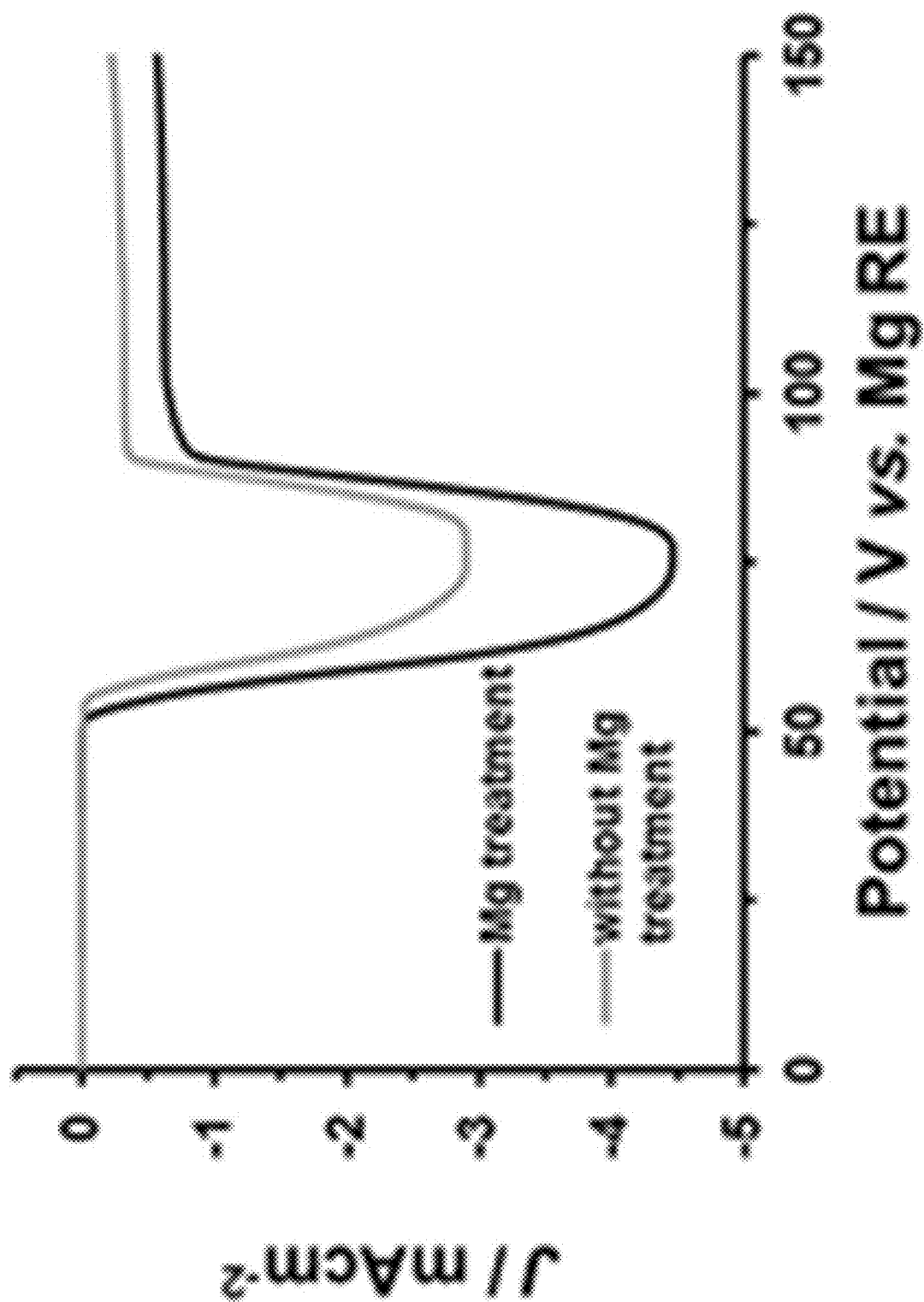

Although $Mg(TFSI)_2$ is reported to show reversible deposition and stripping, the kinetics is very poor. When combined with $MgCl_2$ which is considered as Lewis base, the formed $MgCl_2/Mg(TFSI)_2$ electrolyte could display better performance. The $Mg(TFSI)_2/MgCl_2$ combination was studied in DME solvent firstly. Mg powder treatment method was also introduced to this system. 326 mV over potential between Mg plating and stripping was observed in 1.0 M $MgCl_2$ and 0.5 M $Mg(TFSI)_2$ in DME. The Mg plating onset potential was positively shifted to −435 mV (vs Mg), the overpotential was decreased to 154 mV after Mg powder treatment. Anodic stability of these two electrolytes are almost the same, as shown in FIG. 33A. The Mg plating and stripping current density of the $Mg/MgCl_2/Mg(TFSI)_2$ electrolyte is higher than the untreated electrolyte, although coulombic efficiency electrolyte is slightly lower (FIG. 33B). The results indicated that Mg powder could increase the electrolyte activity.

Figure 34A:
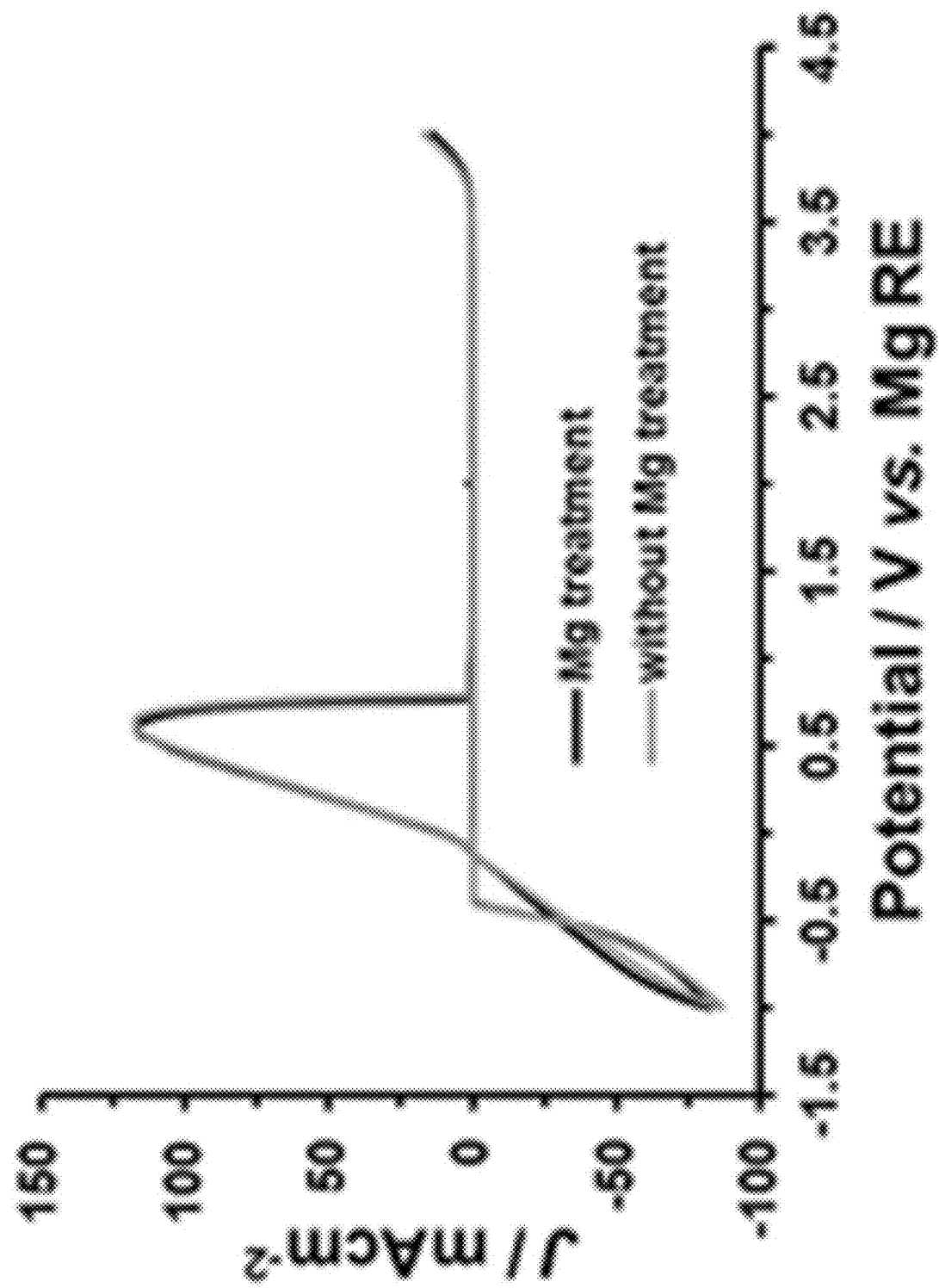
FIG. 34A-FIG. 34B: Comparison of 0.5 M MgCl$_2$ and 0.5 M Mg(TFSI)$_2$ in DME with and without Mg powder treatment.
Figure 34B:
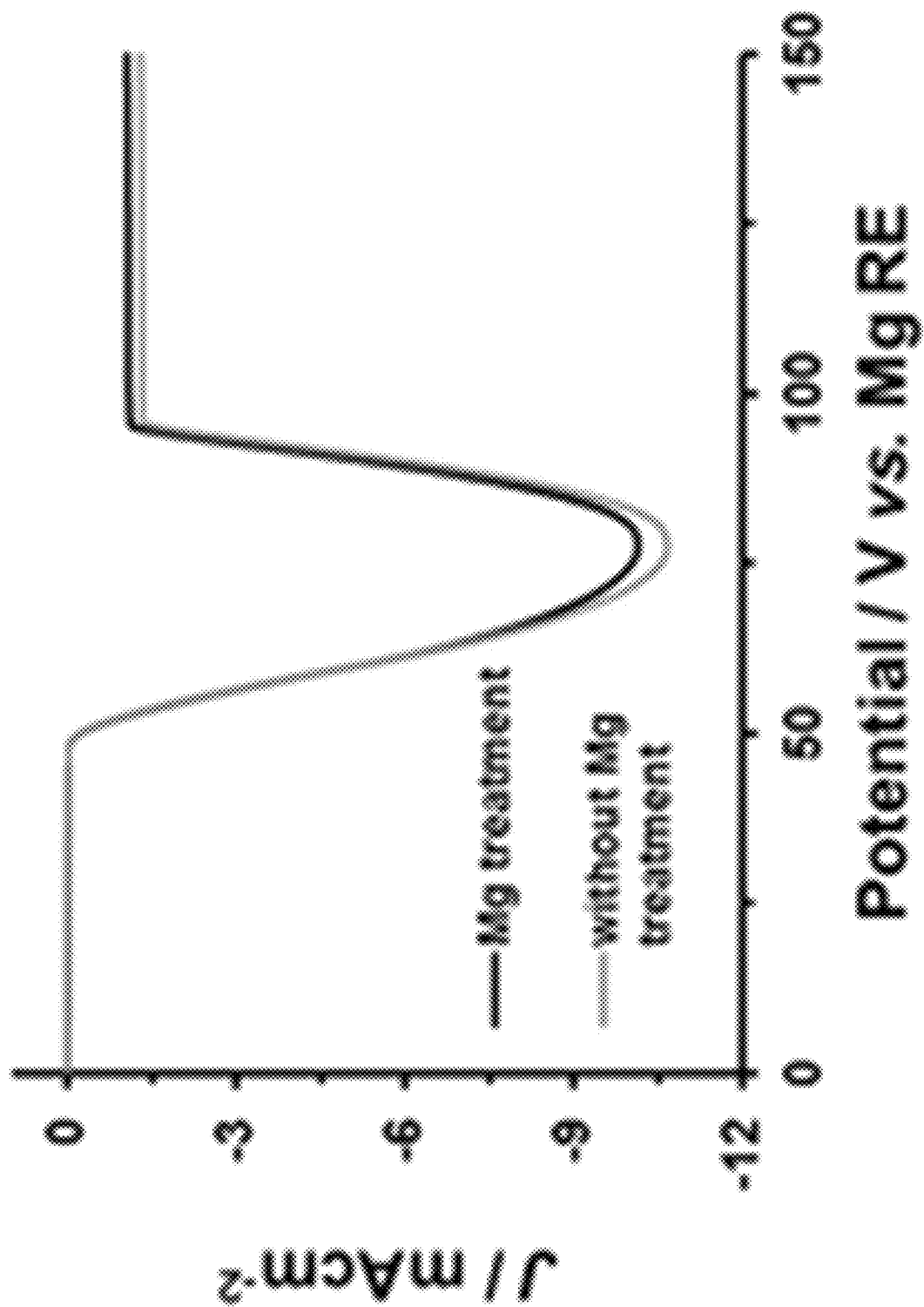

The molar ratio between $MgCl_2$ and $Mg(TFSI)_2$ could influence the chemical structure and thus electrochemical activity of $Mg^{2+}$ active species in the electrolyte. 1:1 ratio of $MgCl_2$ and $Mg(TFSI)_2$ was further studied in DME. Without Mg powder treatment, 0.5 M $MgCl_2/AlCl_3$-DME electrolyte presents 247 mV overpotential and 91% columbic efficiency. Even the electrolyte was heated with Mg powder at 45° C. for 6 h, the over potential, and anodic stability are comparable to untreated electrolyte, as shown in FIG. 34A. Coulombic efficiency of the treated electrolyte was slightly improved (FIG. 34B). It appears that 1:1 ratio of $MgCl_2/Mg(TFSI)_2$ is more stable, and generates a less deleterious species compared to 2:1 ratio of $MgCl_2/Mg(TFSI)_2$.

Figure 35:
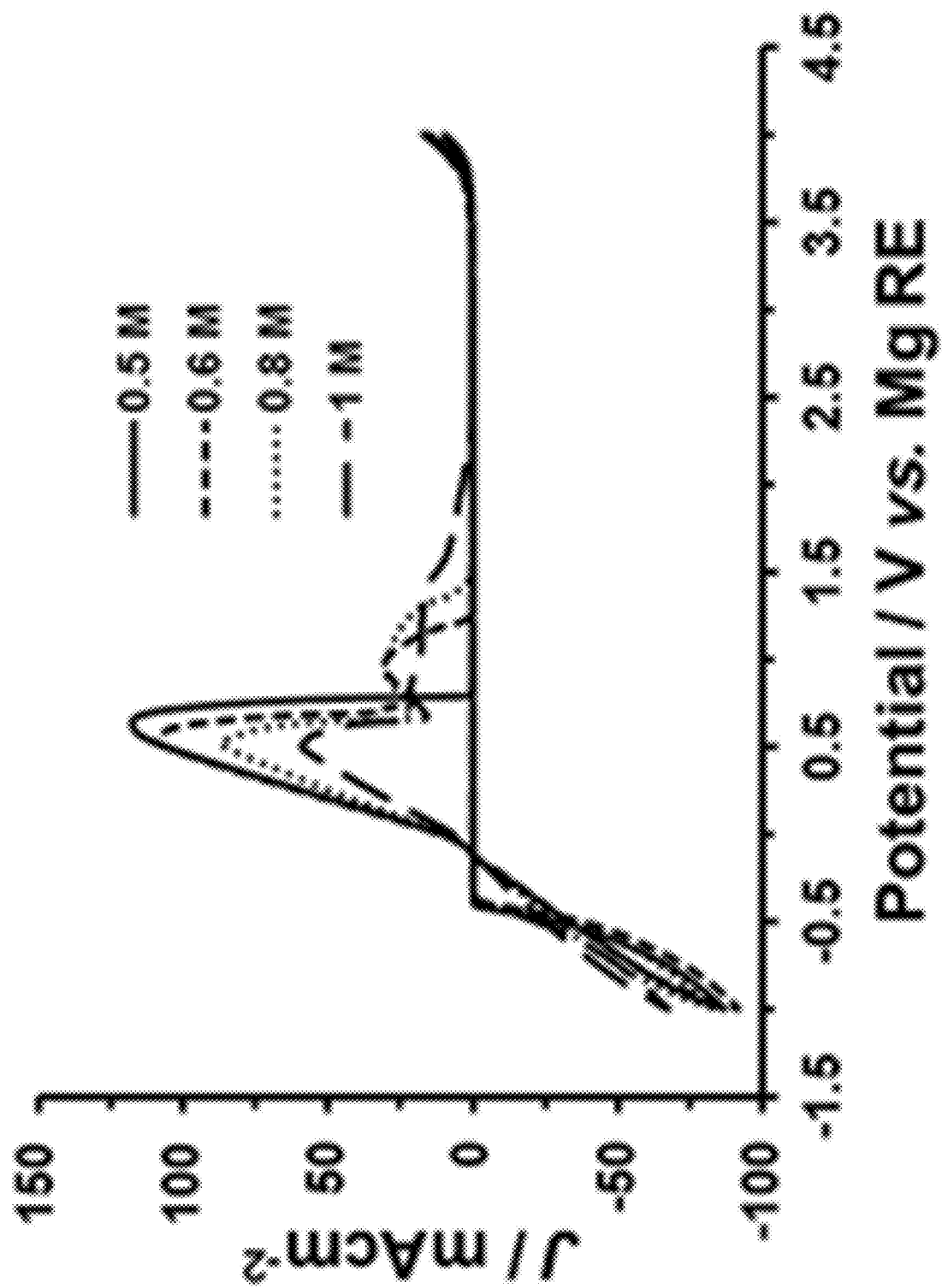
FIG. 35: CV curves of MgCl$_2$/Mg(TFSI)$_2$-DME electrolyte at 1:1 ratio with different concentration.

In order to improve the electrolyte activity, higher concentration $MgCl_2/Mg(TFSI)_2$ electrolytes with 1:1 ratio were studied, as compared in FIG. 35. As the $MgCl_2/Mg(TFSI)_2$ concentration was increased, electrolyte over potential between Mg plating and stripping was decreased. It shows 216 mV, 208 mV and 192 mV for 0.8 M, 0.9 M, 1.0 M electrolytes, respectively, which are smaller than that of 0.5 M $MgCl_2/Mg(TFSI)_2$-DME electrolyte. The current density is decreased as the concentration increasing, which may be due to slower mass transport under the high concentration.

Figure 36A:
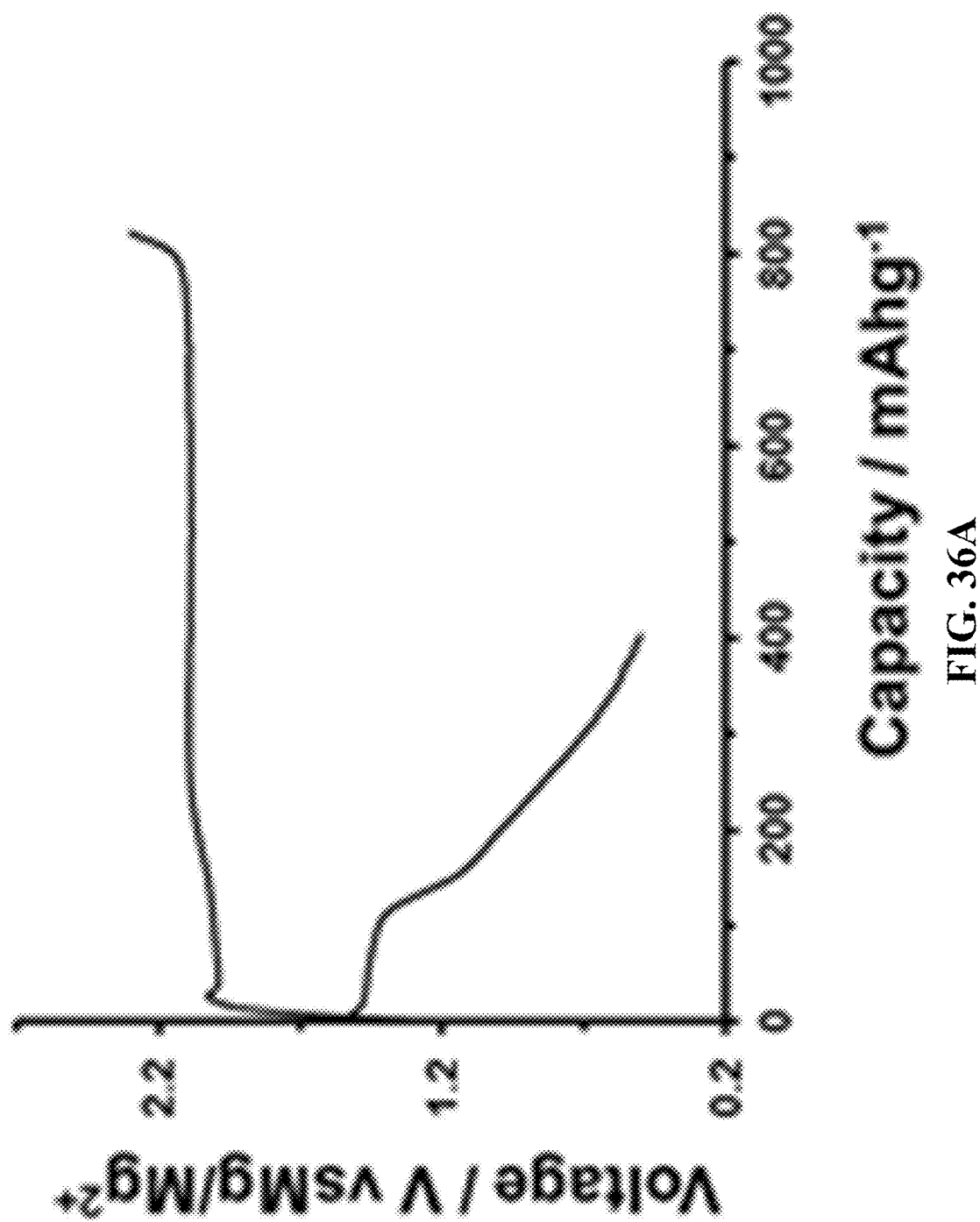
FIG. 36A-FIG. 36B: CMK/S composite as cathode in Mg—S battery with 0.5 M MgCl$_2$/Mg(TFSI)$_2$-DME electrolyte.
Figure 36B:
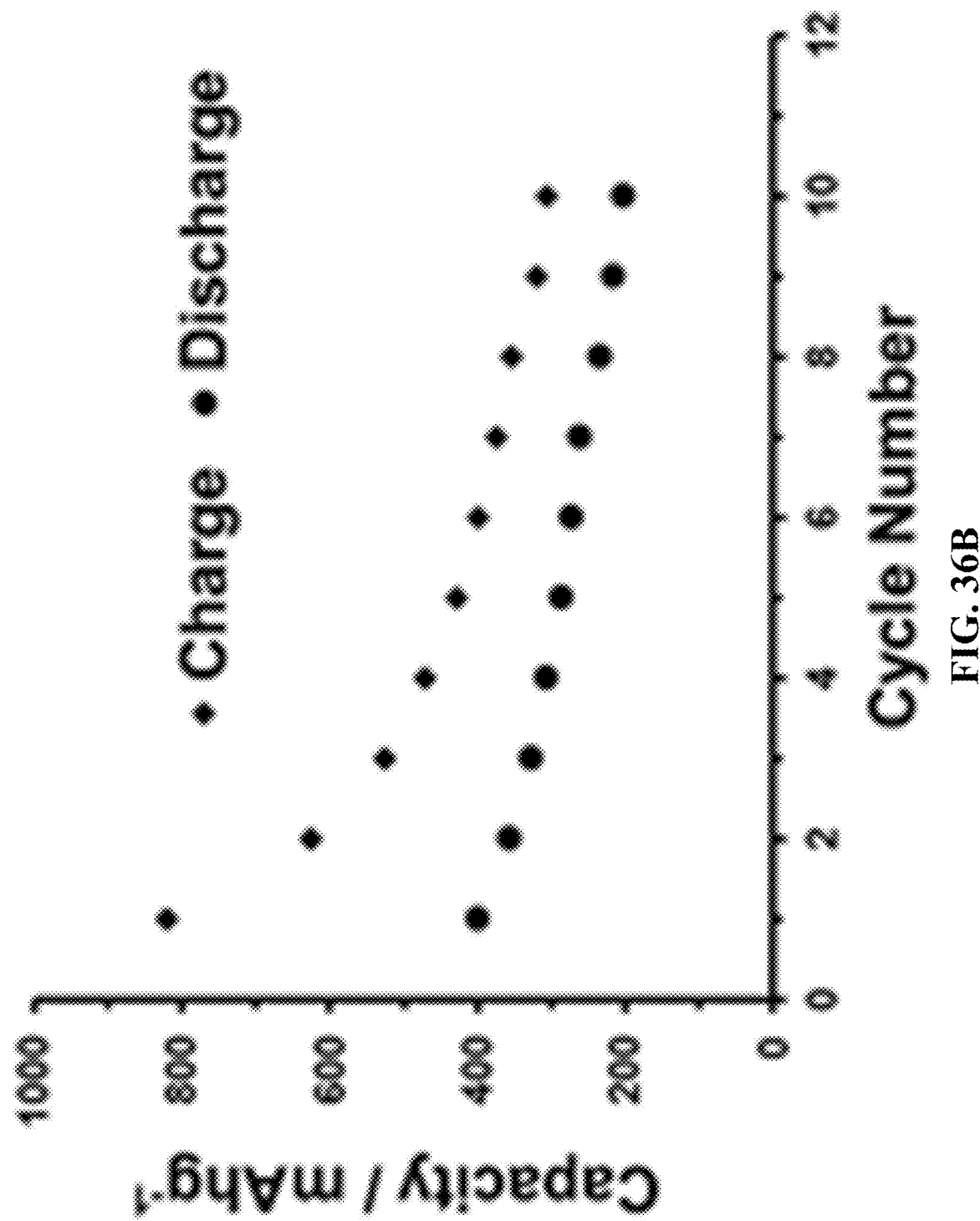

The theoretical energy density of Mg-sulfur batteries is up to 1700 $Whkg^{-1}$ and 3200 $WhL^{-1}$, which is promising to pursue as a high capacity replacement of lithium ion batteries. Here, sulfur was loaded on mesoporous carbon via high temperature diffusion method. The cells were assembled with 0.5 M $MgCl_2/Mg(TFSI)_2$ electrolyte in DME. The CMK/S composite as the cathode active material, Mg-sulfur battery discharged 401.5 $mAhg^{-1}$ at 10 $mAg^{-1}$ current density. After cycling for 10 times, it still keeps 203.6 $mAhg^{-1}$ capacity (FIG. 36A-FIG. 36B). Even magnesium sulfur showed reversible conversion reaction, the discharge capacity is much lower than theoretic capacity. One reason may be due to the magnesium polysulfide dissolution in electrolyte. Another possible reason may be $Mg(TFSI)_2$ is not well compatible with Mg anode, it could decompose and generate inert substance on Mg metal surface which could increase the surface resistance and lead to polarization increasing and capacity decay.

In summary, Mg powder treatment is an effective and convenient method to prepare high performance magnesium electrolytes. Electrochemical performance of $MgCl_2/AlCl_3$ in TGM solvent and $MgCl_2$ in THF/DPSO were significantly improved with the Mg powder treatment. Overpotential of Mg plating and stripping was below 250 mV, columbic efficiency was higher than 90%. The anodic oxidation stability in $MgCl_2/AlCl_3$ electrolytes was up to 3.8 V, which matches most of cathode materials for Mg batteries. The Mg powder treatment was more efficient for the 2:1 $MgCl_2/Mg(TFSI)_2$ electrolyte than the 1:1 $MgCl_2/Mg(TFSI)_2$ electrolyte in DME. Pairing the 0.5 M 1:1 ratio $MgCl_2/Mg(TFSI)_2$-DME electrolyte with CMK/S cathode, the Mg-sulfur battery delivered 401.5 $mAhg^{-1}$ discharge capacity at 10 $mAg^1$ current density and still keeps 203.6 $mAhg^{-1}$ at the $10^{th}$ cycle.

REFERENCES (1) Aurbach, D.; Lu, Z.; Schechter, A.; Gofer, Y.; Gizbar, H.; Turgeman, R.; Cohen, Y.; Moshkovich, M.; Levi, E. Nature 2000, 407, 724.
(2) Watkins, T.; Kumar, A.; Buttry, D. A. Journal of the American Chemical Society 2016, 138, 641.

(3) Aurbach, D.; Weissman, I.; Gofer, Y.; Levi, E. Chemical Record 2003, 3, 61.
(4) Saha, P.; Datta, M. K.; Velikokhatnyi, O. I.; Manivannan, A.; Alman, D.; Kumta, P. N. Progress in Materials Science 2014, 66, 1.
(5) Kroon, M. C.; Buijs, W.; Peters, C. J.; Witkamp, G. J. Green Chemistry 2006, 8, 241.
(6) Tarascon, J. M.; Armand, M. Nature 2001, 414, 359.
(7) Muldoon, J.; Bucur, C. B.; Gregory, T. Chemical Reviews 2014, 114, 11683.
(8) Yoo, H. D.; Shterenberg, I.; Gofer, Y.; Gershinsky, G.; Pour, N.; Aurbach, D. Energy & Environmental Science 2013, 6, 2265.
(9) Muldoon, J.; Bucur, C. B.; Oliver, A. G.; Sugimoto, T.; Matsui, M.; Kim, H. S.; Allred, G. D.; Zajicek, J.; Kotani, Y. Energy & Environmental Science 2012, 5, 5941.
(10) Aurbach, D.; Gofer, Y.; Lu, Z.; Schechter, A.; Chusid, O.; Gizbar, H.; Cohen, Y.; Ashkenazi, V.; Moshkovich, M.; Turgeman, R.; Levi, E. Journal of Power Sources 2001, 97-8, 28.
(11) Liu, T. B.; Shao, Y. Y.; Li, G. S.; Gu, M.; Hu, J. Z.; Xu, S. C.; Nie, Z. M.; Chen, X. L.; Wang, C. M.; Liu, J. Journal of Materials Chemistry A 2014, 2, 3430.
(12) Cheng, Y. W.; Stolley, R. M.; Han, K. S.; Shao, Y. Y.; Arey, B. W.; Washton, N. M.; Mueller, K. T.; Helm, M. L.; Sprenkle, V. L.; Liu, J.; Li, G. S. Phys Chem Chem Phys 2015, 17, 13307.
(13) Doe, R. E.; Han, R.; Hwang, J.; Gmitter, A. J.; Shterenberg, I.; Yoo, H. D.; Pour, N.; Aurbach, D. Chemical Communications 2014, 50, 243.
(14) Shterenberg, I.; Salama, M.; Gofer, Y.; Levi, E.; Aurbach, D. Mrs Bull 2014, 39, 453.
(15) Barile, C. J.; Barile, E. C.; Zavadil, K. R.; Nuzzo, R. G.; Gewirth, A. A. J Phys Chem C 2014, 118, 27623.
(16) See, K. A.; Chapman, K. W.; Zhu, L. Y.; Wiaderek, K. M.; Borkiewicz, O. J.; Barile, C. J.; Chupas, P. J.; Gewirth, A. A. Journal of the American Chemical Society 2016, 138, 328.
(17) Barile, C. J.; Nuzzo, R. G.; Gewirth, A. A. J Phys Chem C 2015, 119, 13524.
(18) Ha, J. H.; Adams, B.; Cho, J. H.; Duffort, V.; Kim, J. H.; Chung, K. Y.; Cho, B. W.; Nazar, L. F.; Oh, S. H. Journal of Materials Chemistry A 2016, 4, 7160.
(19) Meerwein, H.; Delfs, D.; Morschel, H. Angew. Chem. 1960, 72, 927-934.
(20) Terada, S.; Mandai, T.; Suzuki, S.; Tsuzuki, S.; Watanabe, K.; Kamei, Y.; Ueno, K.; Dokko, K.; Watanabe, M. J Phys Chem C 2016, 120, 1353.
(21) Waldvogel, S. R.; Janza, B. Angew Chem Int Edit 2014, 53, 7122.
(22) Bard, A. J.; Faulkner, L. R., "Electrochemical Methods", 2nd ed., Wily, Hoboken, 2001.
(23) Zhang, X.; Leddy, J.; Bard, A. J. Journal of the American Chemical Society 1985, 107, 3719.
(24) Maroncelli, M.; Macinnis, J.; Fleming, G. R. Science 1989, 243, 1674.
(25) Benmayza, A.; Ramanathan, M.; Arthur, T. S.; Matsui, M.; Mizuno, F.; Guo, J. H.; Glans, P. A.; Prakash, J. J Phys Chem C 2013, 117, 26881.
(26) He, S.; Luo, J.; Liu, T. L. MgCl2/AlCl3 electrolytes for reversible Mg deposition/stripping: electrochemical conditioning or not? J. Mater. Chem. A. 2017, 5, 12718-12722
(27) Liu, T.; Shao, Y.; Li, G.; Gu, M.; Hu, J.; Xu, S.; Nie, Z.; Chen, X.; Wang, C.; Liu, J. A facile approach using MgCl2 to formulate high performance Mg2+ electrolytes for rechargeable Mg batteries J. Mater. Chem. A. 2014, 2, 3430-3438.
(28) Luo, J.; He, S.; Liu, T. L. Tertiary Mg/MgCl2/AlCl3 Inorganic Mg2+ Electrolytes with Unprecedented Electrochemical Performance for Reversible Mg Deposition ACS Energy Letters 2017, 2, 1197-1202.
(29) He, S.; Nielson, K. V.; Luo, J.; Liu, T. L. Recent advances on MgCl2 based electrolytes for rechargeable Mg batteries Energy Storage Materials 2017, 8, 184-188.
(30) Zhao-Karger, Z.; Zhao, X.; Wang, D.; Diemant, T.; Behm, R. J.; Fichtner, M. Performance Improvement of Magnesium Sulfur Batteries with Modified Non-Nucleophilic Electrolytes Adv. Energy Mater. 2015, 5, 1401155-1401163.
(31) Park, J.; Kim Eui, T.; Kim, C.; Pyun, J.; Jang, H.-S.; Shin, J.; Choi Jang, W.; Char, K.; Sung, Y.-E. The Importance of Confined Sulfur Nanodomains and Adjoining Electron Conductive Pathways in Subreaction Regimes of Li—S Batteries Adv. Energy Mater. 2017, 7, 1700074.
(32) Liu, W.; Jiang, J.; Yang, K. R.; Mi, Y.; Kumaravadivel, P.; Zhong, Y.; Fan, Q.; Weng, Z.; Wu, Z.; Cha, J. J.; Zhou, H.; Batista, V. S.; Brudvig, G. W.; Wang, H. Ultrathin dendrimer-graphene oxide composite film for stable cycling lithium-sulfur batteries Proceedings of the National Academy of Sciences 2017, 114, 3578-3583.
(33) P. Caepa, G. S. Guatam, D. C. Hannah, et al., Chem. Rev., 117(5): 4287 (2017).
(34) S.-J. Kang, S.-C. Lim, H. Kim, J. W. Heo, S. Hwang, M. Jang, D. Yang, S.-T. Hong, H. Lee, Chem. Mater. 29, 3174-3180 (2017).
(35) S. Y. Ha, Y. W. Lee, S. W. Woo, B. Koo, J. S. Kim, J. Cho, K. T. Leeand, N. S. Choi, ACS Appl. Mater. Interfaces, 6, 4063 (2014).
(36) Sa, N.; Pan, B.; Saha-Shah, A.; Hubaud, A. A.; Vaughey, J. T.; Baker, L. A.; Liao, C.; Burrell, A. K. ACS Appl. Mater. Interfaces, 8, 16002 (2016).
(37) H. S. Kim, T. S. Arthur, G. D. Allred, J. Zajicek, J. G. Newman, A. E. Rodnyansky, A. G. Oliver, W. C. Boggess, J. Muldoon, Nat. Commun. 2, 2-6 (2011).

All of the above-listed references are incorporated herein by reference in their entirety.

What is claimed is:

1. A method of making a composition, the method comprising:
adding a magnesium salt, a metal halide and metallic magnesium to a solvent to provide a mixture;
stirring the mixture; and
filtering the mixture to provide a composition,
wherein the composition has a molar ratio of magnesium to the metal of the metal halide of from about 1:3 to about 1:0; and
wherein the metallic magnesium is present in the mixture at from about 0.1 mg/mL to about 40 mg/mL.

2. The method of claim 1, wherein the solvent comprises an ethereal solvent, a sulfone solvent, acetonitrile, carbonate, dimethylforamide (DMF), dimethyl sulfoxide (DMSO), or a mixture thereof.

3. The method of claim 1, wherein the metal halide comprises aluminum halide, boron halide, gallium halide, or a combination thereof.

4. The method of claim 1, wherein the magnesium salt is present in the mixture at from about 0.5 mg/mL to about 600 mg/mL.

5. The method of claim 1, wherein the metal halide is present in the mixture at from about 0.5 mg/mL to about 320 mg/mL.

6. The method of claim 1, wherein the mixture is stirred for at least 5 hours prior to filtering.

7. The method of claim 1, wherein the mixture is stirred at a temperature range of from about 15° C. to about 80° C.

8. The method of claim 2, wherein the ethereal solvent comprises tetrahydrofuran (THF), dimethoxyethane (DME), diglyme (DMG), triglyme, tetraglyme, 1,4-dioxane, or a combination thereof.

9. The method of claim 2, wherein the sulfone solvent comprises dipropyl sulfone, ter-butyl sulfone, or a combination thereof.

10. The method of claim 2, wherein the carbonate comprises propylene carbonate, ethylene carbonate, fluoroethylene carbonate, ethyl methyl carbonate, 4-Vinyl-1,3-dioxolan-2-one, diethyl carbonate, or a combination thereof.

11. The method of claim 1, wherein the composition has a magnesium concentration of from about 1 mg/mL to about 50 mg/mL.

12. The method of claim 1, wherein the composition has a metal concentration, the metal being that of the metal halide, of from about 0.1 mg/mL to about 65 mg/mL.

13. The method of claim 3, wherein the composition has a molar ratio of magnesium to aluminum of
   (a) from about 2.2:1 to about 4:1,
       wherein the ethereal solvent is THF,
   (b) from about 1.2:1 to about 3:1,
       wherein the ethereal solvent is DME, or
   (c) from about 1:1.21 to about 1:3,
       wherein the ethereal solvent is DMG.

14. The method of claim 1, wherein the composition has a magnesium concentration of
   (a) from about 1 mg/mL to about 20 mg/mL,
       wherein the ethereal solvent is THF,
   (b) from about 10 mg/mL to about 30 mg/mL,
       wherein the ethereal solvent is DME,
   (c) from about 3 mg/mL to about 20 mg/mL,
       wherein the ethereal solvent is DMG, or
   (d) from about 3 mg/mL to about 20 mg/mL,
       wherein the solvent is dipropyl sulfone/THF at a 1/1 (v/v) ratio.

15. The method of claim 3, wherein the composition has an aluminum concentration of
   (a) from about 0.1 mg/mL to about 0.5 mg/mL,
       wherein the ethereal solvent is THF,
   (b) from about 1 mg/mL to about 10 mg/mL,
       wherein the ethereal solvent is DME, or
   (c) from about 0.5 mg/mL to about 5 mg/mL,
       wherein the ethereal solvent is DMG.

16. The method of claim 1, wherein the magnesium salt comprises magnesium chloride ($MgCl_2$), magnesium(II) bis(trifluoromethane sulfonyl) imide ($Mg(TFSI)_2$), magnesium bis(hexamethyldisilazide) ($Mg(HMDS)_2$), or a combination thereof.

17. The method of claim 1, wherein the metal halide is aluminum chloride ($AlCl_3$).

18. The method of claim 1, wherein the composition comprises less than 50 ppm water.

19. The method of claim 1, wherein the composition has a Coulombic efficiency of greater than 90%.

20. The method of claim 1, wherein the composition has an overpotential of less than 200 mV.

21. The method of claim 1, wherein the metallic magnesium is in the form of a powder.

22. The method of claim 1, wherein the method further comprises adding an ionic liquid to the solvent or mixture.

* * * * *